TELEPHONE CALL CHARGE AND TAX CALCULATOR

Filed Nov. 28, 1956 63 Sheets-Sheet 1

INVENTORS G. RIGGS
R. F. SCHUNNEMAN
BY Donald M Duff
ATTORNEY

TELEPHONE CALL CHARGE AND TAX CALCULATOR

Filed Nov. 28, 1956 63 Sheets-Sheet 2

INVENTORS G. RIGGS
R. F. SCHUNNEMAN
BY Donald M Duft
ATTORNEY

TELEPHONE CALL CHARGE AND TAX CALCULATOR

Filed Nov. 28, 1956 63 Sheets-Sheet 3

INVENTORS. G. RIGGS
R. F. SCHUNNEMAN
BY Donald M Duft
ATTORNEY

INVENTORS G. RIGGS
R. F. SCHUNNEMAN
BY Donald M Duft
ATTORNEY

TELEPHONE CALL CHARGE AND TAX CALCULATOR

Filed Nov. 28, 1956 63 Sheets-Sheet 5

INVENTORS
G. RIGGS
R. F. SCHUNNEMAN
BY Donald M Duft
ATTORNEY

TELEPHONE CALL CHARGE AND TAX CALCULATOR

Filed Nov. 28, 1956 63 Sheets-Sheet 6

INVENTORS G. RIGGS
R. F. SCHUNNEMAN
BY
Donald M Duft
ATTORNEY

Nov. 3, 1959 G. RIGGS ET AL 2,911,150

TELEPHONE CALL CHARGE AND TAX CALCULATOR

Filed Nov. 28, 1956 63 Sheets-Sheet 7

INVENTORS G. RIGGS
R. F. SCHUNNEMAN
BY Donald M Duft
ATTORNEY

Nov. 3, 1959 G. RIGGS ET AL 2,911,150

TELEPHONE CALL CHARGE AND TAX CALCULATOR

Filed Nov. 28, 1956 63 Sheets-Sheet 8

INVENTORS. G. RIGGS
R. F. SCHUNNEMAN
BY Donald M Duft
ATTORNEY

TELEPHONE CALL CHARGE AND TAX CALCULATOR

Filed Nov. 28, 1956 63 Sheets-Sheet 9

INVENTORS G. RIGGS
R. F. SCHUNNEMAN
BY Donald M. Duft
ATTORNEY

INVENTORS: G. RIGGS
R. F. SCHUNNEMAN
BY Donald M Duft
ATTORNEY

INVENTORS G. RIGGS
R. F. SCHUNNEMAN
BY
Donald M. Dufft
ATTORNEY

INVENTORS G. RIGGS
R. F. SCHUNNEMAN
BY Donald M Duft
ATTORNEY

INVENTORS G. RIGGS
R. F. SCHUNNEMAN
BY Donald M. Duft
ATTORNEY

INVENTORS G. RIGGS
R. F. SCHUNNEMAN
BY Donald M Duft
ATTORNEY

INVENTORS G. RIGGS
R. F. SCHUNNEMAN
BY
Donald M Duft
ATTORNEY

Nov. 3, 1959 G. RIGGS ET AL 2,911,150

TELEPHONE CALL CHARGE AND TAX CALCULATOR

Filed Nov. 28, 1956 63 Sheets-Sheet 16

INVENTORS. G. RIGGS
R. F. SCHUNNEMAN
BY
Donald M Duft
ATTORNEY

INVENTORS G. RIGGS
R. F. SCHUNNEMAN
BY
Donald M Duft
ATTORNEY

Nov. 3, 1959 G. RIGGS ET AL 2,911,150

TELEPHONE CALL CHARGE AND TAX CALCULATOR

Filed Nov. 28, 1956 63 Sheets-Sheet 18

INVENTORS G. RIGGS
R. F. SCHUNNEMAN
BY
Donald M Duft
ATTORNEY

INVENTORS G. RIGGS
R. F. SCHUNNEMAN
BY Donald M Duft
ATTORNEY

Nov. 3, 1959 G. RIGGS ET AL 2,911,150

TELEPHONE CALL CHARGE AND TAX CALCULATOR

Filed Nov. 28, 1956 63 Sheets-Sheet 20

INVENTORS G. RIGGS
R. F. SCHUNNEMAN
BY Donald M Duft
ATTORNEY

INVENTORS G. RIGGS
R. F. SCHUNNEMAN
BY Donald M Duft
ATTORNEY

Nov. 3, 1959 G. RIGGS ET AL 2,911,150

TELEPHONE CALL CHARGE AND TAX CALCULATOR

Filed Nov. 28, 1956 63 Sheets-Sheet 22

INVENTORS G. RIGGS
R. F. SCHUNNEMAN

BY Donald M. Duft

ATTORNEY

INVENTORS G. RIGGS
R. F. SCHUNNEMAN
BY Donald M Duft
ATTORNEY

INVENTORS G. RIGGS
R. F. SCHUNNEMAN
BY Donald M Duft
ATTORNEY

INVENTORS G. RIGGS
R. F. SCHUNNEMAN
BY Donald M Duft
ATTORNEY

INVENTORS G. RIGGS
R. F. SCHUNNEMAN
BY Donald M Duft
ATTORNEY

INVENTORS G. RIGGS
R. F. SCHUNNEMAN
BY Donald M Duft
ATTORNEY

INVENTORS G. RIGGS
R. F. SCHUNNEMAN
BY
Donald M. Duft
ATTORNEY

TELEPHONE CALL CHARGE AND TAX CALCULATOR

Filed Nov. 28, 1956 63 Sheets-Sheet 29

INVENTORS G. RIGGS
R. F. SCHUNNEMAN
BY
Donald M Duft
ATTORNEY

Nov. 3, 1959 G. RIGGS ET AL 2,911,150

TELEPHONE CALL CHARGE AND TAX CALCULATOR

Filed Nov. 28, 1956 63 Sheets-Sheet 30

INVENTORS G. RIGGS
R. F. SCHUNNEMAN
BY Donald M. Sluft
ATTORNEY

INVENTORS G. RIGGS
R. F. SCHUNNEMAN
BY Donald M Duft
ATTORNEY

INVENTORS G. RIGGS
R. F. SCHUNNEMAN
BY Donald M Duff
ATTORNEY

INVENTORS G. RIGGS
R. F. SCHUNNEMAN
BY Donald M. Duft
ATTORNEY

Nov. 3, 1959 G. RIGGS ET AL 2,911,150
TELEPHONE CALL CHARGE AND TAX CALCULATOR
Filed Nov. 28, 1956 63 Sheets-Sheet 34

INVENTORS G. RIGGS
R. F. SCHUNNEMAN
BY Donald M Duft
ATTORNEY

TELEPHONE CALL CHARGE AND TAX CALCULATOR

Filed Nov. 28, 1956

INVENTORS G. RIGGS
R. F. SCHUNNEMAN
BY Donald M Duft
ATTORNEY

Nov. 3, 1959 G. RIGGS ET AL 2,911,150

TELEPHONE CALL CHARGE AND TAX CALCULATOR

Filed Nov. 28, 1956 63 Sheets-Sheet 36

INVENTORS G. RIGGS
R. F. SCHUNNEMAN
BY Donald M Duft
ATTORNEY

TELEPHONE CALL CHARGE AND TAX CALCULATOR

Filed Nov. 28, 1956 63 Sheets-Sheet 37

INVENTORS G. RIGGS
R. F. SCHUNNEMAN
BY Donald M Duft
ATTORNEY

INVENTORS G. RIGGS
R. F. SCHUNNEMAN
BY Donald M. Dufft
ATTORNEY

TELEPHONE CALL CHARGE AND TAX CALCULATOR

Filed Nov. 28, 1956 63 Sheets-Sheet 39

INVENTORS G. RIGGS
R. F. SCHUNNEMAN
BY Donald M Duft
ATTORNEY

Nov. 3, 1959 G. RIGGS ET AL 2,911,150

TELEPHONE CALL CHARGE AND TAX CALCULATOR

Filed Nov. 28, 1956 63 Sheets-Sheet 40

INVENTORS G. RIGGS
R. F. SCHUNNEMAN
BY Donald M Sufft
ATTORNEY

Nov. 3, 1959 G. RIGGS ET AL 2,911,150
TELEPHONE CALL CHARGE AND TAX CALCULATOR
Filed Nov. 28, 1956 63 Sheets-Sheet 41

INVENTORS G. RIGGS
R. F. SCHUNNEMAN
BY Donald M Duft
ATTORNEY

INVENTORS G. RIGGS
R. F. SCHUNNEMAN
BY Donald M Duft
ATTORNEY

Nov. 3, 1959 G. RIGGS ET AL 2,911,150

TELEPHONE CALL CHARGE AND TAX CALCULATOR

Filed Nov. 28, 1956 63 Sheets-Sheet 43

INVENTORS G. RIGGS
R. F. SCHUNNEMAN
BY Donald M Duft
ATTORNEY

Nov. 3, 1959 G. RIGGS ET AL 2,911,150

TELEPHONE CALL CHARGE AND TAX CALCULATOR

Filed Nov. 28, 1956 63 Sheets-Sheet 44

INVENTORS G. RIGGS
R. F. SCHUNNEMAN
BY Donald M. Dufft
ATTORNEY

INVENTORS G. RIGGS
R. F. SCHUNNEMAN
BY Donald M Duft
ATTORNEY

INVENTORS G. RIGGS
R. F. SCHUNNEMAN
BY
Donald M Duft
ATTORNEY

Nov. 3, 1959 G. RIGGS ET AL 2,911,150

TELEPHONE CALL CHARGE AND TAX CALCULATOR

Filed Nov. 28, 1956 63 Sheets-Sheet 47

INVENTORS G. RIGGS
R. F. SCHUNNEMAN
BY Donald M. Duft
ATTORNEY

INVENTORS G. RIGGS
R. F. SCHUNNEMAN
BY Donald M Duft
ATTORNEY

INVENTORS G. RIGGS
R. F. SCHUNNEMAN
BY Donald M. Duft
ATTORNEY

INVENTORS G. RIGGS
R. F. SCHUNNEMAN
BY Donald M Duft
ATTORNEY

INVENTORS G. RIGGS
R. F. SCHUNNEMAN
BY Donald M Duft
ATTORNEY

INVENTORS G. RIGGS
R. F. SCHUNNEMAN
BY
Donald M. Duft
ATTORNEY

TELEPHONE CALL CHARGE AND TAX CALCULATOR

Filed Nov. 28, 1956 63 Sheets-Sheet 53

INVENTOR G. RIGGS
R. F. SCHUNNEMAN
BY Donald M Duft
ATTORNEY

INVENTOR G. RIGGS
R. F. SCHUNNEMAN
BY Donald M. Duft
ATTORNEY

TELEPHONE CALL CHARGE AND TAX CALCULATOR

INVENTORS G. RIGGS
R. F. SCHUNNEMAN
BY Donald M. Duft
ATTORNEY

INVENTORS G. RIGGS
R. F. SCHUNNEMAN
BY Donald M. Duft
ATTORNEY

FIG. 55

TABLE No. 1

OVERTIME PERIOD = 3 MINUTES

| | OVER-TIME | NUMBER OF OVERTIME PERIODS | | OVER-TIME | NUMBER OF OVERTIME PERIODS | | OVER-TIME | NUMBER OF OVERTIME PERIODS | | OVER-TIME | NUMBER OF OVERTIME PERIODS | |
|---|---|---|---|---|---|---|---|---|---|---|---|---|
| | | TENS | UNITS | | TENS | UNITS | | TENS | UNITS | | TENS | UNITS |
| QUOTIENT UNITS 31 | 00 | 0 | 0 | 30 | 1 | 0 | 60 | 2 | 0 | 90 | 3 | 0 |
| | 01 | 0 | 1 | 31 | 1 | 1 | 61 | 2 | 1 | 91 | 3 | 1 |
| | 02 | 0 | 1 | 32 | 1 | 1 | 62 | 2 | 1 | 92 | 3 | 1 |
| | 03 | 0 | 1 | 33 | 1 | 1 | 63 | 2 | 1 | 93 | 3 | 1 |
| | 04 | 0 | 2 | 34 | 1 | 2 | 64 | 2 | 2 | 94 | 3 | 2 |
| | 05 | 0 | 2 | 35 | 1 | 2 | 65 | 2 | 2 | 95 | 3 | 2 |
| | 06 | 0 | 2 | 36 | 1 | 2 | 66 | 2 | 2 | 96 | 3 | 2 |
| | 07 | 0 | 3 | 37 | 1 | 3 | 67 | 2 | 3 | | | |
| | 08 | 0 | 3 | 38 | 1 | 3 | 68 | 2 | 3 | | | |
| | 09 | 0 | 3 | 39 | 1 | 3 | 69 | 2 | 3 | | | |
| QUOTIENT UNITS 32 | 10 | 0 | 4 | 40 | 1 | 4 | 70 | 2 | 4 | | | |
| | 11 | 0 | 4 | 41 | 1 | 4 | 71 | 2 | 4 | | | |
| | 12 | 0 | 4 | 42 | 1 | 4 | 72 | 2 | 4 | | | |
| | 13 | 0 | 5 | 43 | 1 | 5 | 73 | 2 | 5 | | | |
| | 14 | 0 | 5 | 44 | 1 | 5 | 74 | 2 | 5 | | | |
| | 15 | 0 | 5 | 45 | 1 | 5 | 75 | 2 | 5 | | | |
| | 16 | 0 | 6 | 46 | 1 | 6 | 76 | 2 | 6 | | | |
| | 17 | 0 | 6 | 47 | 1 | 6 | 77 | 2 | 6 | | | |
| | 18 | 0 | 6 | 48 | 1 | 6 | 78 | 2 | 6 | | | |
| | 19 | 0 | 7 | 49 | 1 | 7 | 79 | 2 | 7 | | | |
| QUOTIENT UNITS 33 | 20 | 0 | 7 | 50 | 1 | 7 | 80 | 2 | 7 | QUOTIENT TENS LOW | | |
| | 21 | 0 | 7 | 51 | 1 | 7 | 81 | 2 | 7 | | | |
| | 22 | 0 | 8 | 52 | 1 | 8 | 82 | 2 | 8 | | | |
| | 23 | 0 | 8 | 53 | 1 | 8 | 83 | 2 | 8 | | | |
| | 24 | 0 | 8 | 54 | 1 | 8 | 84 | 2 | 8 | | | |
| | 25 | 0 | 9 | 55 | 1 | 9 | 85 | 2 | 9 | | | |
| | 26 | 0 | 9 | 56 | 1 | 9 | 86 | 2 | 9 | | | |
| | 27 | 0 | 9 | 57 | 1 | 9 | 87 | 2 | 9 | | | |
| | 28 | 1 | 0 | 58 | 2 | 0 | 88 | 3 | 0 | QUOT. TENS HIGH | | |
| | 29 | 1 | 0 | 59 | 2 | 0 | 89 | 3 | 0 | | | |

INVENTORS G. RIGGS
R. F. SCHUNNEMAN
BY Donald M. Duft
ATTORNEY

FIG. 56

TABLE No. 2

OVERTIME CHARGE MULTIPLIER TABLE

| OVERTIME RATE | NUMBER OF OVERTIME PERIODS | | | | | | | | |
|---|---|---|---|---|---|---|---|---|---|
| | 10 | 20 | 30 | 40 | 50 | 60 | 70 | 80 | 90 |
| .10 | 1 | 2 | 3 | 4 | 5 | 6 | 7 | 8 | 9 |
| .20 | 2 | 4 | 6 | 8 | 10 | 12 | 14 | 16 | 18 |
| .30 | 3 | 6 | 9 | 12 | 15 | 18 | 21 | 24 | 27 |
| .40 | 4 | 8 | 12 | 16 | 20 | 24 | 28 | 32 | 36 |
| .50 | 5 | 10 | 15 | 20 | 25 | 30 | 35 | 40 | 45 |
| .60 | 6 | 12 | 18 | 24 | 30 | 36 | 42 | 48 | 54 |
| .70 | 7 | 14 | 21 | 28 | 35 | 42 | 49 | 56 | 63 |
| .80 | 8 | 16 | 24 | 32 | 40 | 48 | 56 | 64 | 72 |
| .90 | 9 | 18 | 27 | 36 | 45 | 54 | 63 | 72 | 81 |
| .05 | .50 | 1.00 | 1.50 | 2.00 | 2.50 | 3.00 | 3.50 | 4.00 | 4.50 |

| OVERTIME RATE | NUMBER OF OVERTIME PERIODS | | | | | | | | |
|---|---|---|---|---|---|---|---|---|---|
| | 1 | 2 | 3 | 4 | 5 | 6 | 7 | 8 | 9 |
| .10 | .10 | .20 | .30 | .40 | .50 | .60 | .70 | .80 | .90 |
| .20 | .20 | .40 | .60 | .80 | 1.00 | 1.20 | 1.40 | 1.60 | 1.80 |
| .30 | .30 | .60 | .90 | 1.20 | 1.50 | 1.80 | 2.10 | 2.40 | 2.70 |
| .40 | .40 | .80 | 1.20 | 1.60 | 2.00 | 2.40 | 2.80 | 3.20 | 3.60 |
| .50 | .50 | 1.00 | 1.50 | 2.00 | 2.50 | 3.00 | 3.50 | 4.00 | 4.50 |
| .60 | .60 | 1.20 | 1.80 | 2.40 | 3.00 | 3.60 | 4.20 | 4.80 | 5.40 |
| .70 | .70 | 1.40 | 2.10 | 2.80 | 3.50 | 4.20 | 4.90 | 5.60 | 6.30 |
| .80 | .80 | 1.60 | 2.40 | 3.20 | 4.00 | 4.80 | 5.60 | 6.40 | 7.20 |
| .90 | .90 | 1.80 | 2.70 | 3.60 | 4.50 | 5.40 | 6.30 | 7.20 | 8.10 |
| .05 | .05 | .10 | .15 | .20 | .25 | .30 | .35 | .40 | .45 |

INVENTORS G. RIGGS
R. F. SCHUNNEMAN
BY Donald M D ft
ATTORNEY

TELEPHONE CALL CHARGE AND TAX CALCULATOR

FIG. 57

TABLE No. 4

TAX MULTIPLIER TABLE

CHARGES IN $ AND CENTS

| | TAXES % | | | | | | | | | | | | |
|---|---|---|---|---|---|---|---|---|---|---|---|---|---|
| | 10% | 20% | 30% | 40% | 1% | 2% | 3% | 4% | 5% | 6% | 7% | 8% | 9% |
| $ 10.00 | 1 | 2 | 3 | 4 | .10 | .20 | .30 | .40 | .50 | .60 | .70 | .80 | .90 |
| 20.00 | 2 | 4 | 6 | 8 | .20 | .40 | .60 | .80 | 1.00 | 1.20 | 1.40 | 1.60 | 1.80 |
| 30.00 | 3 | 6 | 9 | 12 | .30 | .60 | .90 | 1.20 | 1.50 | 1.80 | 2.10 | 2.40 | 2.70 |
| 40.00 | 4 | 8 | 12 | 16 | .40 | .80 | 1.20 | 1.60 | 2.00 | 2.40 | 2.80 | 3.20 | 3.60 |
| 50.00 | 5 | 10 | 15 | 20 | .50 | 1.00 | 1.50 | 2.00 | 2.50 | 3.00 | 3.50 | 4.00 | 4.50 |
| 60.00 | 6 | 12 | 18 | 24 | .60 | 1.20 | 1.80 | 2.40 | 3.00 | 3.60 | 4.20 | 4.80 | 5.40 |
| 70.00 | 7 | 14 | 21 | 28 | .70 | 1.40 | 2.10 | 2.80 | 3.50 | 4.20 | 4.90 | 5.60 | 6.30 |
| 80.00 | 8 | 16 | 24 | 32 | .80 | 1.60 | 2.40 | 3.20 | 4.00 | 4.80 | 5.60 | 6.40 | 7.20 |
| 90.00 | 9 | 18 | 27 | 36 | .90 | 1.80 | 2.70 | 3.60 | 4.50 | 5.40 | 6.30 | 7.20 | 8.10 |
| | | | | | | | | | | | | | |
| 1.00 | .10 | .20 | .30 | .40 | .01 | .02 | .03 | .04 | .05 | .06 | .07 | .08 | .09 |
| 2.00 | .20 | .40 | .60 | .80 | .02 | .04 | .06 | .08 | .10 | .12 | .14 | .16 | .18 |
| 3.00 | 30 | .60 | .90 | 1.20 | .03 | .06 | .09 | .12 | .15 | .18 | .21 | .24 | .27 |
| 4.00 | .40 | .80 | 1.20 | 1.60 | .04 | .08 | .12 | .16 | .20 | .24 | .28 | .32 | .36 |
| 5.00 | .50 | 1.00 | 1.50 | 2.00 | .05 | .10 | .15 | .20 | .25 | .30 | .35 | .40 | .45 |
| 6.00 | .60 | 1.20 | 1.80 | 2.40 | .06 | .12 | .18 | .24 | .30 | .36 | .42 | .48 | .54 |
| 7.00 | .70 | 1.40 | 2.10 | 2.80 | .07 | .14 | .21 | .28 | .35 | .42 | .49 | .56 | .63 |
| 8.00 | .80 | 1.60 | 2.40 | 3.20 | .08 | .16 | .24 | .32 | .40 | .48 | .56 | .64 | .72 |
| 9.00 | .90 | 1.80 | 2.70 | 3.60 | .09 | .18 | .27 | .36 | .45 | .54 | .63 | .72 | .81 |
| | | | | | | | | | | | | | |
| 0.10 | .01 | .02 | .03 | .04 | .001 | .002 | .003 | .004 | .005 | .006 | .007 | .008 | .009 |
| 0.20 | .02 | .04 | .06 | .08 | .002 | .004 | .006 | .008 | .010 | .012 | .014 | .016 | .018 |
| 0.30 | .03 | .06 | .09 | .12 | .003 | .006 | .009 | .012 | .015 | .018 | .021 | .024 | .027 |
| 0.40 | .04 | .08 | .12 | .16 | .004 | .008 | .012 | .016 | .020 | .024 | .028 | .032 | .036 |
| 0.50 | .05 | .10 | .15 | .20 | .005 | .010 | .015 | .020 | .025 | .030 | .035 | .040 | .045 |
| 0.60 | .06 | .12 | .18 | .24 | .006 | .012 | .018 | .024 | .030 | .036 | .042 | .048 | .054 |
| 0.70 | .07 | .14 | .21 | .28 | .007 | .014 | .021 | .028 | .035 | .042 | .049 | .056 | .063 |
| 0.80 | .08 | .16 | .24 | .32 | .008 | .016 | .024 | 032 | .040 | .048 | .056 | .064 | .072 |
| 0.90 | .09 | .18 | .27 | .36 | .009 | .018 | .027 | 036 | .045 | .054 | .063 | .072 | .081 |
| | | | | | | | | | | | | | |
| 0.05 | .005 | .01 | .015 | .02 | .0005 | .001 | .0015 | .002 | .0025 | .003 | .0035 | .004 | .0045 |

INVENTORS G. RIGGS
R. F. SCHUNNEMAN
BY Donald M Swift
ATTORNEY

INVENTORS G. RIGGS
R. F. SCHUNNEMAN
BY Donald M Duft
ATTORNEY

INVENTORS G. RIGGS
R. F. SCHUNNEMAN
BY Donald M Duft
ATTORNEY

INVENTORS G. RIGGS
R. F. SCHUNNEMAN
BY Donald M Duft
ATTORNEY

TABLE No. 5

INVENTORS G. RIGGS
R. F. SCHUNNEMAN
BY Donald M Duft
ATTORNEY

United States Patent Office 2,911,150

Patented Nov. 3, 1959

2,911,150

TELEPHONE CALL CHARGE AND TAX CALCULATOR

George Riggs, Port Washington, N.Y., and Robert F. Schunneman, Murray Hill, N.J., assignors to Bell Telephone Laboratories, Incorporated, New York, N.Y., a corporation of New York Application November 28, 1956, Serial No. 624,784

9 Claims. (Cl. 235—162)

This invention relates to an automatic revenue accounting system and more particularly, to a system which computes customer charges for the use of communication facilities, such as telephone circuits. More specifically, this invention pertains to a system for computing the base charges as well as the Federal taxes that telephone subscribers are to be charged for toll calls.

With the advent of customer toll dialing and other new features in the modern day switching systems, the need for an efficient and streamlined method of handling the paper work connected therewith, including the billing of the correct charges to the proper customers, becomes imperative. In the past, when all telephone toll traffic was manually handled by operators, records of the conversation time of the calls were prepared by the operators and were later used for billing purposes in a system that was entirely manual. This method of accounting was slow, inefficient, and expensive with the result that on some toll calls for which the charges did not exceed a certain fixed amount, the telephone companies actually lost, rather than made, money because of the high cost of the necessary paper work.

As the telephone toll traffic increased and as the manual method of accounting became more unsatisfactory, this problem attracted the interest of an increasing number of inventors who devoted their time and energies to a solution. As a result, the prior art now contains many patents disclosing systems, circuits, and apparatus designed to improve the efficiency and decrease the cost of handling toll records.

The latest development in this field is perhaps the Bell Telephone System's automatic message accounting system, commonly referred to as AMA. In this system, equipment located at switching centers perforates data on paper tapes pertaining to each call completed therethrough. These perforated paper tapes are collected at frequent intervals and are taken to accounting centers where they are processed by a series of machines, the end one of which produces a printed tape listing the toll calls made by each subscriber during the billing period along with the chargeable conversation time of each call. These printed tapes are then used by office personnel who manually compute the charges for each call and debit them to the proper customers.

In another version of the same system, which utilizes a machine known as the tape-to-card converter, the data pertaining to the local calls is printed on a paper tape as already described, while the data pertaining to toll calls is perforated on commercial business machine cards. These cards are collected and at the end of the billing period are processed by a series of business machines including a computer which computes and perforates on each card the charges for each completed toll call. This system is far from ideal since it requires the use of a whole series of machines and master cards, together with the concomitant expenses, to compute the charge.

The AMA system is described in further detail in an article entitled, "Fundamentals of the Automatic Telephone Message Accounting System" by John Meszar in the Transactions of the American Institute of Electrical Engineers, vol. 69, PT 1, pages 255 through 269, 1950. The version of this system using the tape-to-card converter is described in an article entitled, "Principles of Tape-to-Card Conversion in the AMA System" by Willard B. Groth in Communications and Electronics, pages 42 through 52, March 1953.

The AMA system has from its inception enjoyed considerable commercial success and has enabled the telephone companies to reduce the labor and cost of preparing bills for toll calls. As a result of these and other savings, Bell Telephone System toll rates have remained fairly constant in the inflationary post-war era instead of following the upward spiral of most other basic commodities.

Although the AMA system represents a tremendous advance over the systems known heretofore, it still leaves room for improvement in that it provides no simple and economical means for computing the charges for each toll call. It, therefore, would represent a significant step forward in the art if means could be incorporated into the AMA system for automatically computing both the telephone company charges as well as the Federal taxes for toll calls. This would considerably reduce the cost involved in processing telephone toll records.

It is, therefore, an object of this invention to provide a machine for computing the base charges and the Federal taxes for which telephone company customers are to be charged for toll calls.

It is a further object of this invention to provide a machine which will utilize data already available at automatic message accounting centers and from this data compute the charges and Federal taxes for which customers are to be billed for toll calls.

It is a further object of the invention to provide a machine which in response to toll call data, including the calling and called offices and the chargeable conversation time, will compute the base charges plus the Federal taxes that subscribers are to be charged for the calls.

The present invention contemplates the use of a novel toll call charge and tax computer in combination with a translator which will supply data to the computer pertaining to the basic charge rates that are to be used in computing the cost of a call between any calling and called office.

It is further contemplated that both the computer and the translator will be used in combination with a modified version of the AMA tape-to-card converter disclosed in R. N. Breed et al. Patent No. 2,780,410, issued February 2, 1957. The information fed to the tape-to-card converter contains many bits of information pertaining to each toll call. Some of these bits are needed in computing the charges and tax for the call, while others are needed for other purposes, such as, for example, telephone company studies and analysis.

In a commercial embodiment of the present invention the tape-to-card converter would, for each call, transmit the called and calling office data to a translator circuit and would transmit the chargeable conversation time plus data indicating whether the day or night rate is to be used to the computer comprising the present invention. The translator, upon the reception of the calling and called office indications, would transmit data to the computer indicating the number of minutes constituting the initial period portion of the call between the two offices in question, the base charge for this initial period, the number of minutes that constitute an overtime period, plus the charge for each overtime period of the call.

This data is transmitted to the charge and tax computer which, with the aid of the aforementioned data already obtained from the tape-to-card converter, computes the charge in dollars and cents for both the call as well as the charge in dollars and cents for Federal taxes that are to be charged. The computer then transmits these two computed amounts back to the tape-to-card converter where they are perforated on a business machine card. The output cards from the tape-to-card converter are collected, stored, and at a later date are processed by a series of business machines which produce as an end product a sheet of paper containing the toll calls made by every subscriber during the billing period together with the charges and Federal taxes that are to be collected for each call.

A feature of the invention is an all-relay circuit for computing the charges and Federal taxes that are to be collected for each toll call.

A further feature of the invention is a circuit which computes the overtime period of a call by subtracting the initial period portion of the call from the total elapsed time of the call.

A further feature of the invention is a divider circuit which determines the number of overtime periods of a call by dividing the total overtime portion of the call by the overtime period.

Another feature of the invention is a circuit which determines the overtime charge by multiplying the number of overtime periods by the overtime rate for a single overtime period.

A further feature of the invention is a circuit which derives the total charge of a call by adding together the overtime charge plus the initial period charge.

Another feature of the invention is a circuit which determines the taxes that are to be collected for each call by multiplying the total charge of the call by the applicable tax rate.

These and other objects and features of the present invention may be more fully understood from the following description of a preferred exemplary embodiment thereof, when read with reference to the accompanying drawings in which:

Fig. 1 is a block diagram showing how certain other figures of the drawing are to be arranged with respect to each other in order to constitute the various component circuits of this system;

Figs. 2 and 2A disclose the rate information relays;

Figs. 3 and 4 together disclose the subtracter circuit;

Figs. 5 through 10 disclose the divider circuit;

Figs. 11 through 16 disclose the overtime multiplier circuit;

Figs. 17 through 25 disclose the charge adder circuit;

Fig. 26 discloses the tax rate selector circuit;

Fig. 27 discloses the charge output circuit;

Figs. 28 through 37 disclose the tax multiplier circuit;

Figs. 38 through 54 disclose the tax adder circuit;

Fig. 55 discloses a table showing how a number of overtime periods in a call are computed;

Fig. 56 discloses a table which shows how the overtime charge is determined;

Fig. 57 discloses a tax multiplier table which shows how the taxes are determined;

Fig. 58 contains a block diagrammatic showing of how the present invention may be combined with the present day AMA accounting center system and, in particular, with the tape-to-card converter;

Fig. 59 contains a block diagrammatic showing of the relationship between the various component circuits comprising the present system together with a function performed by each;

Fig. 60 illustrates the manner in which the adder circuit arrives at a total charge for a call; and Fig. 61 illustrates the manner in which the tax adder circuit computes the Federal tax applicable to each call.

*General description*

Any toll call can be divided into two parts for billing purposes, i.e. the initial period and the overtime portion. The initial period comprises the first portion of the call and is usually of 3, 4, or 5 minutes duration. The overtime portion is that part of the call which exceeds the initial period. It is computed by subtracting the initial period from the elapsed time of the call. The overtime portion, in turn, can be subdivided into a number of overtime periods.

In computing the charges for any toll call, it is necessary to have available certain bits of information such as: the duration of an initial period; the charge for an initial period; the duration of the overtime period; the overtime rate, which is the charge for a single overtime period; the elapsed time of the call; and a day or night indication, which indicates whether the usual rate or whether the lower night time and Sunday rates are to apply. Once this information is available for a call its charge may be computed by the mathematical process described hereinafter.

Fig. 58 of the drawing illustrates in diagrammatic form how the present invention might be used commercially with a modified version of the tape-to-card converter, described in the aforementioned publication, and disclosed in the aforementioned R. N. Breed et al. patent. The input tape to the tape-to-card converter is shown in the left-hand portion of Fig. 58. In the operation of this machine the box entitled, "Reader" reads the perforations on the AMA tape and operates the appropriate input registers. All the information pertaining to a single call is grouped into a single entry on the input tape and, therefore, once that entry is read, the information contained therein will be represented by the operated relays in the input register circuit. This information includes data pertaining to the calling office, the called office, the elapsed time, plus a day or night rate indication.

Once the input register relays are operated to represent the data in the entry just read, a circuit is closed to operate the rating registers in accordance with the data on the input registers. Once the rating registers have operated, the input register relays are released so that they may be free to reoperate upon the reading of the next entry on the tape. The data now in the rating registers represents, among other things, the elapsed time of the call, the day or night indication, plus the calling and called offices. The information identifying the two offices is transmitted to the translator, shown both on Figs. 58 and 59, while the data pertaining to the elapsed time of the call, and also pertaining to whether or not the day or night rate applies, is transmitted to the circuit entitled, "Charge and Tax Computer" in Fig. 58 and to the circuit within the charge and tax computer entitled "Rate Information Relays" in Fig. 59. The box "Charge and Tax Computer" in Fig. 58 comprises all the boxes shown in Fig. 9 with the exception of the boxes entitled "Translator" and "Tape-to-Card Converter Registers."

The translator, in response to the data it received from the rating registers transmits to the circuit entitled, "Rate Information Relays" in Fig. 59 the duration of an initial period for a call between the two offices in question, the charge for the initial period, the duration of the overtime period, plus the overtime rate, i.e. the charge for each overtime period. The rate information relays now have these four bits of information plus the elapsed time and the day or night rate indication as previously received from the rating registers. The charge and tax computer takes these six bits of information now represented by the operated ones of the rate information relays and from this information computes both the base charge and the Federal tax.

The elapsed time of the call, as well as the initial period is transmitted to the subtractor circuit which subtracts the latter from the former to determine the minutes of overtime. For example, assuming a call of 20 minutes total duration between two offices whose initial period is 5 minutes; the subtractor would take this information and subtract 5 from 20 to arrive at 15 minutes of overtime. The overtime is fed to a divider circuit which divides the overtime by the duration of a single overtime period, as obtained from the rate information relays, and computes the number of overtime periods. Continuing with the previously chosen example of a 20-minute call having an initial period of 5 minutes and an overtime portion of 15 minutes, let it also be assumed that a single overtime period is 5 minutes. In this case the computed number of overtime periods is 15 divided by 5 or 3.

The number of overtime periods is transmitted to the overtime multiplier which multiplies it by the overtime rate for a single overtime period, as obtained from the rate information relays, to compute the overtime charge in dollars and cents for the overtime portion of the call. Continuing with our previous example, wherein we arrived at the figure 3 for the number of overtime periods, let it be assumed that the charge for each overtime period is $.50. In this case the overtime charge will be $1.50, which is computed by multiplying the number of overtime periods, 3, by the overtime rate of $.50.

The overtime charge of $1.50 is transmitted to the charge adder circuit, which adds this charge to the initial period charge, as obtained from the rate information relays, to compute the total charge for the call. The output of the charge adder circuit represents the total charge for the call and is transmitted to two circuits entitled, "Tax Rate Selector" which determines the tax rate and the "Tax Multiplier" which multiplies the total charge by the applicable tax rate to compute the total tax for the call.

With the present day Federal tax structure all toll calls are taxed at the 10 percent rate. As long as a single rate is applicable to all calls, the circuit entitled "Tax Rate selector" which determines the tax rate would, of course, not be necessary. This circuit was added for reasons of flexibility and would only be used in the event that we should again revert to a more complicated tax structure, such as that which was in existence a few years previous, wherein all calls above a certain figure were taxed at a 25 percent rate while all calls below this figure were taxed at a 15 percent rate. With this type of tax structure, the charge adder circuit applies the total charge to the tax rate selector which determines whether the high or low tax rate is applicable. Having made this determination, the tax rate selector transmits the applicable tax rate to the tax multiplier. This tax rate is multiplied by the total charge, as obtained from the charge adder, to compute the tax to be collected. The tax multiplier utilizes the partial products method to compute the total tax. These partial products are added together in the tax adder circuit whose output represents in dollars and cents the tax to be collected.

Information representing the amount to be charged for the call plus the Federal tax is transmitted from the charge adder and from the tax adder, respectively, to the rating registers in the tape-to-card converter where the appropriate register relays are operated in accordance with these computed amounts. The rating registers now contain all the information needed to enable the telephone company to bill the proper customer for the call.

The rating registers next operate the output registers and then release so that they may serve the next call, the information concerning which will shortly be forthcoming from the reader and the input registers. The output registers now control the operation of the card punch which is a machine leased from the International Business Machines Corporation. This machine perforates information on an output card pertaining to this call and including, among other things, the calling and called offices, the date the call was made, as well as the applicable charge and tax.

Returning for a moment to Fig. 59 of the drawings, it will be recalled that the operation of the various circuits was discussed to show how the computer would handle the overtime portion of the call. This overtime portion resulted in an overtime charge which was added to the initial charge by the charge adder circuit to compute the total charge for the call. In the event that the call was of a short duration and did not exceed the initial period, the NOOT relay would be operated to indicate that the call did not have an overtime period. In this case, the subtracter circuit, the divider circuit, the overtime multiplier circuit, as well as the charge adder circuit would all be bypassed and the initial period charge would be transmitted directly to the tax rate selector and the tax rate multiplier which would proceed as already described to compute the tax for the call.

The foregoing description has described how the present invention might be used with a modified version of the tape-to-card converter. The present invention is limited to the charge and tax computer and therefore, the interconnections between it and the tape-to-card converter are shown only in diagrammatic form for several reasons. First of all, it is felt that this showing is sufficient to enable any one skilled in the art to appreciate and understand the relationship between the two circuits and to comprehend the modifications that would have to be made to the commercial version of the tape-to-card converter in order to adapt it for use with the circuits of the present invention. This commercial version of the tape-to-card converter, as disclosed in the aforementioned R. N. Breed et al. patent, is a machine of considerable complexity, both mechanically and electrically. It was, therefore, felt that no useful purposes would be served in adding to the complexity of the present case by incorporating herein the mechanical and electrical changes that would be needed in the tape-to-card converter before it could be used commercially with the present invention.

The second and perhaps the most important reason why these details of the tape-to-card converter circuit are not shown is that they comprise no part of the present invention. For example, the information transmitted to the rate information relays by the tape-to-card converter rating registers is the elapsed time indication and the day and night indication. From a patent standpoint, both of these bits of information could be furnished, if desired, by manually operated switches which, when closed, would supply the same data to the rate information relays as would be done in the more elegant setup utilizing the tape-to-card converter. Also, the output circuits of the charge and tax computer, which transmit to the rating registers the total charge and tax applicable for the call, could, instead, be connected to a bank of lights or any other suitable visual or mechanical indicating means. This crude setup involving the use of manually operated switches and a visual indicating means obviously would not be as commercially desirable as the embodiment involving the use of a modified tape-to-card converter. However, the possibility of this alternative method is suggested merely to indicate and show how the present invention is not patentably dependent upon the tape-to-card converter.

It has been previously described how the tape-to-card converter transmits information to the translator representing the calling and called offices. It was shown that in response to this information the translator produces four bits of output information representing the initial period, the charge for the initial period, the overtime period, and the overtime rate. This output information was transmitted to the rate information relays of the charge and tax computer.

The translator is shown in block diagrammatic form only and not in detail since it also forms no part of the present invention and could be of any type suitable for the purpose. In its elegant commercial embodiment, the translator might, for example, utilize a magnetic drum or magnetic core circuits. However, for patent purposes, the particular type of translator used is completely immaterial to the present invention, and it could comprise anything down to and including an operator who, when upon receiving information indicating the calling and called offices, could manually operate switches to transmit the needed information to the rate information relays. Again, this sort of setup would be commercially unattractive but completely feasible from a patent standpoint.

The overtime period of any call may be from 1 to 5 minutes duration. Table 1 on Fig. 55 shows how, for an overtime period of 3 minutes, the number of overtime periods may be computed in a call having from 0 minutes to 96 minutes of overtime. The procedure would be the same for overtime periods of different durations than three minutes. The terms quotient units 31, 32, and 33 on the left side of Table 1 plus the terms quotient tens low and quotient tens high on the lower right-hand side of Table 1 pertains to certain relays in the divider circuit as is described in detail hereinafter.

Table 2 on Fig. 56 shows the principle of the overtime multiplier which multiplies the number of overtime periods, as obtained from the divider circuit, by the overtime rate, as obtained from the rate information relays, to compute the overtime charge for the call. The overtime rate, which is the charge for a single overtime period, may vary from \$.05 to \$.95 in \$.05 steps. The upper section of the table contains data for the number of overtime periods from 10 to 90 in steps of 10. The lower portion of the table contains data for the number of overtime periods from one through nine. In both the upper and lower sections the overtime rate varies from \$.10 to \$.90 in steps of \$.10. Each section also has an overtime rate of \$.05 which is used in connection with the \$.10 to \$.90 charges for overtime rates from \$.15 to \$.95 in steps of \$.10.

The following illustrates the use of the overtime charge multiplier in computing the cost of a toll message. Assume the following data for a call: initial period charge \$1.40, overtime period charge \$.35, the elapsed time 46 minutes, initial period 3 minutes, overtime period 1 minute. The overtime portion of the call is therefore 46 minutes minus 3 or 43 minutes. Since the overtime period has been assumed to be 1 minute, the number of overtime periods also equals 43. From the upper section of the table we see that the charge for 40 overtime periods, each costing \$.30 is \$12.00, while the charge for 40 overtime periods at a nickel is \$2.00. From the lower section of the table we see that the charge for three overtime periods at \$.30 is \$.90, while the charge for three overtime periods at a nickel is \$.15. The initial period charge has been stated to be a \$1.40 and, therefore, the charge adder circuit adds the sum of \$12.00, \$2.00, \$.90, \$.15, and \$1.40 to arrive at a total charge of \$16.45 for the call.

The principal of operation of the charge adder is shown in greater detail on Table 3 of Fig. 60. The left-hand portion of this table shows the manner in which the various digits are arranged with respect to one another. The lower right-hand portion of this figure is an expanded version of the upper left-hand portion with the digits of the assumed example entered therein for purposes of illustration. The charge adder makes use of biquinary relay contact networks in the adding process. However, some of the information from the overtime charge multiplier is in decimal form. This results in some parts of the registers in the adder circuit being made up of decimal relays. However, the contact networks on these relays are all in biquinary from which results in the sum registers all being of the conventional biquinary form.

In the previously discussed example the initial period charge was \$1.40. This is entered in the top part of both sections of Table 3 in the columns representing dollar units, cents tens, and cents units. The darkened rectangles in the lower right-hand portion of Fig. 3 represent the digits entered therein. For example, the initial charge of \$1.40 is represented by the digit 1 in the dollar units column of the A register, the digit 4 in the biquinary form in the cents tens column of the A register, and by the digit 0 in the cents units column of the E register. In this column the rectangle designated "L" for low represents the digit 0 while the rectangle designated "H" for high represents the digit 5. The 0 in the cents units digit of the initial period charge is entered directly in the E register because none of the other sums with which we are concerned contain a digit in the cents units column.

The lower right-hand portion of Table 3 shows the manner in which the overtime charge is computed by the charge adder. The product of the tens digit of the number of overtime periods 43, and the tens digit of the overtime rate \$.30 is \$12.00 and is entered into the C register as a 1 in the dollar tens column and as a 2 in the dollar units column. The product of the tens digit of the number of overtime periods and the units digit of the overtime rate (40×\$.05) is \$2.00 and is entered in the D register as a 2 in the dollar units column and as a 0 in the cents tens column of the F register. The product of the units digit of the number of overtime periods and the units digit of the overtime rate (3×\$.30) is \$.90 and is entered in the B register as a 0 in the dollar units column and as a 9 in the cents tens column. The product of the units digit of the number of overtime periods by the units digit of the overtime rate (3×\$.05) is \$.15 and is entered directly into the F register as a 1 in the cents tens column and as a 5 in the cents units column. The sum of the A and B registers, together with the cents units digit entered directly into the E register, is all added and entered into the E register as a 0 in the dollar tens column, a biquinary 2 in the dollar units column, a biquinary 3 in the cents tens column, and a 0 in the cents units column. Similarly, the sum of the digits in the C and D registers, together with the cents units digit already entered directly into the F register, is added and entered into the F register as a biquinary 1 in the dollar tens column, a biquinary 4 in the dollar units column, a biquinary 1 in the cents tens column, and a 5 in the cents units column. Next the quantities in the E and F registers are added and the sum thereof is entered into the G register as a biquinary 1 in the dollar tens column, a biquinary 6 in the dollar units column, a biquinary 4 in the cents tens column, and a binary 5 in the cents units column, thereby giving the previously arrived at total of \$16.45 for the total charge of the call.

The information in the output of the charge adder is sent to the appropriate relays in the rating register which are operated to represent the charge of \$16.45. The output of the charge adder is also sent to the tax rate selector circuit, which determines the applicable tax rate for the call, and to the tax multiplier circuit which multiplies the total charge by the applicable tax rate to compute the chargeable tax.

In order that some of the refinements of the tax rate circuit and the tax multiplier circuit may be appreciated, the following description will be made under the assumption that the applicable tax structure is of the type in use a few years previous, wherein the applicable tax rate for the call depended upon the total charge. The tax rate selector determines which one of two tax rates is applicable for each toll call. When the total charge is less than a certain amount, the low rate applies, and when it is above this amount, the high rate applies. The transition point between the high and low rates is cross-connectable in \$.05 steps up to \$.95. With the previous tax structure the tax was 15 percent for charges of \$.20 or less and 25 percent for charges of \$.25 and up. Which tax rate is to be used for each call is determined by the tax rate selector and is based on the total charge.

The tax multiplier is shown on Table 4 in Fig. 57. The left-hand section is for the 10, 20, 30, and 40 percent rates while the right-hand section is for the 1, 2, 3, 4, 5, 6, 7, 8, and 9 percent rates. The top part of the table contains the tax that applies to charges of $10.00, $20.00, $30.00, $40.00, $50.00, $60.00, $70.00, $80.00, and $90.00. Below these are taxes applicable to charges of $1.00 to $9.00 in $1.00 steps while below these are the taxes applicable to the charges of $.10 to $.90 in $.10 steps. At the bottom of the table are the taxes applicable to a charge of $.05. The total tax for any one call is the sum of the above-mentioned segments.

To illustrate the use of the tax multiplier circuit, let us continue with the aforementioned example, wherein the total charge for the call was $16.45. Under our assumed tax structure, the 25 percent rate would apply. The total tax for this call may be computed by the partial products method as follows: the product of the tens digit of the charge and the tens digit of the tax rate ($10.00×20%) is $2.00, as shown in the upper left-hand portion of the table. The product of the tens digit of the tax rate and the units dollar digit of the charge (20%×$6.00) is $1.20, as shown in the left middle portion of the table. The product of the tens digit of the tax rate and the cents tens digit of the charge (20%×$.40) is $.08 and is shown in the left-lower portion of the table. The product of the tens digit of the tax rate and the cents units of the charge (20%×$.05) is $.01 and is shown in the bottom left-hand portion of the table.

The product of the units digit of the tax rate and the dollar tens digit of the charge (5%×$10.00) is $.50 and is shown in the upper right-hand portion of the table. The product of the units digit of the tax rate and the dollar units digit of the charge (5%×$6.00) is $.30 and is shown in the middle right-hand portion of the table. The product of the units digit of the tax rate and the cents tens digit (5%×$.40) is $.02 and is shown in the lower right-hand portion of the table. The product of the units digit of the tax rate with the cents units digit of the charge (5%×$.05) is $.0025 and is shown in the bottom right-hand portion of the table. These charges may be added together as follows to arrive at the total tax of $4.1125.

| | | | |
|---|---|---|---|
| 20% | of $10.00 | = | $2.00 |
| 20% | of 6.00 | = | 1.20 |
| 20% | of .40 | = | .08 |
| 20% | of .05 | = | .01 |
| 5% | of 10.00 | = | .50 |
| 5% | of 6.00 | = | .30 |
| 5% | of .40 | = | .02 |
| 5% | of .05 | = | .0025 |
| Total tax | | = | $4.1125 |

Table 5 on Fig. 61 shows the manner in which the various bits of information in the tax multiplier are added together. The quantity of $2.00, which represents the product of the dollar tens digit of the total charge and the tens digit of the tax rate, is entered as a 0 in the dollar tens column and as a 2 in the dollar units column in the H register. The quantity $1.20, which represents the product of the dollar units digit of the total charge by the tens digit of the tax rate, is entered as a 1 in the dollar units column and as a 2 in the cents tens column of the J register. The amount of $.08, which is the product of the cents tens digit of the total charge by the tens digit of the tax rate is entered as a 0 in the cents tens column and as an 8 in the cents units column of the H register. The amount of $.01, which is the product of the cents units digit of the total charge by the tens digit of the tax is entered as a 1 in the cents units column of the J register and as a 0 in the mills units column of the L register.

The amount of $.50, which is the product of the dollar tens digit of the total charge by the units digit of the tax rate, is entered as a 0 in the dollar units column and as a 5 in the cents tens column of the K register. The sum of $.30, which is the product of the dollar units digit of the total charge and the units digit of the tax rate, is entered as a 3 in the cents tens column of the L register and as a 0 in the cents units column of the L register. Next, the amount of $.02, which is the product of the cents tens digit of the total charge by the units digit of the tax rate, is entered as a 2 in the cents units column and as a 0 in the mills units column of the K register. Finally the sum of $.0025, which is the product of the cents units digit of the total charge by the units digits of the tax rate, is entered as a 2 in the mills units column in the L register and as a 5 in the one-half mill column of the P register.

The tax adder now adds the amount standing in the H, J, and M registers and enters the sum of $3.29 into the M register as a 0 in the dollar tens column, a biquinary 3 in the dollar units column, a biquinary 2 in the cents tens column, and a biquinary 9 in the cents units column. This amount is the sum of the previously entered quantities.

Next, the amount of $.82, which is the sum of the quantities now in the K, L, and N registers, is entered into the N register as a biquinary 0 in the dollar units column, as a biquinary 8 in the cents tens column, and as a biquinary 2 in the cents units column.

The machine now adds the $3.29 in the M register to the $.82 in the N register; together with the $.002 in the mills units column of the L register and with the $.0005 in the half-mill column of the P register to arrive at the sum of $4.1125 which is entered into the P register as a 0 in the dollar tens column, a biquinary 4 in the dollar units column, a biquinary 1 in the cents tens and cents units columns, a biquinary 2 in the mills units column and a half mill in the half-mill column. This sum of $4.1125 represents the total tax chargeable to our hypothetical call.

The above addition is performed in the tax adder circuit. The total tax, as computed by the tax adder, is transmitted to the appropriate registers in the rating registers in the tape-to-card converter. These registers now contain all the necessary information to enable the proper subscriber to be billed for the call. The rating registers operate the output registers and then release to await reoperation by the input registers when the data from the next call is received. The output registers control the card punch which perforates on an I.B.M. card all the data in the output registers.

The output cards from the tape-to-card converter are collected, stored, and at a later time are processed by a series of I.B.M. machines, the end one which produces a printed form containing the toll calls made by each subscriber together with the cost and tax for each call.

*Detailed description*

Figure 1:
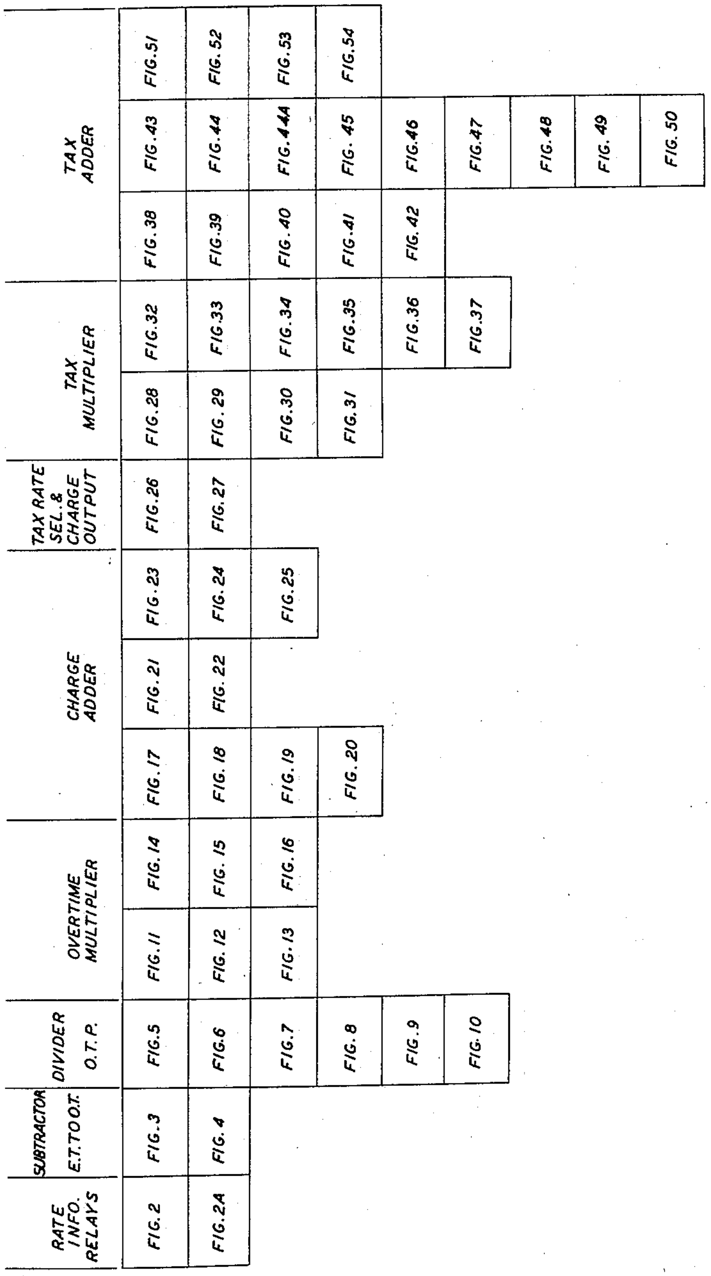

In this portion of the specification the circuit operations are described in detail in connection with the processing of the same hypothetical call, already discussed to some extent, for which the following data is applicable:

Initial period charge $1.40 Overtime period charge $.35
Elapsed time 46 minutes Initial period 3 minutes
Overtime period 1 minute From the previously discussed computations it has been shown that the overtime is 43 minutes and that this is also the number of overtime periods. The total charge of the call was computed to be $16.45 while the tax was found to be $4.1125.

Before proceeding with the circuit description it is believed that a few comments about the drawings will be beneficial. The drawings contain the detached contact form of circuit presentation in which each relay contact is not necessarily shown adjacent its winding but, instead, is shown in connection with the circuit it controls. This mode of presentation is well known and is considered by many to be the superior way of disclosing complicated circuits.

In this type of presentation a normally open relay contact is represented by an X that is superimposed on a wire. A circuit can be traced through a wire containing one of these X contacts only when the related relay is operated.

There are many instances where relay contacts appear in repetitious easily understood patterns, one above the other on the same sheet of drawings. In these instances only the top group of contacts are labeled with relay designations since the identity of a contact in any lower group can be easily ascertained by referring to the designation of its correlative in the top group. For example, with respect to Fig. 5 there are four groups of contacts designated OTT0 through OTT9. These groups are placed one under the other and only the contacts in the top group have relay designations since the identity of a contact in any lower group can be ascertained by referring to its correlative in the top group.

This same method of designating contacts is followed on other sheets, such as 13, where the contacts do not appear to be arranged in a prescribed pattern. On sheets, such as these, the relay designations are placed on the top and all contacts in the vertical column under each designation are associated with the relay indicated by the designation. For example, the five relay contacts underneath the designation OTRT9 are all contacts of this relay.

Contact numbers have been assigned to the relay contacts which are contained in the specific circuit paths described herein. These contact numbers should not be confused with the relay designations associated with the same contacts. As an aid in avoiding confusion, the numbered contacts are associated with their numbers by a lead line while the relay designations of the various contacts are above the contacts as hereinbefore described. Only the contacts are numbered that are contained in the circuit paths described in connection with the processing of the hypothetical call. The rest of the contacts are not numbered since it is believed that the numbering of each and every contact would have only served to increase the complexity of the drawings without any ensuing beneficial results.

*Rate information relays*

Figure 2:
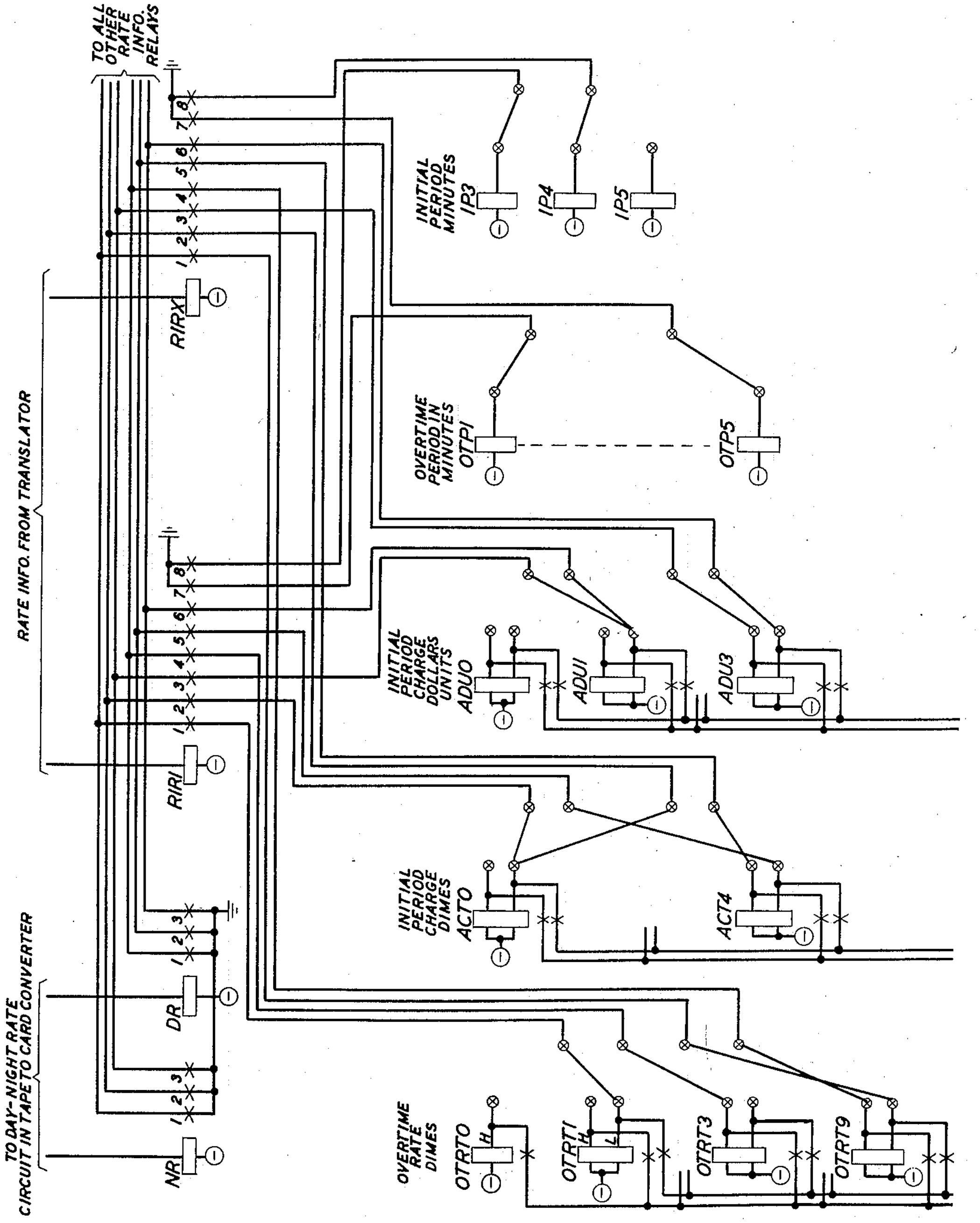
Figure 2A:
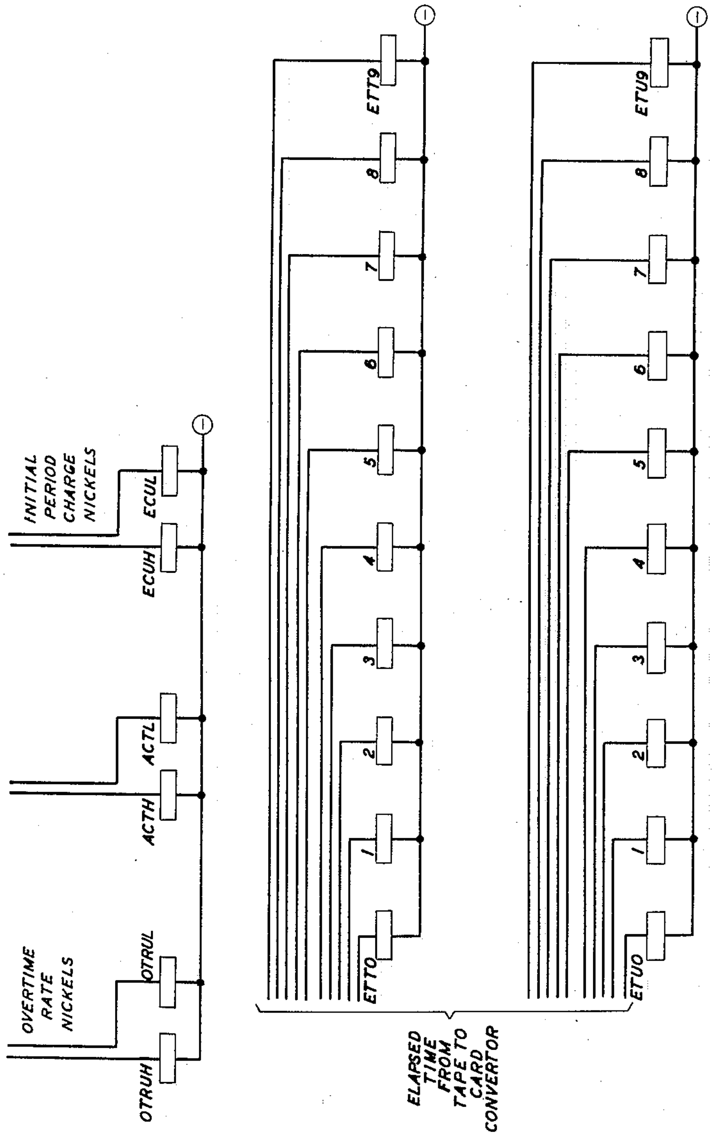

These relays, which are shown on Figs. 2 and 2A, receive information both from the rating registers in the tape-to-card converter and from the translator. They store this information and use it to control operation of the various individual circuits comprising the charge and tax computer. One of the first bits of information received is the elapsed time of the call which is received from the rating registers and is stored in the elapsed time relays shown on Fig. 2A by the two groups of relays designated ETT0 through ETT9 and ETU0 through ETU9 which store the tens digit and the units digit, respectively, of the minutes of elapsed time.

The translator receives the identity of the calling and called offices from the tape-to-card converter, and, in response thereto, transmits to the rate information relays six bits of information; the initial charge for the day rate, the initial charge for the night rate, the initial period, the overtime period, the overtime rate for the day, and the overtime rate for the night. It has been found that, although there is a vast number of combinations of calling and called offices, many of these possible combinations of offices have a rather limited number of combinations of rate data as represented by the above six bits of rate information. Therefore, instead of having the translator furnish this information directly to the rate information relays, it was found preferable to have the translator operate one of a plurality of rate input relays in the rate information circuit, each one of which relays represents a certain combination of the six bits of information the translator would otherwise have to supply. This simplifies the job of the translator since, once it receives the calling and called office information, it merely operates the proper one of the rate input relays which, in turn supplies the necessary data to the rate information relays. The closure of the contacts of the rate input relays, by means of suitable cross-connections, operates the proper ones of the rate information relays to indicate the overtime rate, the overtime period, the initial period charge, and the initial period.

Continuing with our hypothetical call, the rating registers in the tape-to-card converter transmit the elapsed time, 46 minutes, to the elapsed time relays shown on Fig. 2A. The rating registers supply this information by applying a ground to one side of the winding of relays ETT4 and ETU6 which represent the tens and units digits, respectively, of the elapsed time of 46 minutes. Both of these relays now operate by virtue of the battery potential on their other winding terminals. The contacts of the elapsed time relays are shown in connection with the subtracter circuit where they control the computation of the overtime portion of the call.

At this time, the translator has already received the identity of the calling and called offices from the rating registers and, in turn, has determined which one of the rate input relays on Fig. 2 is to be operated to supply the correct charge data for the call between the two offices involved in this call. Let it be assumed, for purposes of discussion, that the translator has determined that rate input relay R1R1 should be operated to represent the charge data for our hypothetical call. In this case, the translator applies a ground to relay R1R1 which operates by virtue of the battery on the other side of its winding.

The closure of contacts 8 of relay R1R1 applies a ground to the terminal strip shown adjacent the initial period minutes relays on Fig. 2. The particular terminal strip punching to which this wire is connected, is cross-connected to the winding of relay IP3 which now operates to represent an initial period of 3 minutes. Had the initial period for our call been other than 3 minutes, the particular punching on the terminal strip to which contact 8 of relay R1R1 is connected would have applied ground to some other initial period relay, by means of a different cross-connection. In a similar manner, contacts 7 of relay R1R1 operated apply a ground through the terminal punchings and cross-connections to operate relay OTP1 which represents the overtime period of 1 minute.

At this time, the rating registers have transmitted information pertaining to whether the day rate or night rate is to apply. Let it be assumed that our hypothetical call was made during the daytime and not on a Sunday or holiday, and therefore, the day rate is to apply. In this event, the relay DR representing the day rate is operated by a ground from the rating registers. At this time, relays DR and R1R1 are both operated and, therefore, a ground is extended from contacts 2 and 3 of relay DR, through contacts 5 and 6, respectively, of relay R1R1, through terminal punchings and cross-connections to operate relays ACT4 and ADU1, respectively, as well as relays ACTL and ECUL, respectively. These four operated relays together represent the initial period charge of $1.40.

The dollars digit of the initial period charge is represented by the operated one of the relays ADU0 through ADU3. Four of these relays are sufficient for the purpose since the initial period charge cannot exceed $3.95 and, therefore, a 3 is the largest number needed to represent the dollars digit. Relays ECUH and ECUL represent the cents units digits of 0 and 5, respectively. These two relays in combination with relays ADU0 through ADU3, all of which are double winding relays, enable a single contact on the operated rate input relays to operate the proper one of relays ADU0 through ADU3, together with either relay ECH or ECL to represent either the amount of $.00, $1.00, $2.00, and $3.00 or $.05, $1.05, $2.05, and $3.05.

Relays ACT0 through ACT4 together with relays ACTL and ACTH provide a biquinary means of storing the cents tens digit of the initial period charge. The initial period charge has been assumed to be $1.40 and, therefore, relays ACT4 and ACTL are operated to represent the amount of $.40. Relays ADU1 and ECUL are also operated to represent the amount of $1.00. Therefore, these four relays together represent the initial period charge of $1.40. If the initial period charge had been $1.45 instead of $1.40, relay EUCH would have operated instead of relay ECUL and would have represented the increased $.05 of the initial period charge. The contacts of the initial period charge relays are shown associated with the charge adder where they are used to control the operations of that circuit.

A ground is also extended at this time from contacts 1 of relay DR operated, through contacts 4 of relay R1R1 operated, through the terminal punchings and cross-connections to operate relays OTRT3 and OTRUH, which together represent the overtime charge of $.35. Relays OTRT0 through OTRT9 represent the cents tens digit of the overtime rate while relays OTRUL and OTRUH represent the cents units digits of 0 and 5, respectively. Relay OTRUL operated, together with one of relays OTRT0 through OTRT9, represents an overtime rate of $.00, $.10, $.20, $.30, $.40, $.50, $.60, $.70, $.80, and $.90 while relay OTRUH operated, together with one of relays OTRT0 through OTRT9, represents an overtime rate of $.05, $.15, $.25, $.35, $.45, $.55, $.65, $.75, $.85, and $.95. The contacts of the overtime rate relays are shown associated with the overtime multiplier where they are used to control the computation of the overtime charge.

It has been shown how the translator, upon the reception of the calling and called office data, operated relay R1R1 whose contacts closed circuits which operated other relays to represent the charge data for our hypothetical call. There may be as many rate input relays as is necessary, and the translator, upon the reception of the calling and called office data for a call between any two offices, will operate the proper rate input relay, which in a manner similar to that already described, will in turn, operate the necessary other relays to represent the proper charge data.

The use of terminal strips and cross-connections provides extreme circuit flexibility with the result that it is a simple matter to change the circuit connections as the toll rate or any of the other billing data associated with these circuits change.

*Subtracter*

Figure 3:
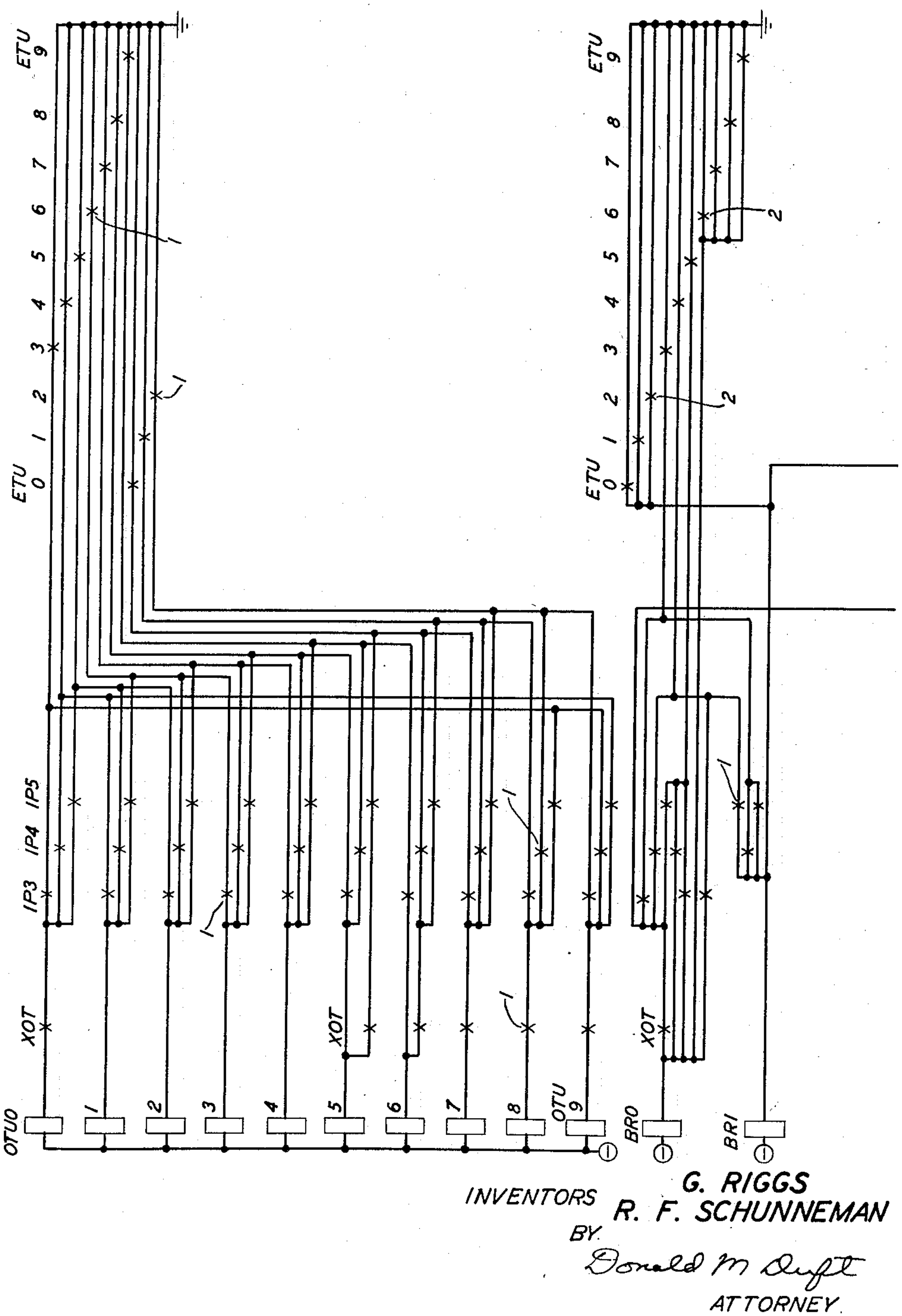
Figure 4:
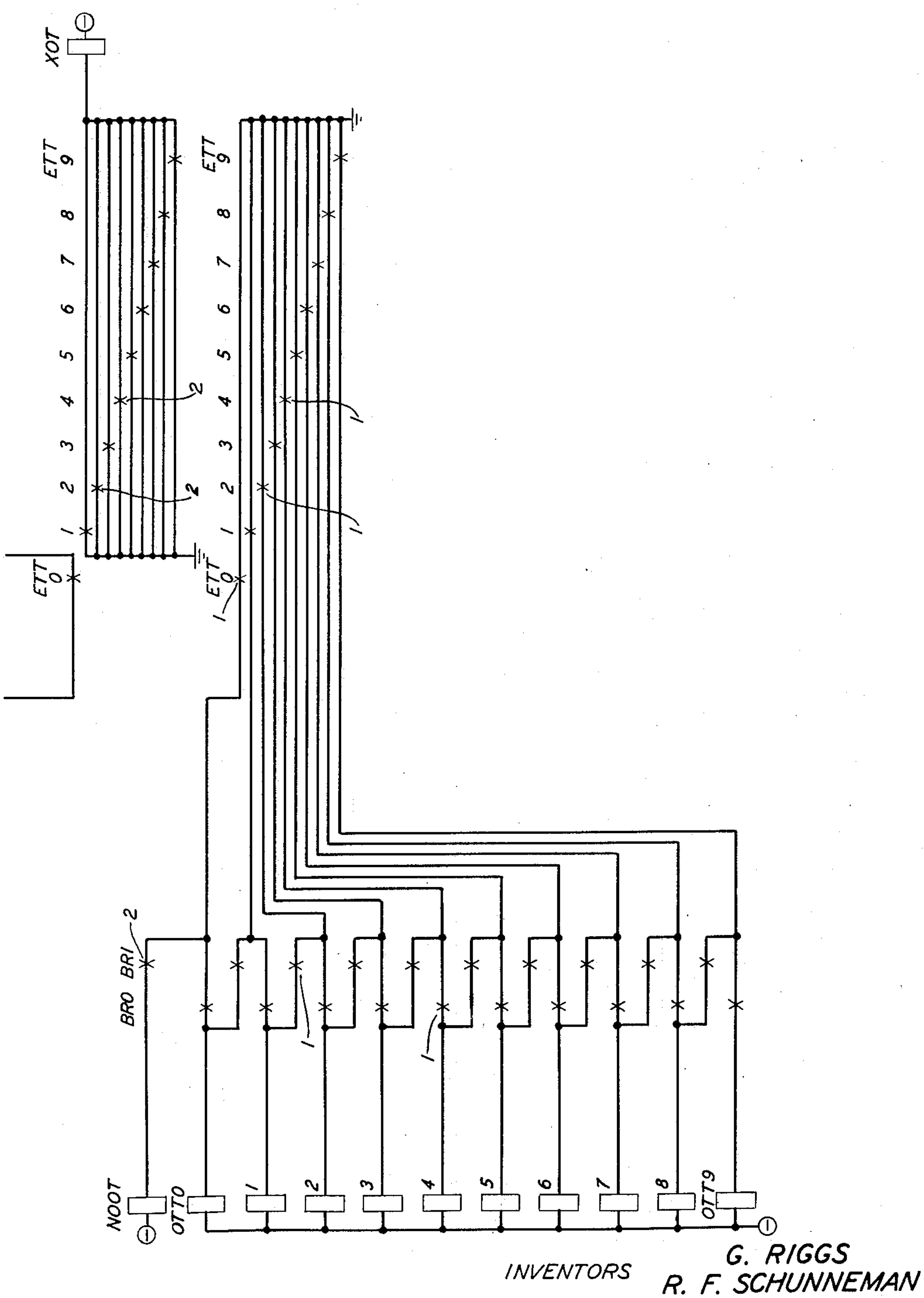

The subtracter circuit is shown on Figs. 3 and 4. This circuit receives the elapsed time data in the form of operated contacts of relays ETT— and ETU— and the initial period data in the form of operated contacts on one of relays IP3, IP4 or IP5. It subtracts the initial period from the elapsed time to obtain the overtime in minutes. It also operates relay NOOT which permits certain circuits to be by-passed when there is no overtime.

The circuits associated with relays OTU0 through OTU9 and relay XOT perform the units subtraction while the remaining relays including relays BR0 and BR1, which are associated with a borrow circuit, perform the tens digit subtraction. Both subtraction circuits are of the tabular type with all possible combinations of inputs and outputs being preset by contact connections. With this type of circuit, it is only necessary to energize the input relays in order to obtain the correct answer on the output relays.

In order to illustrate certain circuit features the following examples will be described:

1. Overtime with no borrowing.
2. Overtime with borrowing.
3. No overtime.

*Overtime with no borrowing*

In order to describe the circuits associated with this function, let us continue with our hypothetical call, in which the elapsed time was 46 minutes and an initial period was 3 minutes. Accordingly, the contacts of relays ETT4, ETU6, and IP3, are operated, as has been already described in connection with the rate information relay circuits.

A ground is now closed through contacts 1 of relay ETU6 operated and through contacts 1 of relay IP3 to operate relay OTU3. A ground is also closed through operated contacts 2 of relay ETU6 to operate relay BR0. The operation of relay BR0 completes a path from ground on operated contacts 1 of relay ETT4, through contacts 1 of relay BR0 to operate relay OTT4. Relay XOT is operated from the ground on closed contacts 2 of relay ETT4. The overtime output as computed by this circuit is 43 minutes and is represented by relays OTT4 and OTU3 operated. The contacts of the relays shown on Figs. 3 and 4 are shown in connection with the divider circuit where they are used to control the computation of the number of overtime periods.

*Overtime with borrowing*

In order to describe the circuit operations associated with this feature, let us assume that the elapsed time is 22 minutes and the initial period is 4 minutes thereby giving a resultant overtime of 18 minutes. Relay BR1 operates at this time from the ground on contacts 2 of operated relay ETU2. The operation of relay BR1 completes a circuit for the operation of relay OTT1 through contacts 1 of relay BR1 operated to ground on contacts 1 of relay ETT2 operated. Relay XOT is operated at this time from the ground on make contacts 2 of relay ETT2. A ground is now closed through make contacts 1 of relays ETU2, IP4, and XOT to operate relay OTU8. The computed overtime of 18 minutes is now represented by operated relays OTT1 and OTU8.

Relays BR0 and BR1 perform the borrow one function for the tens digit in this circuit. With relay BR0 operated the tens digit of the overtime is equal to the tens digit of the elapsed time. With relay BR1 operated the tens digit of overtime is always one less than the tens digit of the elapsed time. This is shown in our example where the operation of relay ETT2 operated relay OTT1 instead of OTT2 because relay BR1 was operated.

*No overtime*

In order to described this feature, let it be assumed that the elapsed time for the call is 4 minutes while an initial period is 5 minutes. There will then be no overtime and no overtime charge since the call did not last the full initial period.

Relays ETT0, ETU4, and IP5 are operated to represent an elapsed time of 4 minutes and an initial period of 5 minutes. Relay XOT is not operated at this time because relay ETT0 rather than one of relays ETT1 through ETT9, which are in the operation path of relay XOT, is operated. A ground is now supplied through the make contacts of relays ETU4 and IP5 to the open contacts of relay XOT which is in the operation path for relay OTU9. Relay OTU9, therefore, fails to operate. If the tens digit of the elapsed time had been other than a 0, relay XOT would have operated and the above path to operate relay OTU9 would have been closed to indicate an overtime units digit of 9. However, since there is no tens digit of the elapsed time from which a 1 could be borrowed, relay XOT is not operated and none of the overtime units relays can be operated. Relay BR1 is operated at this time from the ground on contacts 1 of relays IP5 and ETU4. The operation of relay BR1 closes a path from ground on contacts 1 of relays ETT0, through contacts 2 of relay BR1 to operate relay NOOT which represents a no overtime condition. None of relays OTT0 through OTT9 and OTU0 through OTU9 are operated and, therefore, no signal is sent to the divider from the subtracter.

The operation of relay NOOT transfers the initial period charge, which normally goes to the charge adder input, to the charge adder output. The divider, the overtime multiplier, and the charge adder are all bypassed in this condition since there is no overtime and therefore there is no need for their function.

*Divider*

The divider circuit, shown on Figs. 5 through 10, receives the overtime from the subtracter and the overtime period from the rate information relays and from this computes the number of overtime periods in the call. As was the case with the subtracter circuit, a tabular method of computing is used in which contacts are wired to represent all possible combinations of input data so that the obtaining of an answer on the output relays only requires the operation of the proper input relays. The number of relays that normally would be required is considerably reduced by the use of intermediate relays representing the quotients units, QU—, and quotients tens, QT—, which are used to exploit certain repetitive patterns that occur. This may be explained more readily with reference to Table 1 on Fig. 55 which shows the number of overtime periods in any given amount of overtime from 0 to 96 minutes where each overtime period is 3 minutes.

Across the top of this table are the overtimes having a tens digit of 0, 3, 6 or 9. Adjacent to each of these overtimes is the number of overtime periods in tens and units. Note that the units digit of the number of overtime periods in each of the 4 top sections has the same numerical pattern. The same is also true with respect to the middle row of decades which have a tens digit of 1, 4, and 7 for the overtime, as well as for the lower decades which have a tens digit of 2, 5, and 8 for the overtime. These repetitive patterns in each of the three groups enable a singler relay to be used for each group. Thus, the top group, which comprises four decades, has associated therewith the relay designated "Quotient Units 31." This is shown in the leftmost column on the top of Table 1. Similarly, the middle group of three decades has associated therewith the relay entitled "Quotient Units 32" while relay quotients units 33 is associated with the bottom group of the three decades.

The "Number of Overtime Period Units" digit patterns for overtime periods of 2, 4, and 5 minutes are also repetitious and in a similiar manner a single relay is associated with each similar group. The "Number of Overtime Period" circuits associated with an overtime period of 1 minute have no quotients units relay because no division is necessary where the overtime period equals 1 minute. In this case the number of overtime periods equals the numerical value in minutes of the total overtime.

The tens digit divider uses the quotients tens high (QTH) and quotients tens low (QTL) relays to reduce the number of contacts needed on the OTP2, OTP3, OTP4, and OTP5 relays. An examination of Table 1 shows that the tens digit on the number of overtime periods has 1 or 2 discrete values in each decade but never has more than 2. The four decades at the top of the table and the three decades in the center have no change in the tens digit of the number of overtime periods within any decade. Thus, there is a unique value for the tens digit of the number of overtime periods for each one of these seven decades. The three bottom decades experience a change of 1 in the tens digit of the number of overtime periods so that a transfer must be made depending upon the value of the units digit. The QTH and QTL relays perform this transfer in the tens dividing process and their energizing circuits are connected to take care of the transfer variation between the different values of overtime periods.

The circuit operations of the divider in processing the data for our hypothetical call will now be described in order to illustrate the various features of the circuit. Our call assumed an overtime of 43 minutes with an overtime period of 1 minute. Therefore, relays OTT4 and OTU3 are operated in the input circuit to represent the overtime of 43 minutes while relay OTP1 is operated to represent an overtime period of 1 minute. A circuit is closed at this time from ground on contacts 1 of relay OTT4 operated, through contacts 1 of relay OTP1 operated, to operate relay NOTPT4 on Fig. 6. A circuit is also closed from the ground on contacts 1 of relay OTU3 operated on Fig. 7 through closed contacts 2 of relay OTP1 to operate relay NOTUPU3. The operation of relays NOTPT4 and NOTPU3 together represent the tens and units digits, respectively, of the number of overtime periods 43. The contacts of these two operated relays along with the other output relays is shown associated with the multiplier circuit wherein they are used to control the computation of the overtime charge.

In order to describe some of the other circuit features of the divider, let us assume a more complicated set of data than that for the case which was just described. For example, let us assume an overtime of 96 minutes with an overtime period of 4 minutes. In this case the input relays OTT9 and OTU6 will be operated to represent the overtime of 96 minutes. Relay OTP4 will also be operated to represent an overtime period of 4 minutes.

Figure 5:
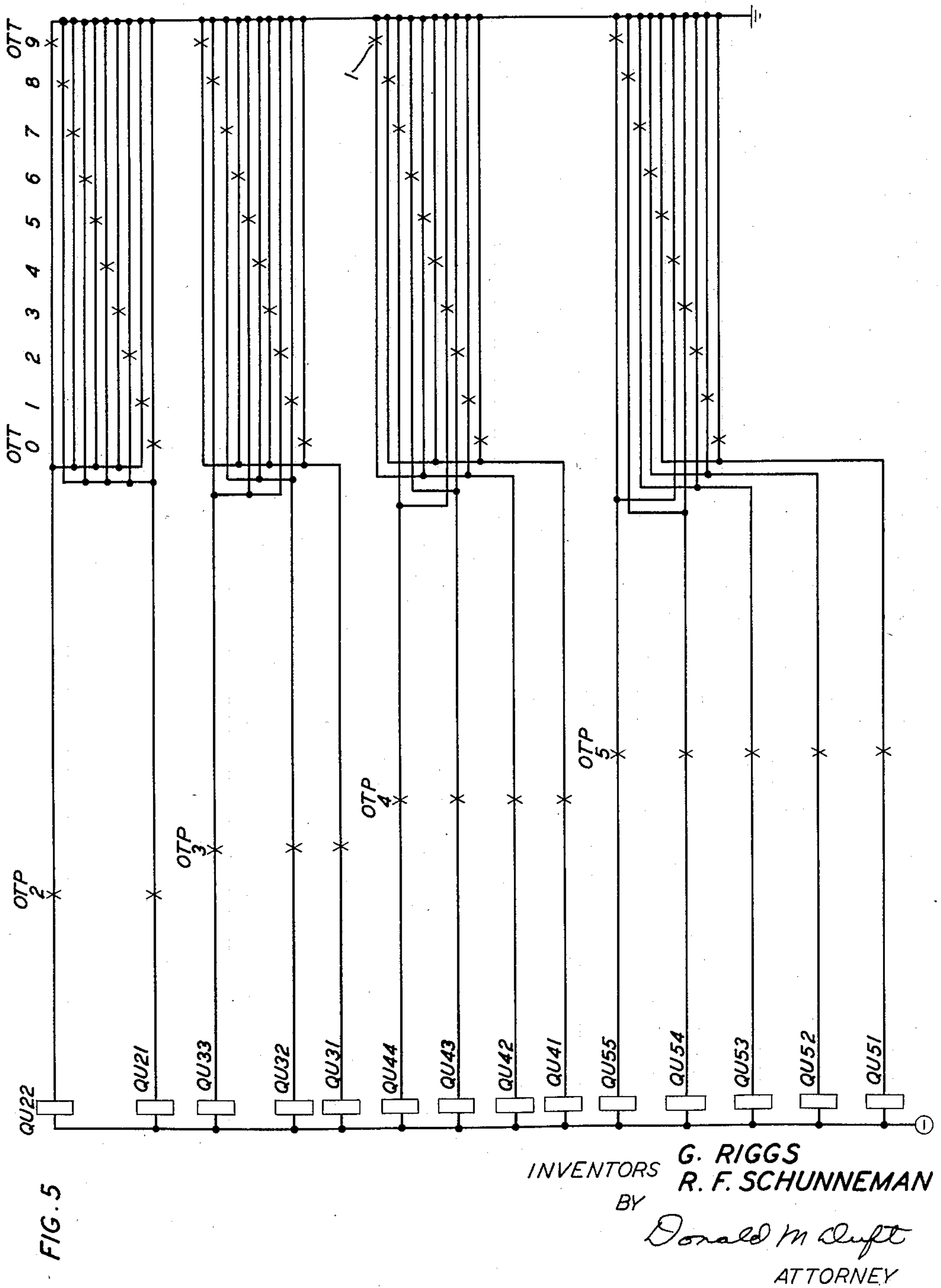
Figure 6:
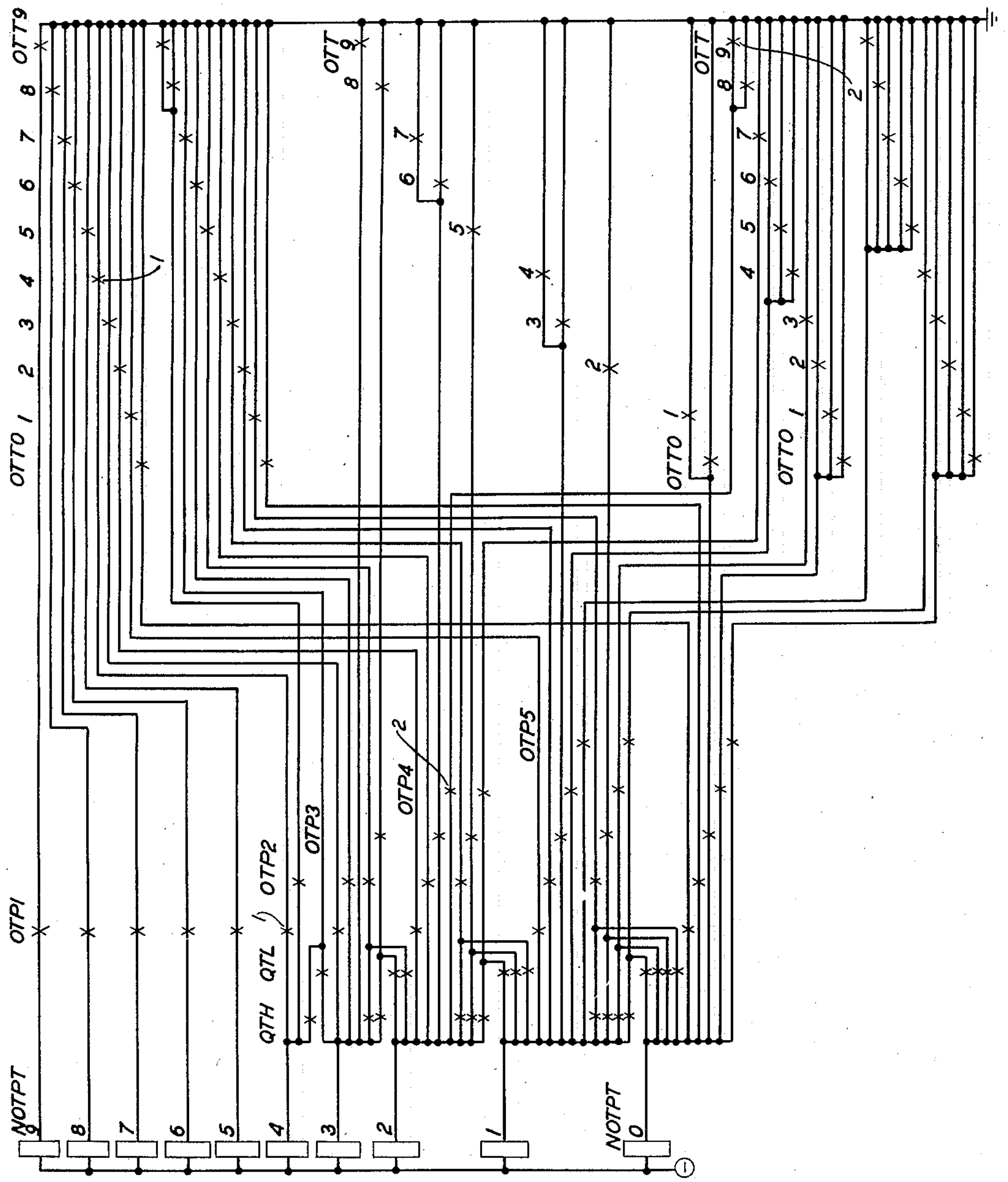
Figure 7:
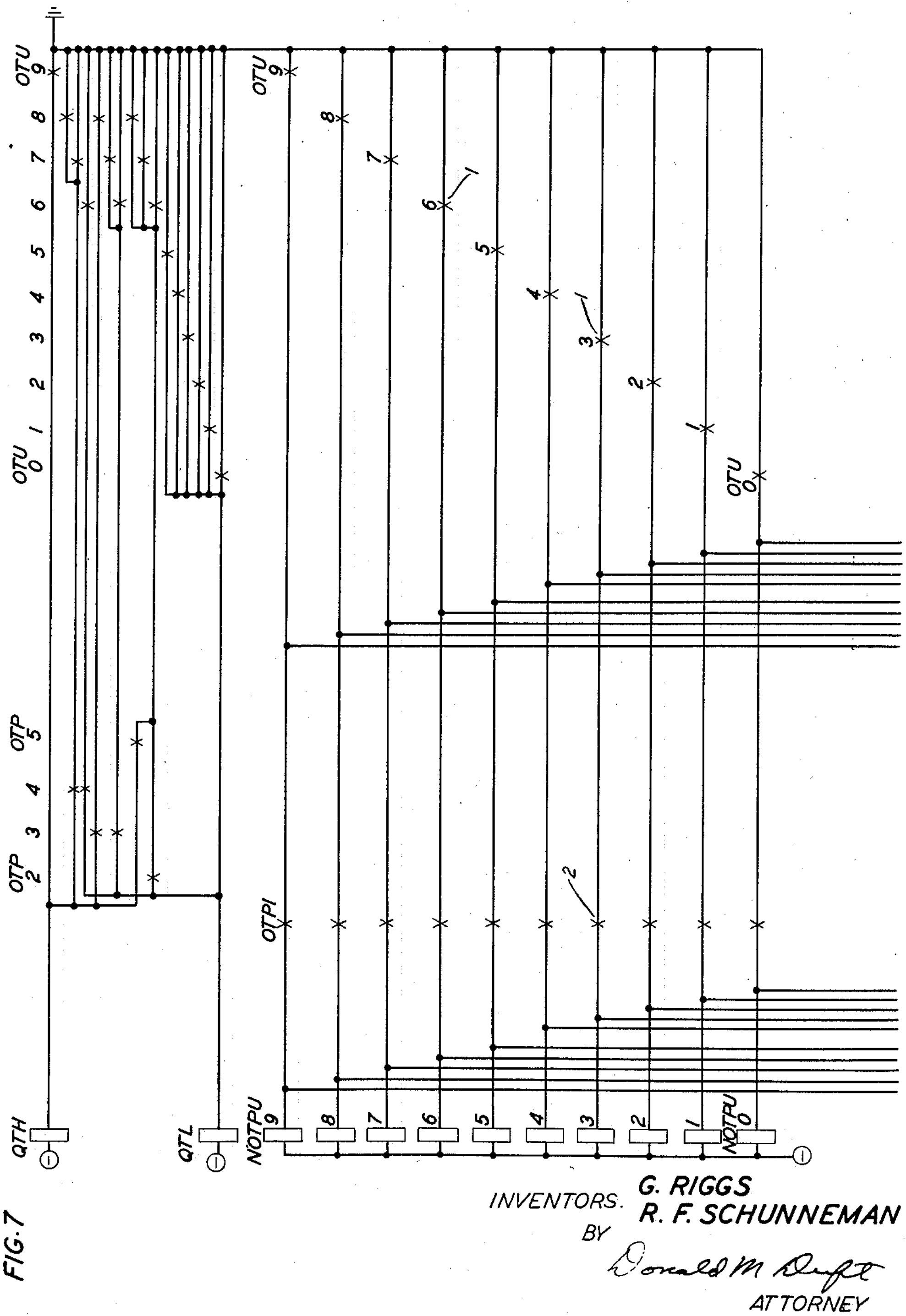
Figure 8:
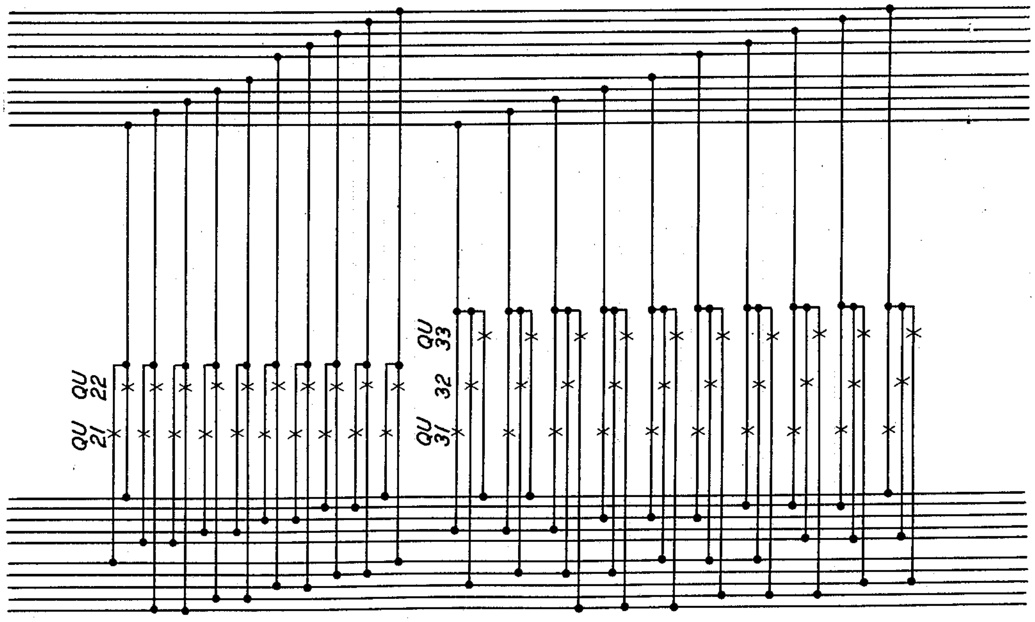
Figure 9:
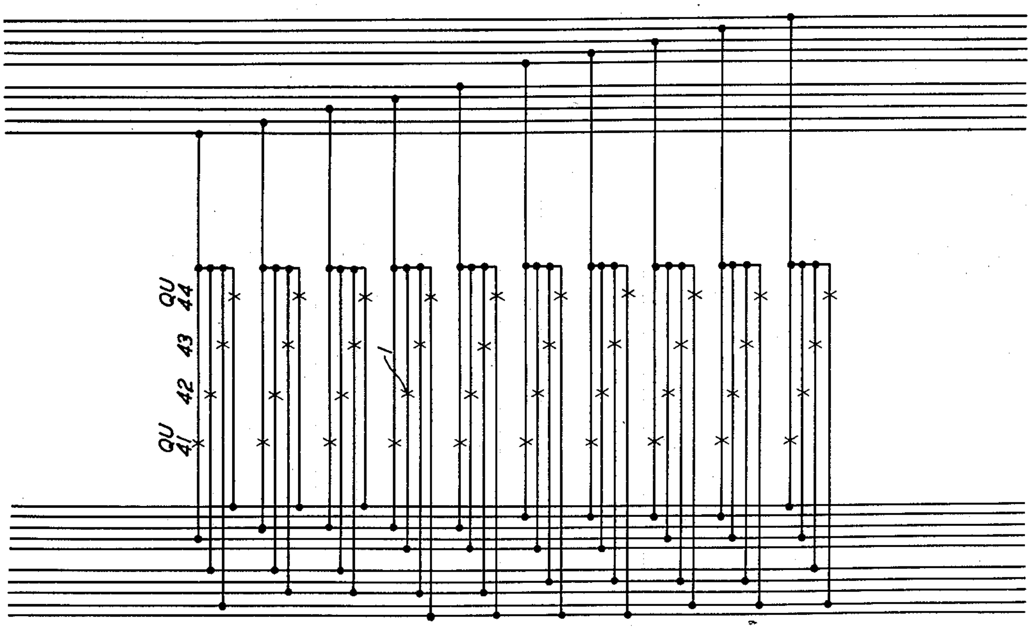
Figure 10:
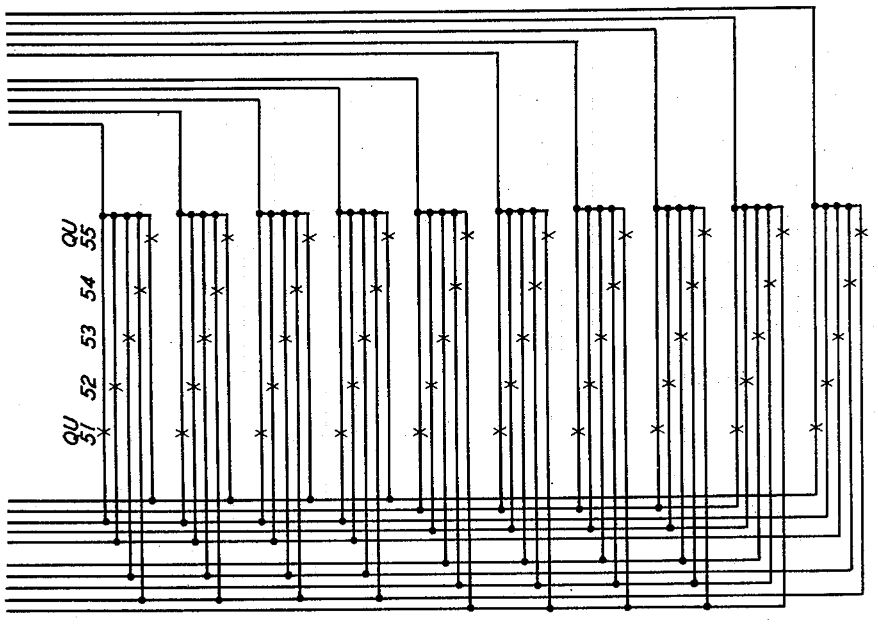
Figure 11:
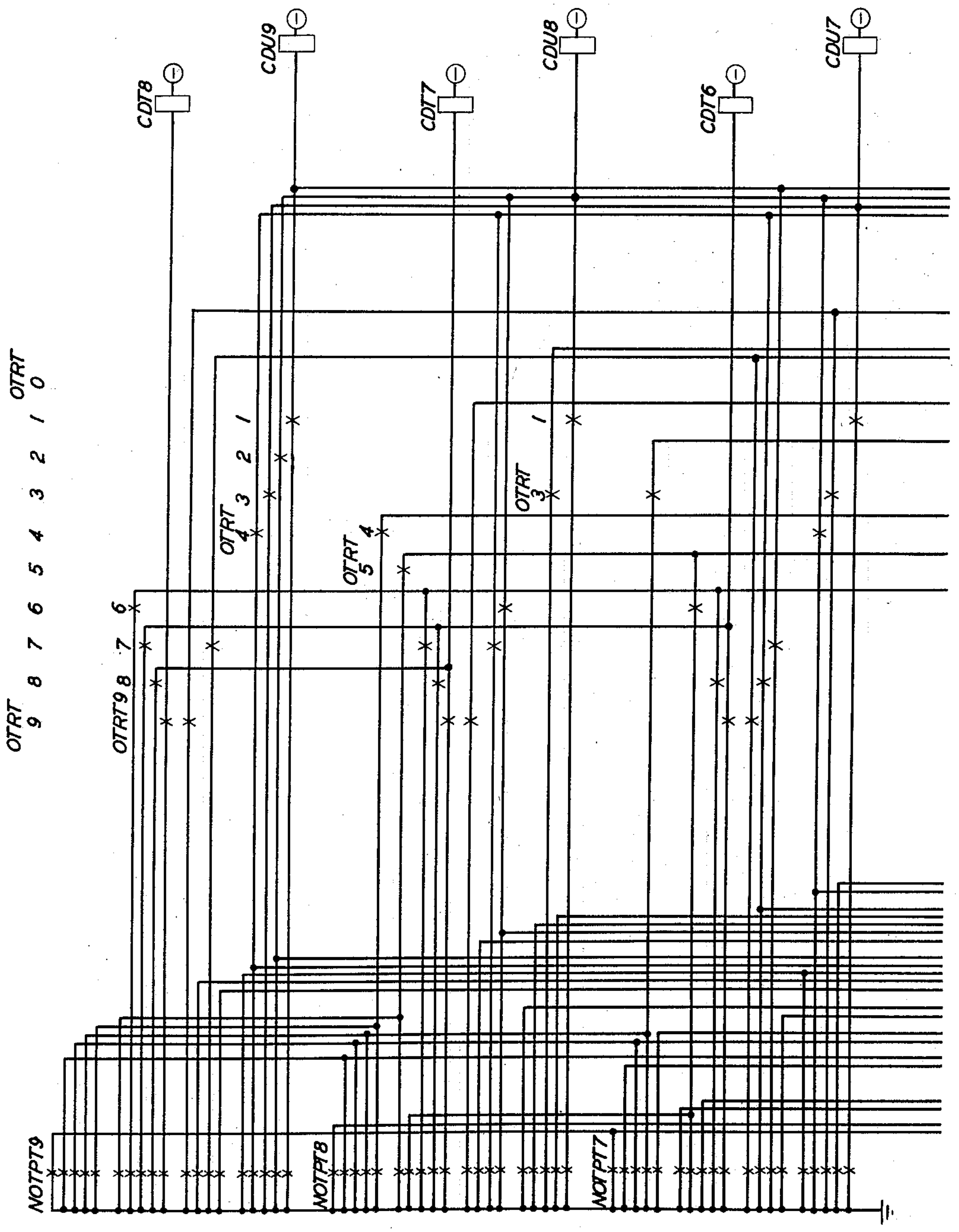
Figure 12:
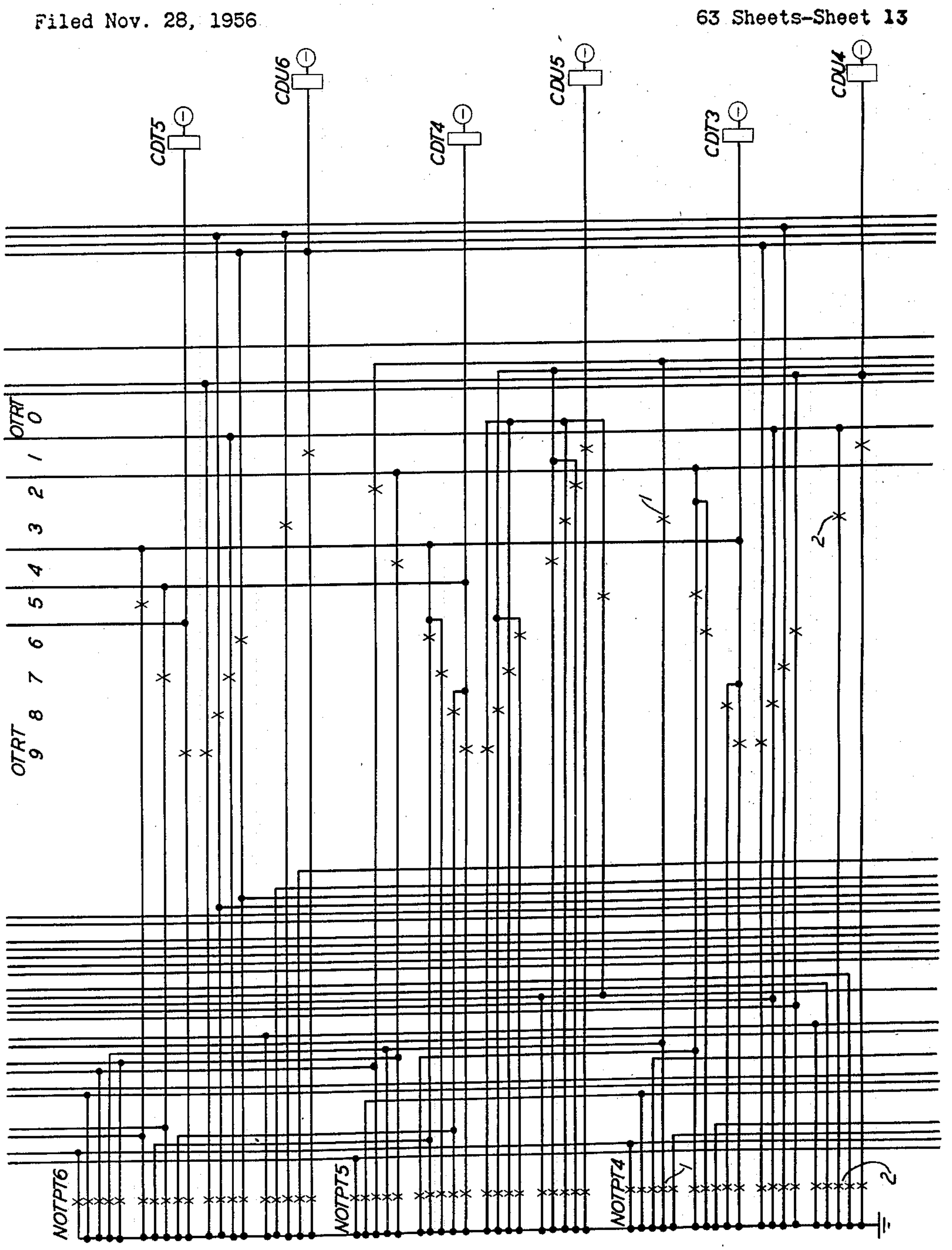

A circuit is now closed, as shown on Fig. 5, from ground on contacts 1 of relay OTT9, through closed contacts 1 of relay OTP4 to operate relay QU42. A circuit on Fig. 6 is now closed from ground on contacts 2 of relay OTT9, through contacts 2 of relay OTP4 operated to operate relay NOTPT2. Another circuit is closed from ground on contacts 1 of relay OTU6 operated, as shown in Fig. 7, through contacts 1 of relay QU42 operated (Fig. 9) to operate relay NOTPU4.

Relays NOTPUT2 and NOTPU4 together represent the tens and units digits, respectively, of the number of overtime periods of 24 which was computed by dividing 4 into 96.

*Multiplier*

The multiplier is shown on Figs. 11 through 16 of the drawings. This circuit multiplies the number of overtime periods (NOTP) by the overtime rate (OTR) to compute the overtime charge. The number of overtime periods may vary from 1 to 96 while the overtime rate may vary from $.05 to $.95 and therefore, the overtime charge may vary from $.05 to $91.20. The output of this circuit, which is the charge for the overtime portion of the call, comprises eight bits of information which is transmitted to the charge adder where the eight bits are totaled. This relationship is shown on Fig. 60 of the drawings where the left-hand portion represents the overtime multiplier and the lower right-hand portion represents the input to the charge adder circuit.

It may be seen from a study of this figure that the output of the overtime multiplier is entered into the charge adder in the following manner. The product of the tens digit of the number of overtime periods and tens digit of the overtime rate comprises two bits of information and is entered into the dollar tens and dollar units columns of the C register. The product of the tens digit of the number of overtime periods and the units digit of the overtime rate comprises two bits of information which are entered into the dollar units column of the D register and the cents tens column of the F register. The product of the units digit of the number of overtime periods and the tens digit of the overtime rate comprises two bits of information and is entered into the dollar units and cents tens columns of the B register. The product of the units digit of the number of overtime periods and the units digit of the overtime rate comprises two further bits of information and are entered into the cents tens and cents units columns of the F register. These eight bits of information, which together represent the overtime charge of $15.05, are added to the initial charge of $1.40 in the charge adder to compute the total charge of $16.45.

The circuits of the charge adder will now be described in connection with the previously assumed data for our hypothetical call in which the number of overtime periods is 43 and the overtime rate is $.35. The figure of 43 for the number of overtime periods is manifested by the closure of relay contacts NOTPT4 and NOTPU3. The windings of these relays are shown associated with the divider circuit which computed the number of overtime periods by dividing the total overtime portion for the call by the duration of a single overtime period. The figure of $.35 for the overtime rate is manifested by the closure of relay contacts OTRT3 and OTRTU5. The windings of these two relays are shown associated with the rate information relays. The closure of relay contacts NOTPT4, NOTPU3, OTRT3, and OTRTU5, comprises the necessary input data for this circuit so that its output relays may be operated to represent the overtime charge for the call.

Figure 13:
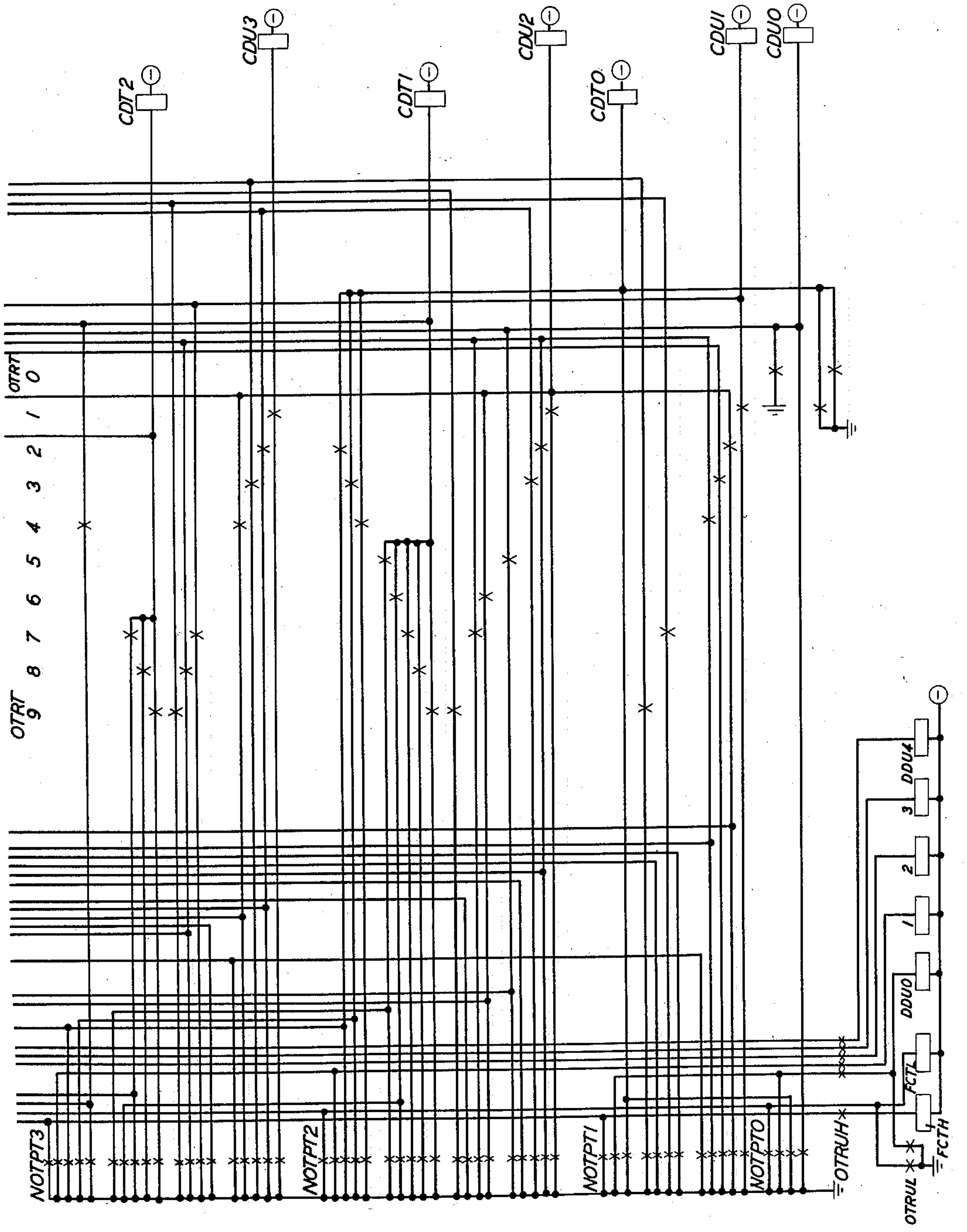
Figure 60:
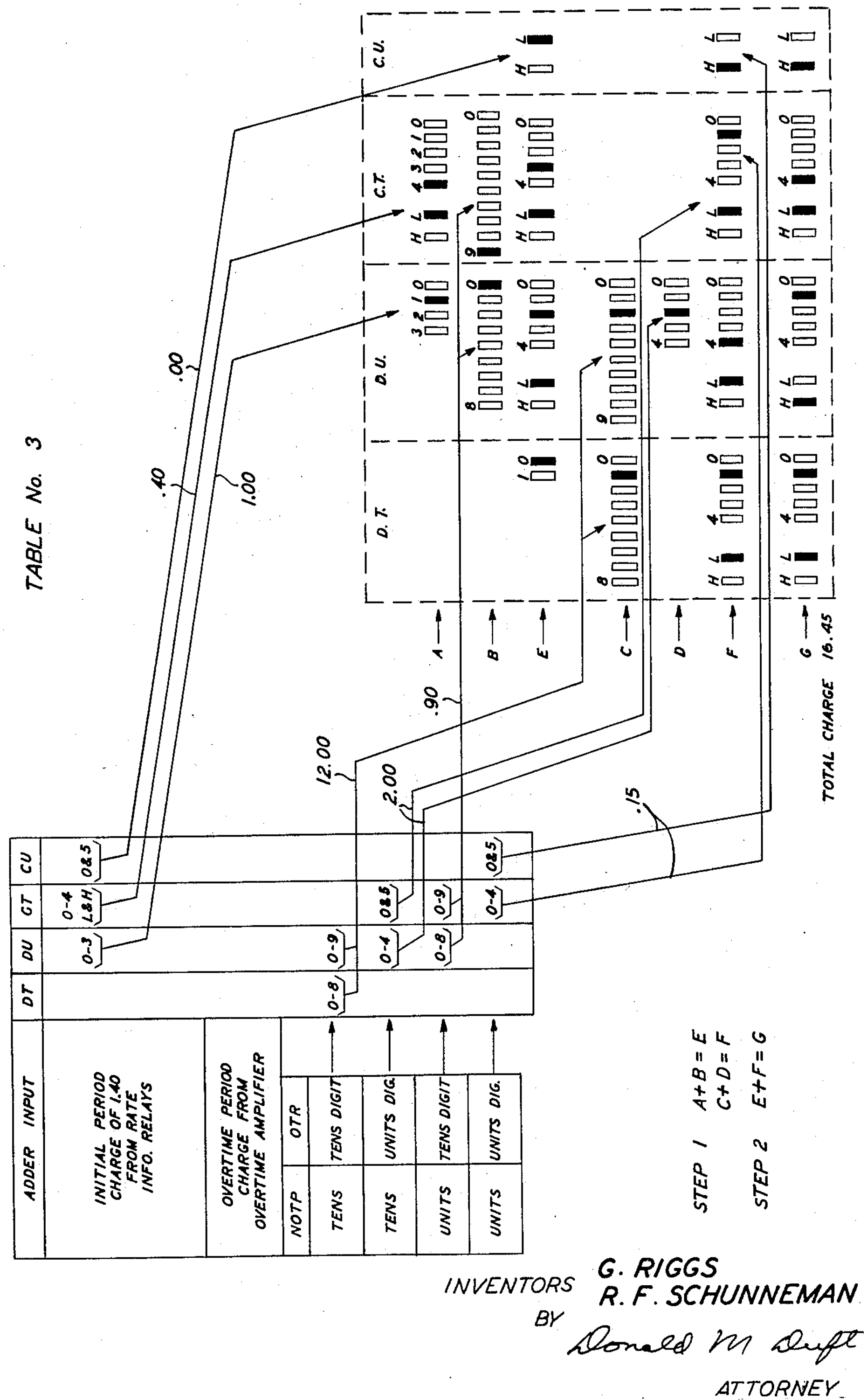

It is believed that a reference to Fig. 60 will be helpful in connection with the following description of the overtime multiplier. The amount of $12.00, which is the product of the tens digit of the number of overtime periods by the tens digit of the overtime rate, is indicated in the output circuit of the overtime multiplier by the operation of relays CDT1 and CDU2, which together represent a dollar tens digit of 1 and a dollar units digit of 2 in the C register. Relay CDT1 is shown on Fig. 13 of the drawings and is operated from a ground on contacts 1 of relay NOTPT4 operated, through contacts 1 of relay OTRT3 operated, to the winding of relay CDT1. Relay CDU2, which is also on Fig. 13, is operated from ground on contacts 2 of relay NOTPT4 operated, through contacts 2 of relay OTRT3 operated, to the winding of relay CDU2.

The quantity $2.00, which is the product of the tens digit of the number of overtime periods and the units digit of the overtime rate, is manifested in the output circuit of the overtime multiplier by the operation of relays DDU2 and FCTL. The operation of relay DDU2 represents a dollar units digit of 2 in the D register while the operation of relay FCTL represents a cents tens digit of 0 in the F register. Relay DDU2 which is shown in Fig. 13 is operated through a contact of relay OTRUH from a ground on the contacts of relay NOTPT4 operated. Relay FCTL, which is also shown on Fig. 13, is operated directly from a ground on the contacts of relay NOTPT4.

Figure 14:
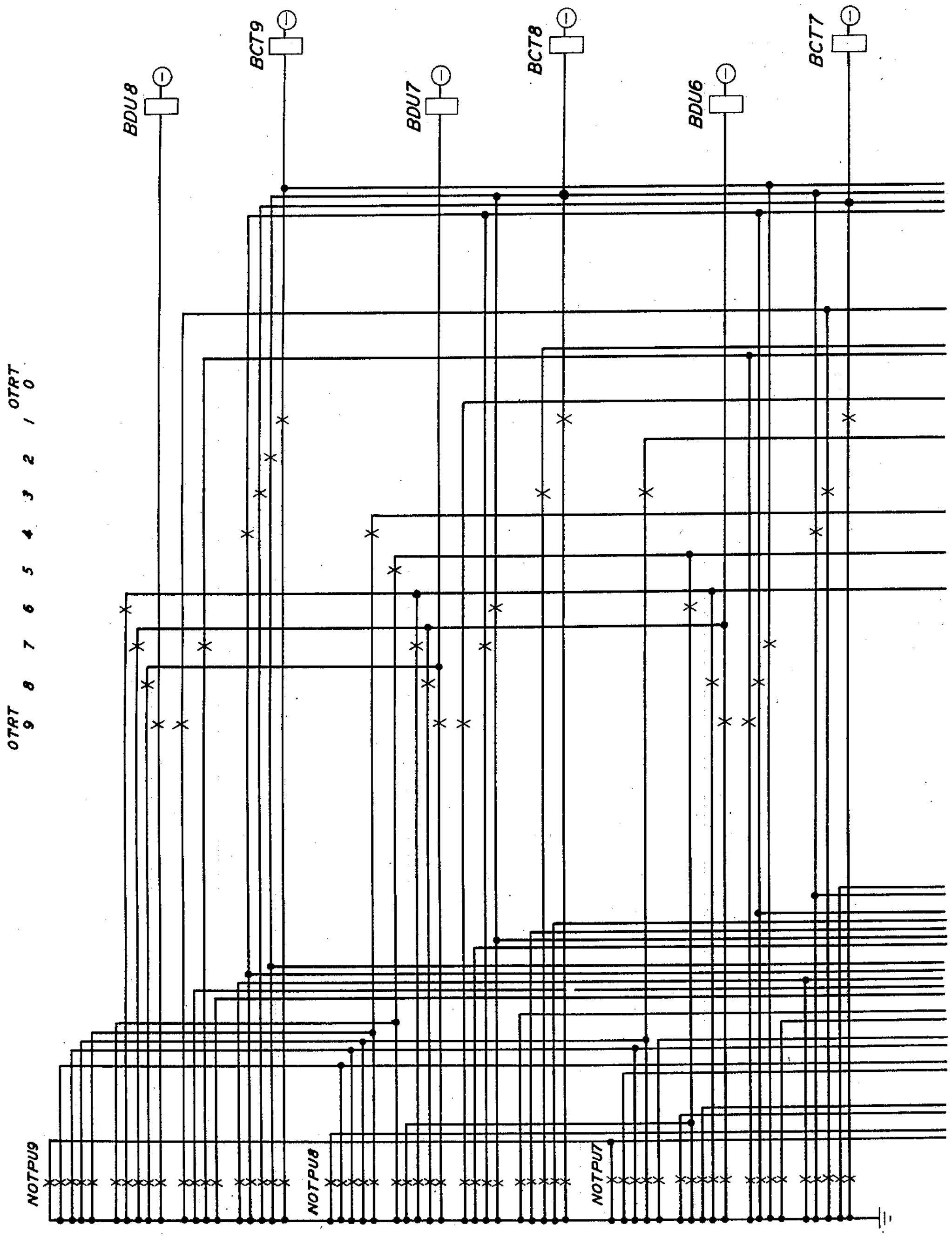
Figure 15:
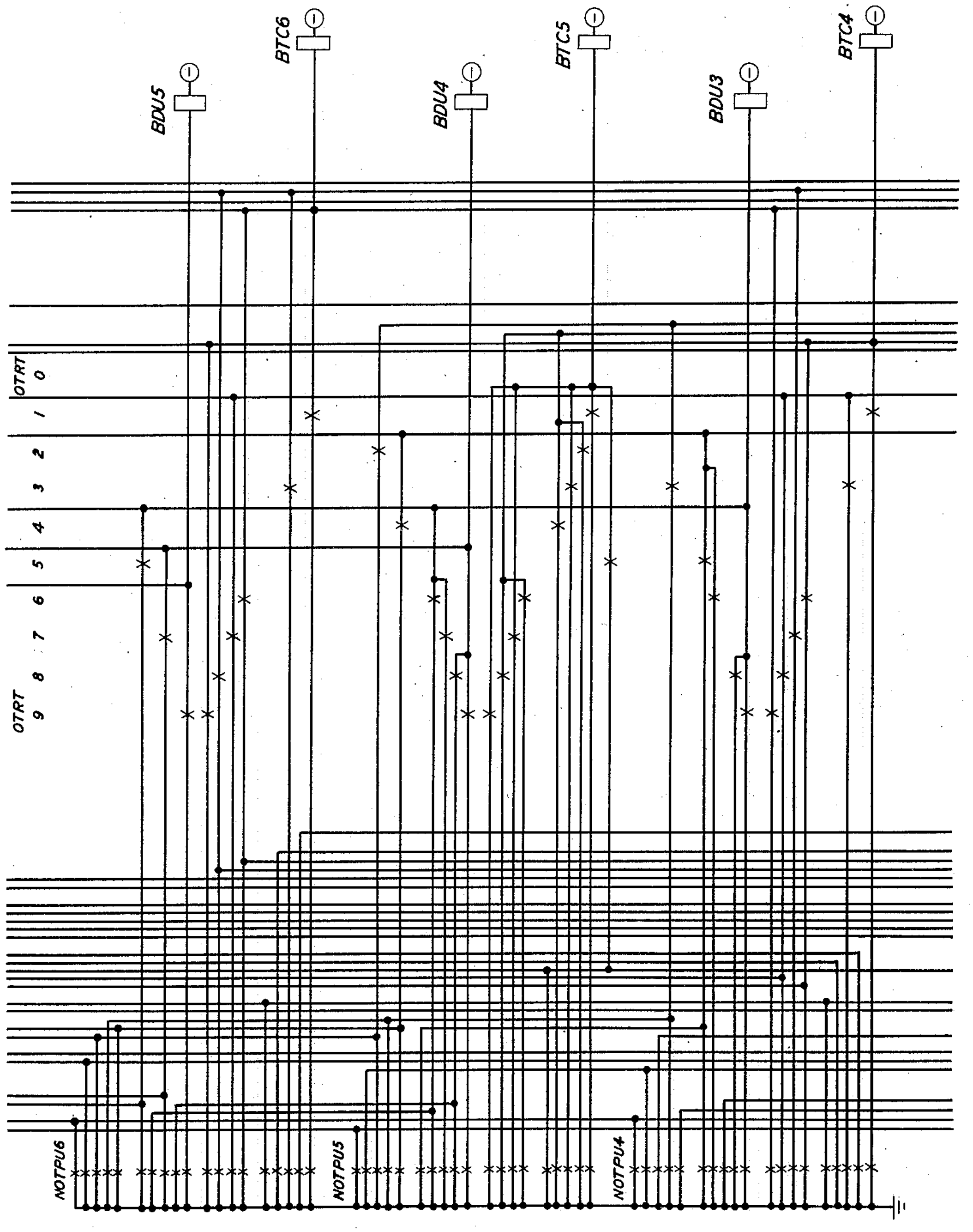

The quantity $.90, which is the product of the units digit of the number of overtime periods and the tens digit of the overtime rate, is manifested by the operation of relays BDU0 and BCT9 which represent a dollar units digit of 0 and a cents tens digit of 9 in the B register, as shown on the right-hand side of Fig. 60. Relay BDU0, which is shown on Fig. 16 of the drawings, is operated by a ground on contacts 1 of relay NOTPU3 operated, through contacts 3 of relay OTRT3, to the winding of relay BDU0. Relay BCT9, which is shown on Fig. 14, is operated from a ground on contacts 2 of relay NOTPU3, through contacts 4 cf relay OTRT3 operated, to the winding of relay BCT9.

Figure 16:
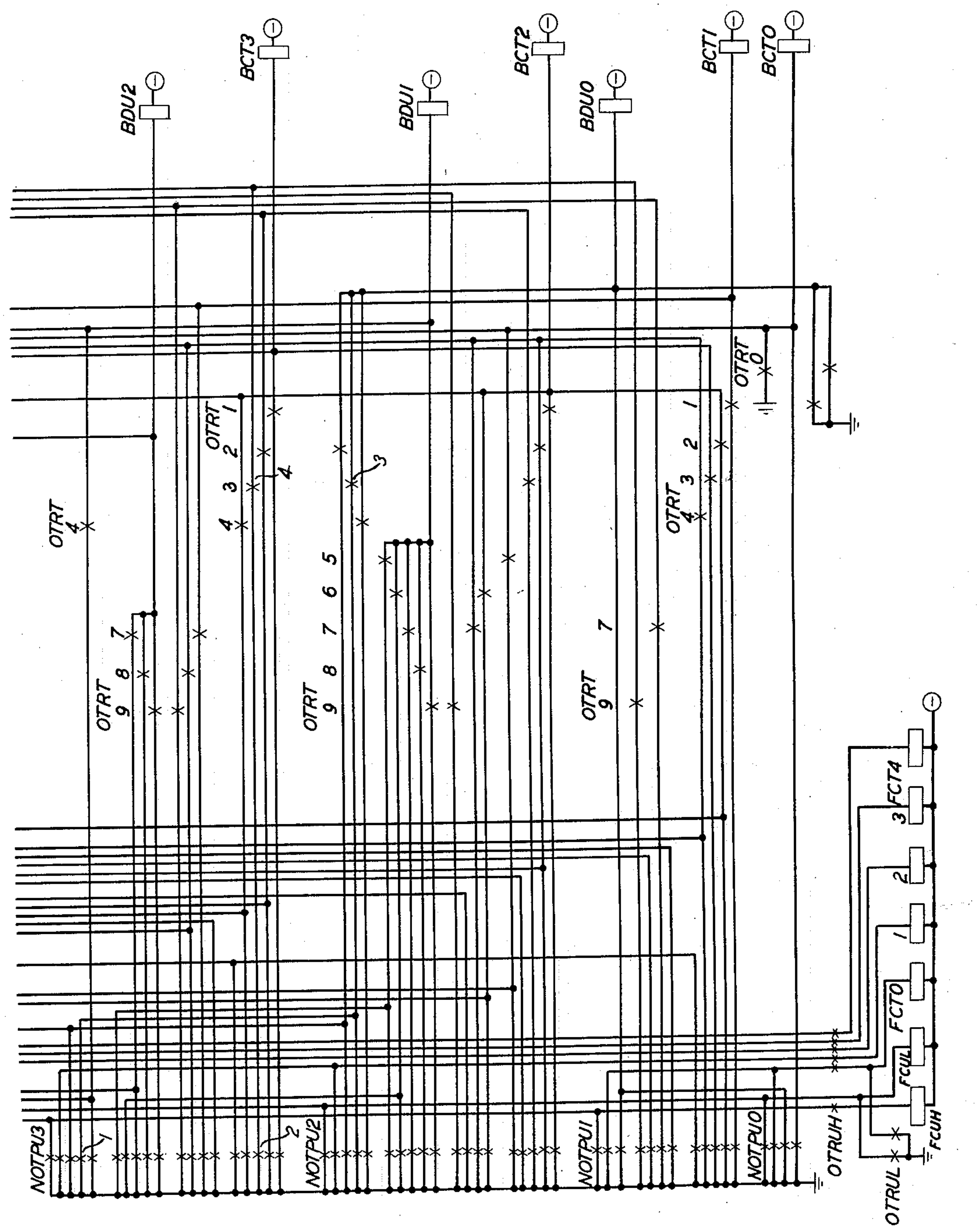

The quantity $.15, which is the product of the units digit of the number of overtime periods and the units digit of the overtime rate is manifested in the output of the overtime multiplier by relays FCT1 and FCUH operated. Relay FCT1 operated represents a cents tens digit of 1 in the F register while relay FCUH operated represents the cents units digit of a nickel in the F register. This is shown in the lower right-hand portion of Fig. 60 where the cents tens digit in the F register is entered in biquinary form while the cents units digit in the F register is in binary form. Relay FCT1, which is shown in Fig. 16, is operated through a contact of relay OTRUH from a ground on the contacts of relay NOTPU3 operated. Relay FCUH, which is also shown on Fig. 16, is operated through a contact of relay OTRUH from a ground on the contacts of relay NOTPU3 operated.

The following eight relays are now operated to represent the overtime charge of $15.05:

| Relay: | Overtime charge |
|---|---|
| CDT1 | $10.00 |
| CDU2 | 2.00 |
| DDU2 | 2.00 |
| BCT9 | 00.90 |
| BDU0 | 00.00 |
| FCT1 and FCTL | 00.10 |
| FCUH | 00.05 |
| | $15.05 |

The operation of the above eight relays closes their contacts, which are shown in connection with the charge adder circuits, wherein they energize circuits which compute the sum of the initial charge and the overtime period charge. This computed total is then the total charge for the call.

*Charge adder*

The charge adder adds the initial period charge to the various bits of information represen ing the overtime charge to compute the total charge for the call. The operation of the circuits within the charge adder is functionally illustrated by the dotted rectangle in the lower right-hand portion of Fig. 60, wherein the small rectangles represent the various input and output relays in the charge adder. The small rectangles opposite the arrowheads represent the input relays while the rectangles in the bottom line (line G) represent the output relays of the circuit.

The darkened ones of the small rectangles indicate which ones of the input relays are operated to represent the initial period charge and the overtime charge. Relays ADU1, ACTL, ACT4, and ECUL, are operated from the rate information circuit to indicate the initial period charge of $1.40. The following relay contacts are operated by circuits in the overtime multiplier to represent the overtime charge of $15.05: BDU0, BCT9, CDT1, CDU2, DDU2, FCTL, FCT1, and FCUH.

With the above-mentioned relays operated to represent the initial period charge and the overtime charge for our hypothetical call, the following circuit operations may be observed in the charge adder. These circuit operations are discussed in connection with Fig. 60 in order that the functions of the circuits, as well as the details of their operation, may be fully appreciated and understood.

Figure 19:
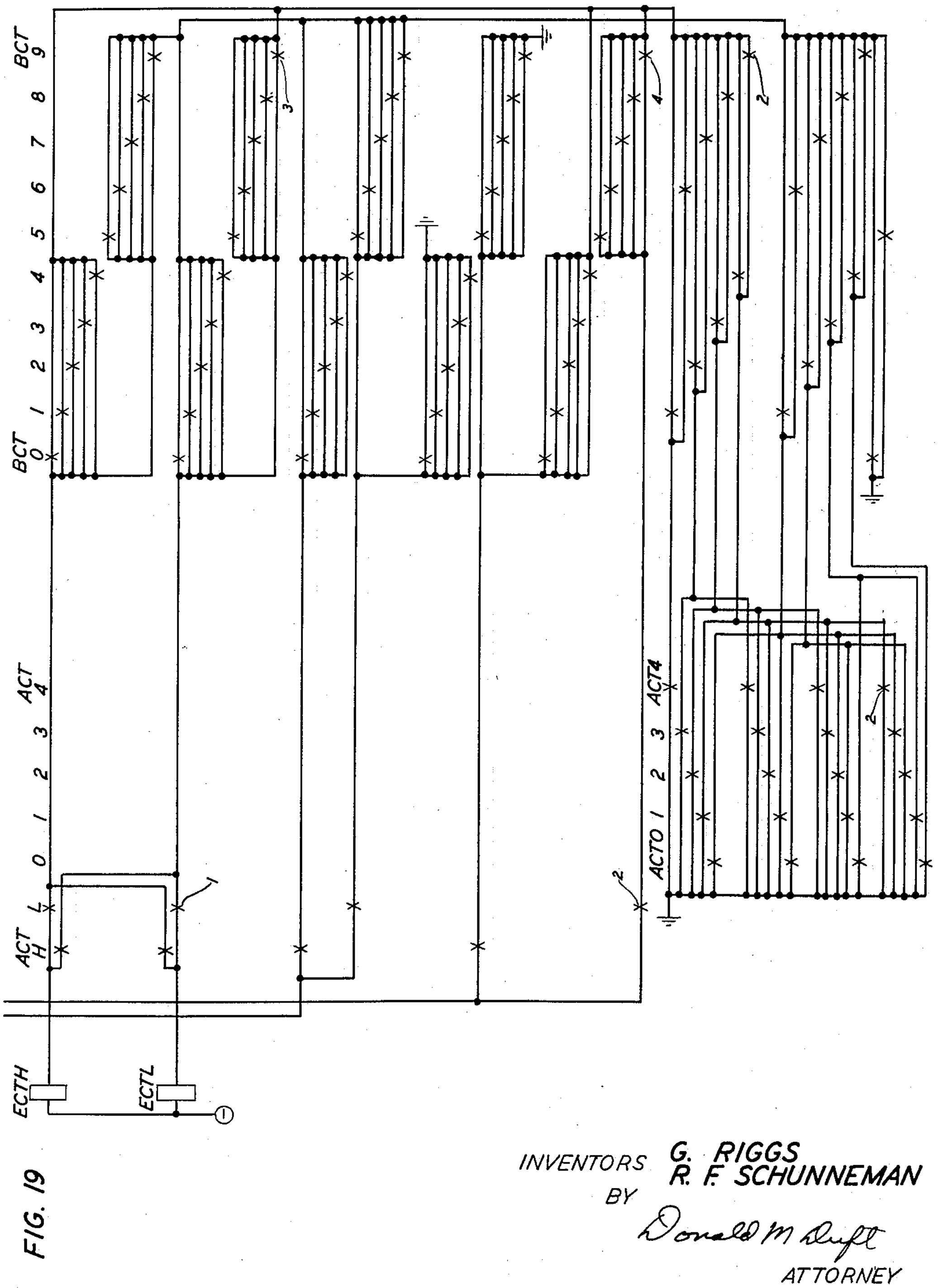
Figure 20:
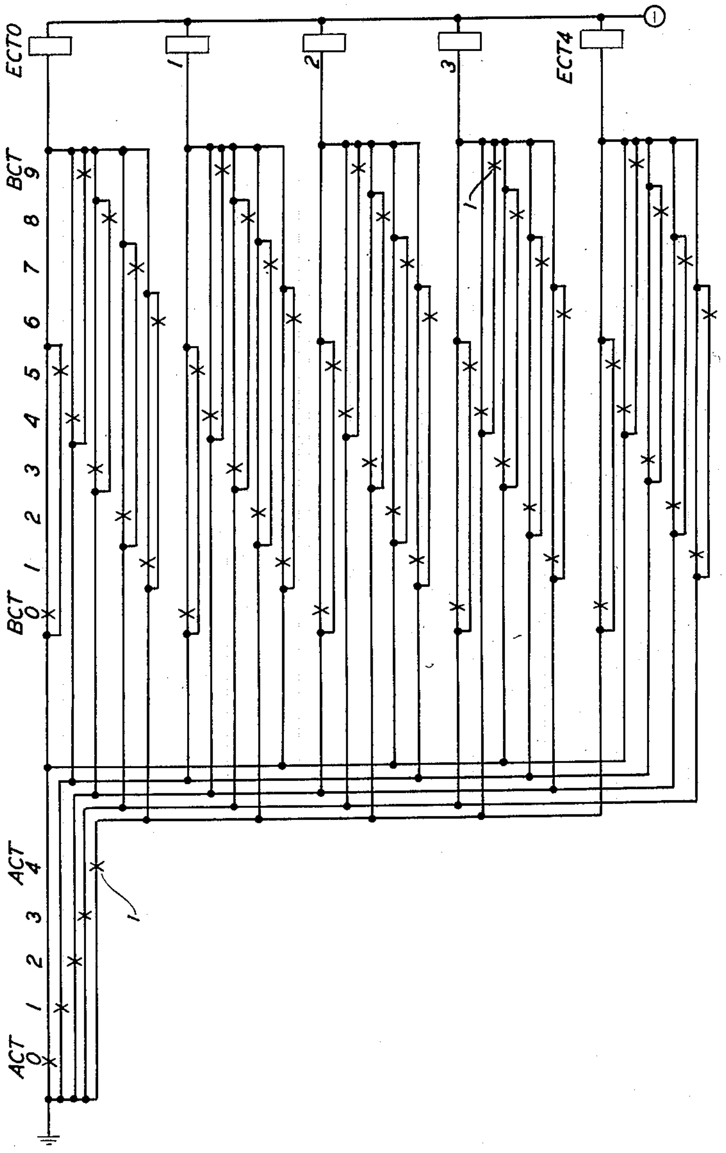

The first operation to be described illustrates how the charge adder adds the quantity $1.40 in the A register, to the quantity $.90 in the B register, to compute the sum of $2.30 which is entered into the E register. With the above-mentioned relays operated, a path is now closed on Fig. 20 from ground on closed contacts 1 of relay ACT4 through closed contacts 1 of relay BCT9 to operate relay ECT3. A path on Fig. 19 is also closed from ground on closed contacts 2 of relay ACT4, through contacts 2 of relay BCT9, through closed contacts 3 of relay BCT9, and through closed contacts 1 of relay ACTL, to operate relay ECTL. The operation of relays ECTL and ECT3 combined represent the tens digit of 3 in the cents tens column of the E register.

Figure 18:
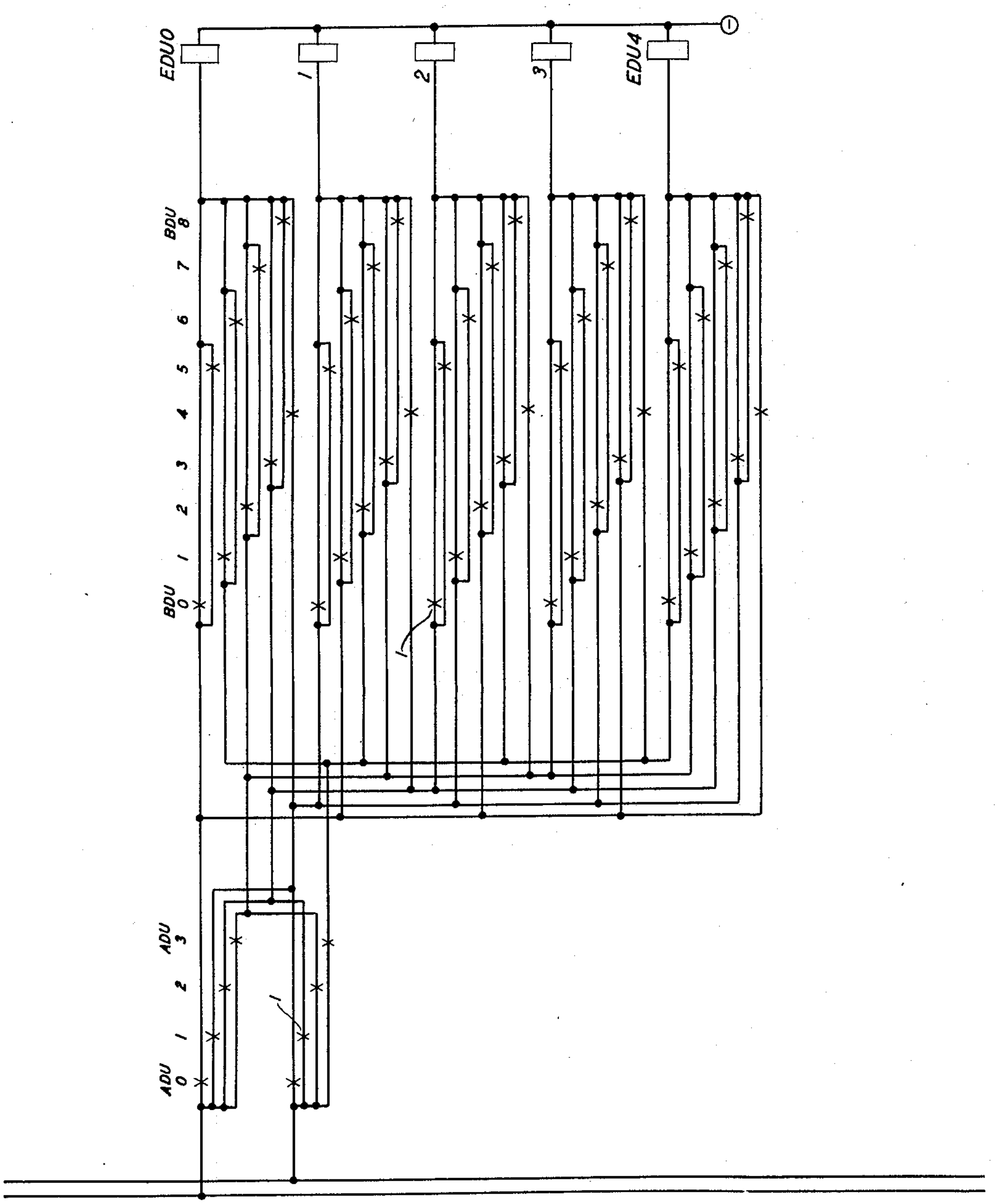

A circuit is now closed on Figs. 18 and 19 from ground on operated contacts 2 of relay ACT4, through operated contacts 2 of relay BCT9, through contacts 4 of relay BCT9 operated, through contacts 2 of relay ACTL, through contacts 1 of relays ADU1 and BDU0, to operate relay EDU2. This relay operated represents the digit 2 in the dollar units column of the E register.

Figure 17:
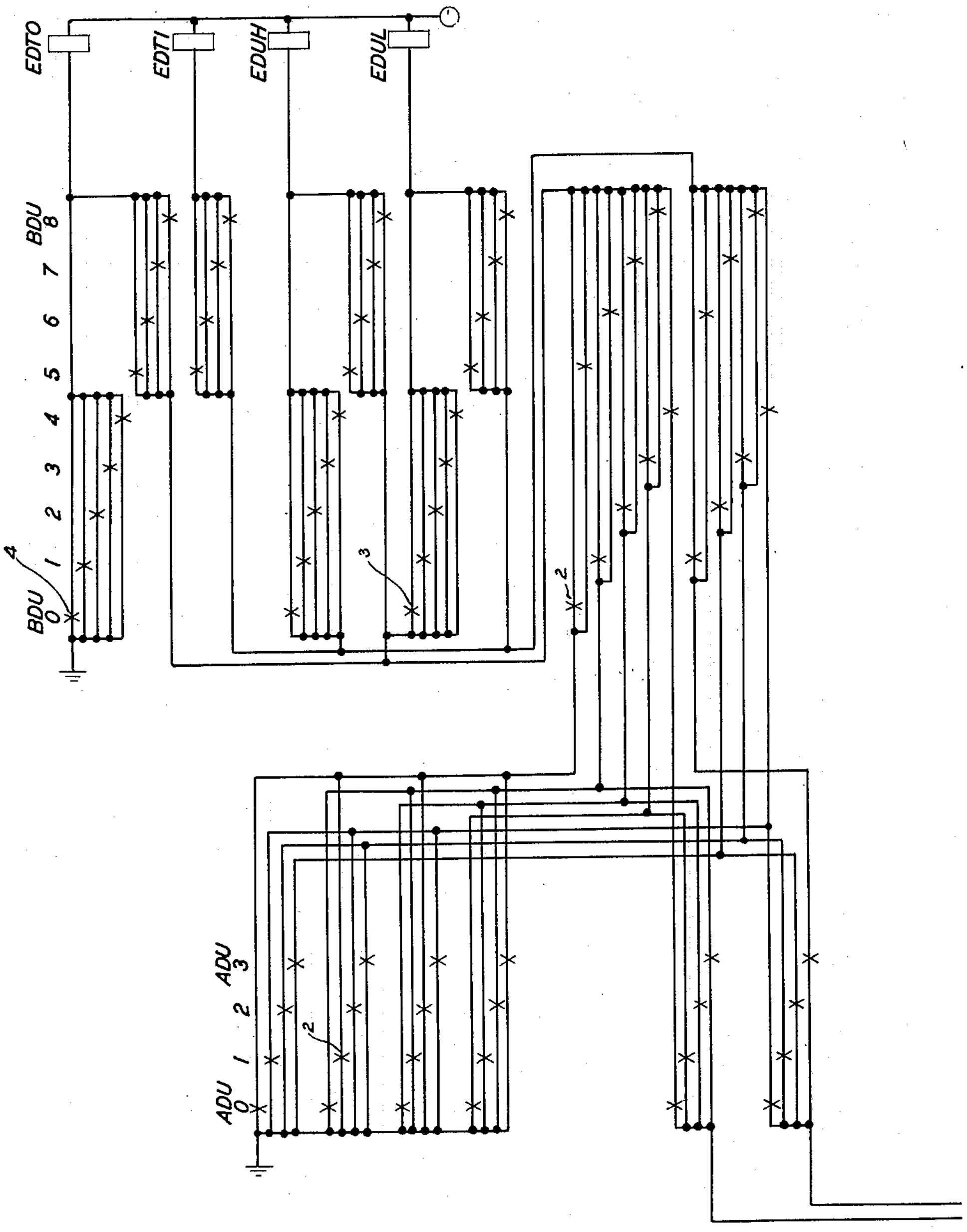

A circuit is also closed at this time to operate relay EDUL on Fig. 17 from ground on contacts 2 of relay ADU1, through contacts 2 and 3 of operated relay BDU0, to the winding of relay EDUL. Relays EDUL and EDU2 operated represent the quantity $2.00 in the dollar units column of the E register. This amount is the sum of the $1.00 contained in the A register together with the carry one from the cents tens column of the E register. A circuit is closed to operate relay EDT0 on Fig. 17 from ground on operated contacts 4 of relay BDU0 to the winding of relay EDT0. This relay operated indicates a digit of 0 in the dollar tens column of the E register.

It has now been described how the E register has been operated to indicate the quantity $2.30 by a 0 in the dollar tens column, a 2 in the dollar units column, a 3 in the cents tens column, and a 0 in the cents units column.

Next described is the manner in which the amounts contained in the C and D registers are added into the F register. No adding functions are associated with the cents tens column and the cents units column of the F register since the proper amounts are entered into these columns directly by circuits in the overtime multiplier. For example, relay FCUH in the cents units column and relays FCTL and FCT1 in the cents tens column are operated to represent the quantity of $.15.

Figure 21:
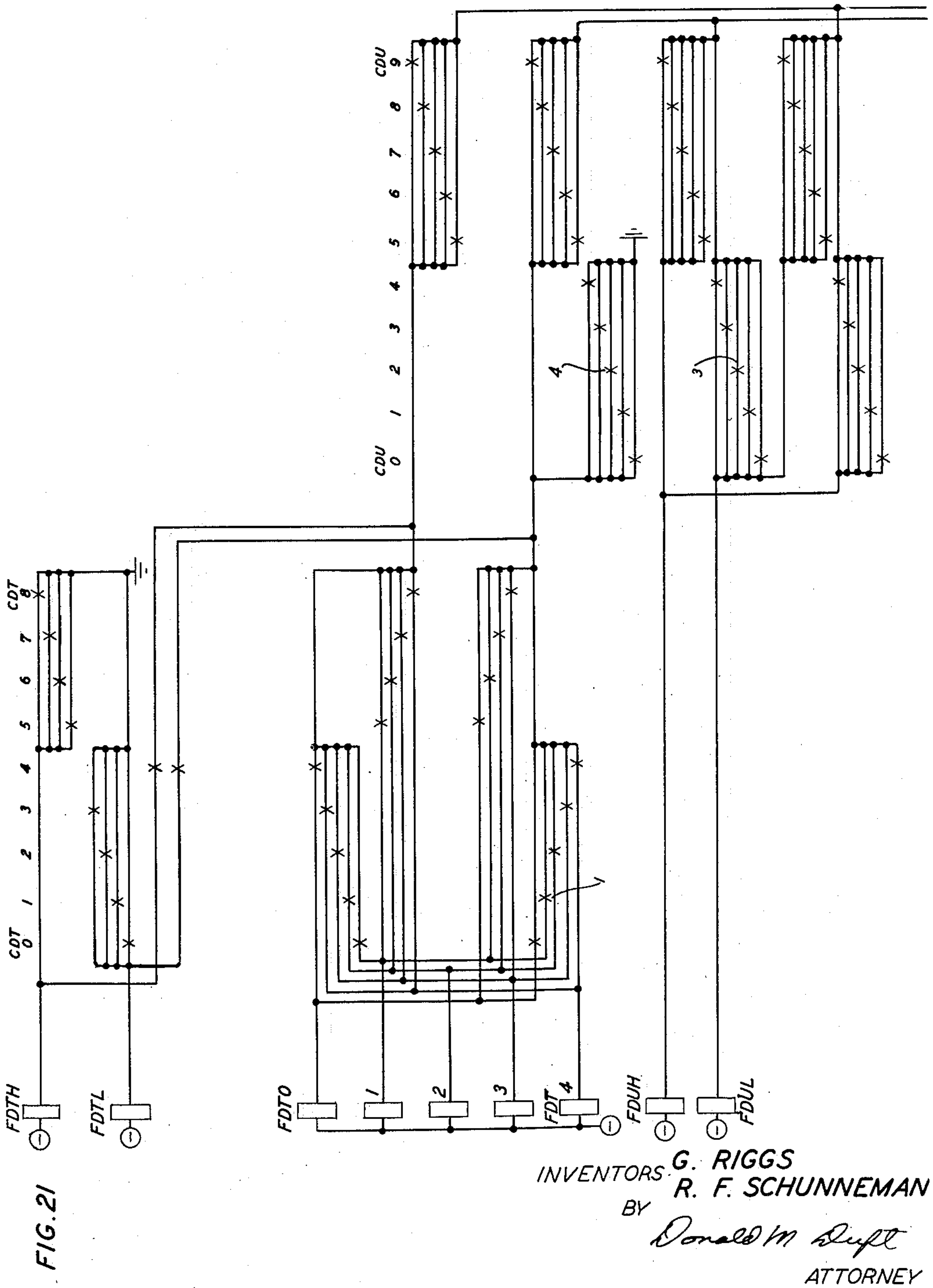
Figure 22:
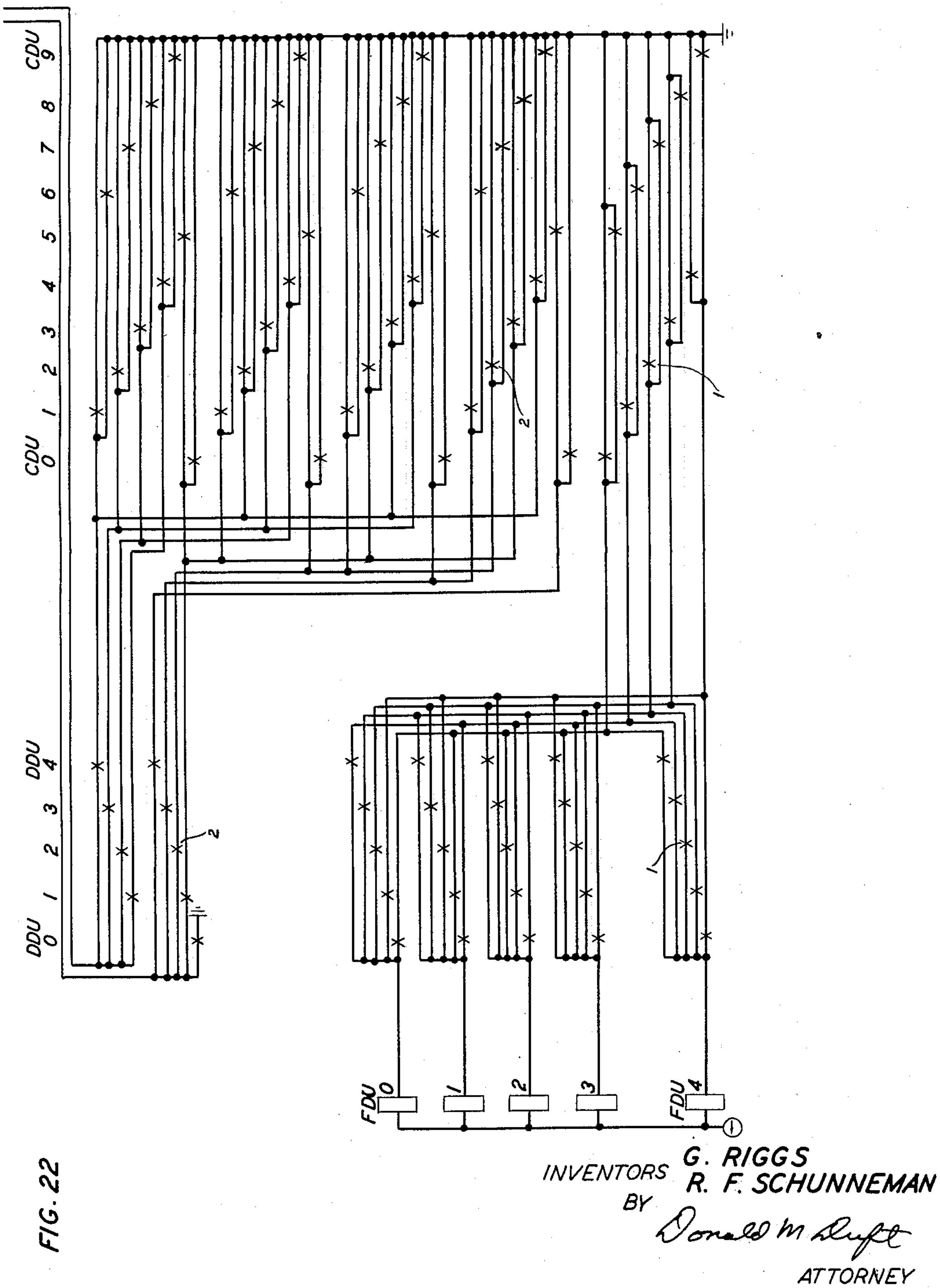

A circuit is now closed on Fig. 22 to operate relay FDU4 from ground on contacts 1 of relays CDU2 and DDU2, to the winding of relay FDU4. A circuit is also closed, as shown on Figs. 21 and 22, to operate relay FDUL from ground on contacts 2 of relay CDU2, through contacts 2 of relay DDU2, through contacts 3 of relay CDU2 to the winding of relay FDUL. Operated relays FDU4 and FDUL manifest a biquinary 4 in the dollar units column of the F register.

A path is also closed on Fig. 21 at this time to operate relay FDT1 from ground on contacts 4 of relay CDU2 operated, through contacts 1 of relay CDT1 operated, to the winding of relay FDT1. A circuit on Fig. 21 is closed at this time through a set of contacts on relay CDT1 to operate relay FDTL. Operated relays FDT1 and FDTL manifest a biquinary 1 in the dollar tens digit of the F register.

It has just been described how relays FDTL, FDT1, FDUL, and FDU4 are operated. These four operated relays together with relays FTCL, FTC1 and FTUH, which are operated directly by the overtime multiplier, together represent the quantity $14.15. This amount is the sum of the $12.00 in the C register, plus the $2.00 in the D register, plus the $.15 already entered in the cents tens and cents units columns of the F register.

It will now be described how the charge adder adds the $2.30 in the E register to the $14.15 in the F register to obtain the sum of $16.45 in the G register. A circuit is now closed on Fig. 25 to operate relay GCUH from ground on the operated contacts 1 of relay FCUH, through the operated contacts 1 of relay ECUL to the winding of relay GCUH. Relay GCUH operated represents the amount of $.05 in the cents unit column.

Figure 25:
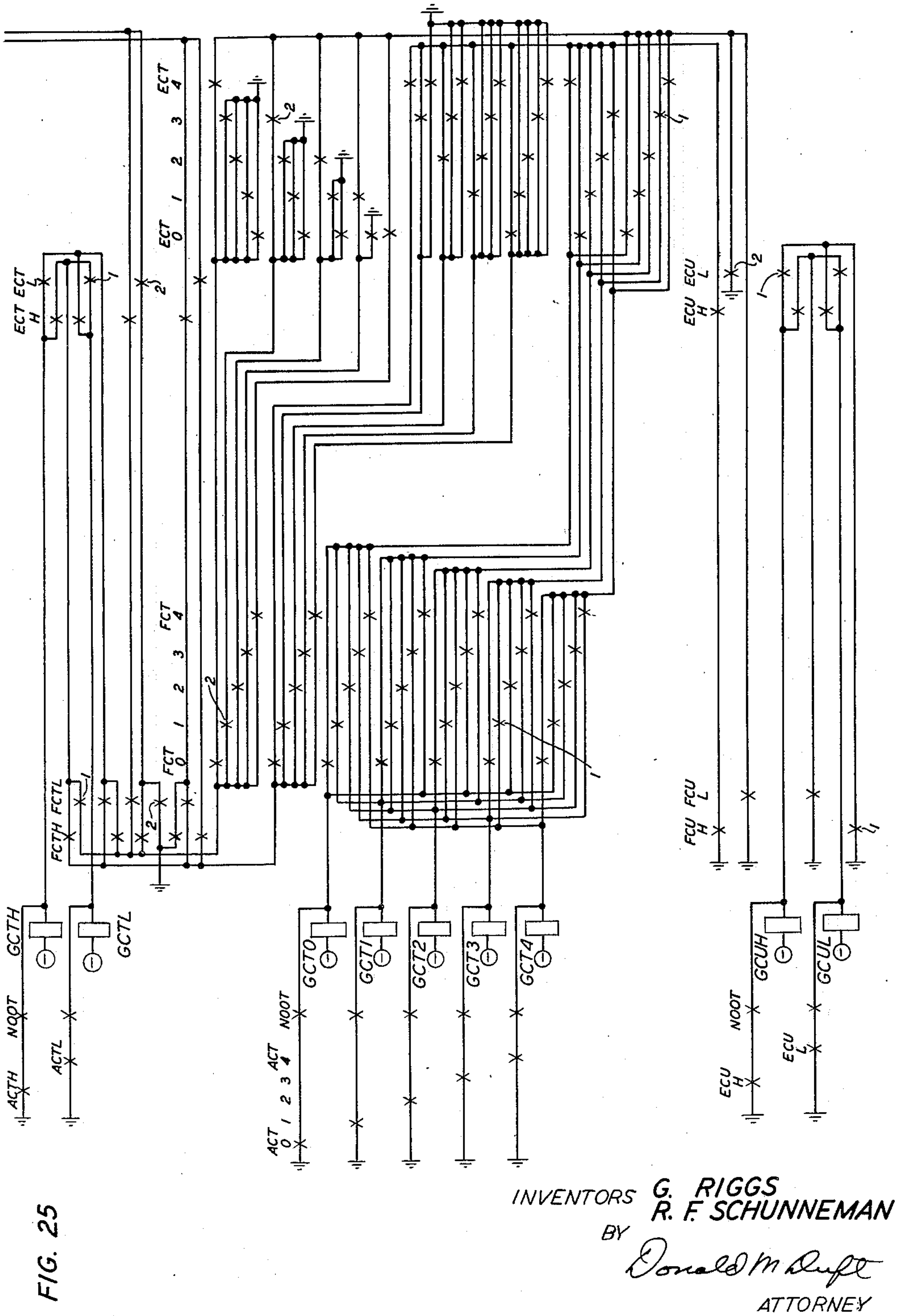

A circuit is closed on Fig. 25 from ground on the closed contacts 2 of relay ECUL, through contacts 1 of operated relays ECT3 and FCT1, to the winding of relay GCT4, which now operates. A circuit is closed on Fig. 25 to operate relay GCTL from ground on closed contacts 2 of relay ECUL through closed contacts 2 of relays ECT3 and FCT1, through closed contacts 1 of relays FCTL and ECTL to the winding of relay GCTL. Relays GCTL and GCT4 operated represent $.40 in the cents tens column of the G register.

Figure 24:
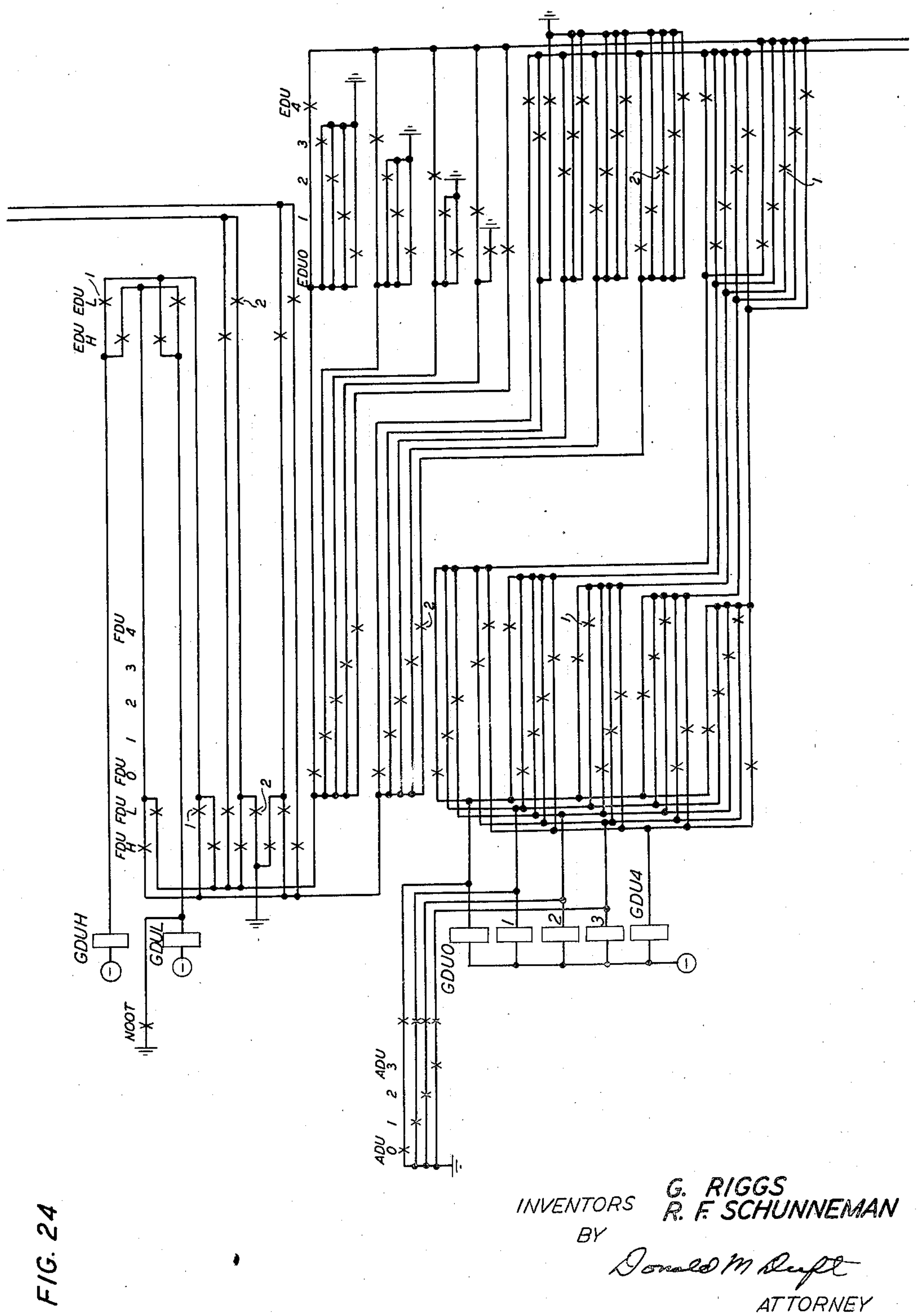

A circuit is closed on Figs. 24 and 25 to operate relay GDU1 from ground on closed contacts 2 of relays FCTL and ECTL of Fig. 25, through closed contacts 1 of relays EDU2, and FDU4 to the winding of relay GDU1. A path is closed on Fig. 24 to operate relay GDUH from ground on closed contacts 2 of relays EDU2 and FDU4, through contacts 1 of relays FDUL and EDUL, to the winding of relay GDUH. Relays GDUH and GDU1 operated combined represent the quantity $6.00 in the dollar units column of the G register.

Figure 23:
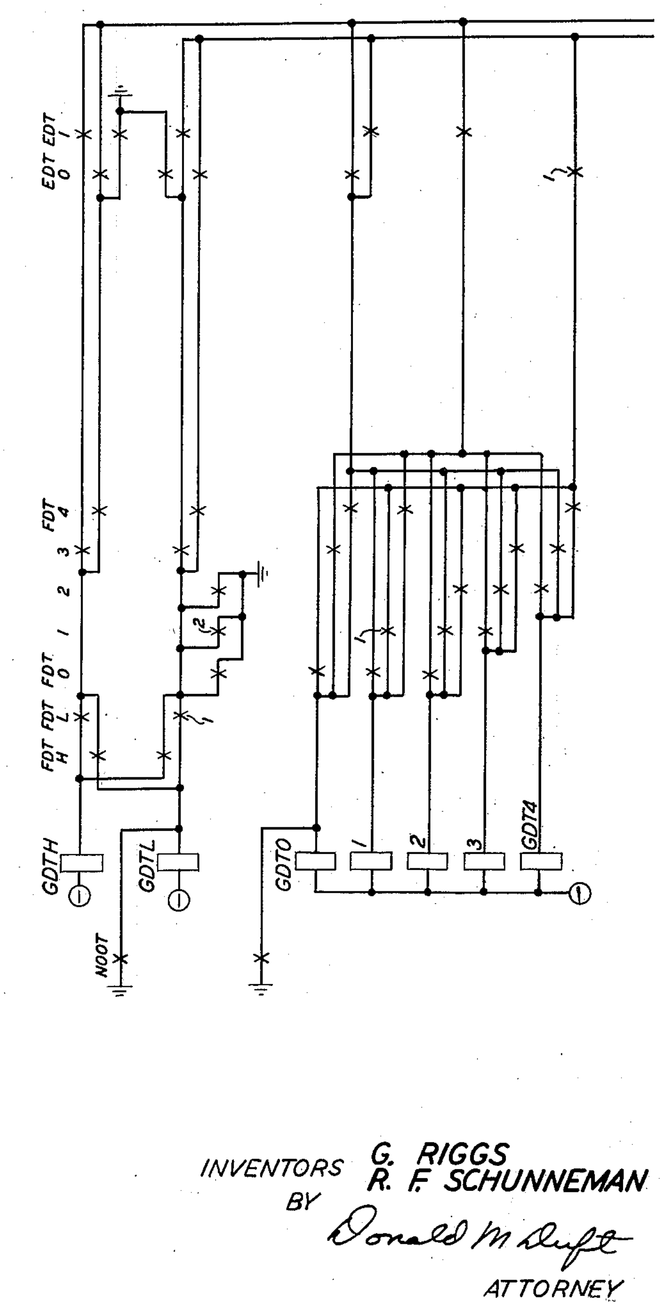

A path is closed on Figs. 23 and 24 to operate relay GDT1 from ground on closed contacts 2 of relays FDUL and EDUL on Fig. 24, through closed contacts 1 of relays EDT0 and FDT1, through the winding of relay GDT1. A path is also closed to operate relay GDTL from ground on contacts 2 of relay FDT1 operated, through contacts 1 of relay FDTL operated to the winding of relay GDTL. Relays GDTL and GDT1 operated together represent the quantity $1.00 in the dollar units column of the G register. Operated relays GDT1, GDTL, GDUH, GDU1, GCTL, GCT4 and GCUH operated represent the quantity $16.45 which is the charge for our hypothetical telephone call.

It has been previously described how there will be no overtime period for certain calls whose elapsed time does not exceed the initial period. In this event the subtractor, divider, and overtime multiplier circuits are bypassed since there is no need for their functions when there is no overtime. The initial period charge is then transmitted to the charge adder and appears unchanged in the output of that circuit.

Relay NOOT operates, as hereinbefore described, in the event that the call has no overtime. The operation of this relay together with the operation of the setup relays representing the initial charge energizes the appropriate output relays of the charge adder to represent the initial period charge. For example, let it be assumed for a moment that the initial period charge is $1.40 for a call for which there is no overtime.

In this event, the operation of relay NOOT applies ground to the windings of relays GDTL and GDT0 on Fig. 23 to operate these relays and thereby indicate a dollar tens digit of 0 in the G register. On Fig. 24 the operation of relay NOOT closes a contact to operate relay GDUL. The contacts of relay ADU1, as shown on Fig. 24, are operated to indicate that the dollar units digit of our assumed initial charge is 1. Therefore, a path is closed from the ground on contacts of relay ADU1 through contacts of relay NOOT to operate relay GDU1, thereby indicating a dollar units digit of 1 in the G register.

On Fig. 25 the contacts of relays ACTL and ACT4 are closed to indicate a cents tens digit of 4 for the initial period charge. Therefore, a path is closed from ground on contacts of relay ACTL, through closed contacts of relay NOOT to the winding of relay GCTL which now operates. A path is also closed on Fig. 25 from ground through contacts of relays ACT4 and NOOT to the winding of relay GCT4 which now operates. Relays GCTL and GCT4 operated together represent a cents tens digit of 4 for the initial charge. The contacts of relay ECUL, as shown on Fig. 25, are operated since the cents units digit of our assumed initial period charge of $1.40 is 0. Therefore, a path is closed from ground on the contacts of relay ECUL operated, through the contacts of relay NOOT operated to the winding of relay GCUL which now operates. Operated relays GDTL, GDT0, GDUL, GDU1, GCTL, GCT4, and GCUL together represent our initial period charge of $1.40. This charge was taken directly from the rate information relays and was transmitted to the output relays of the charge adder by the operation of relay NOOT since our call had no overtime.

The contacts on the output relays of the charge adder are shown associated with the tax rate selector and tax multiplier circuits, wherein they are used to control the determination of the tax rate and the computation of the taxes, respectively.

*Charge output circuit*

Figure 27:
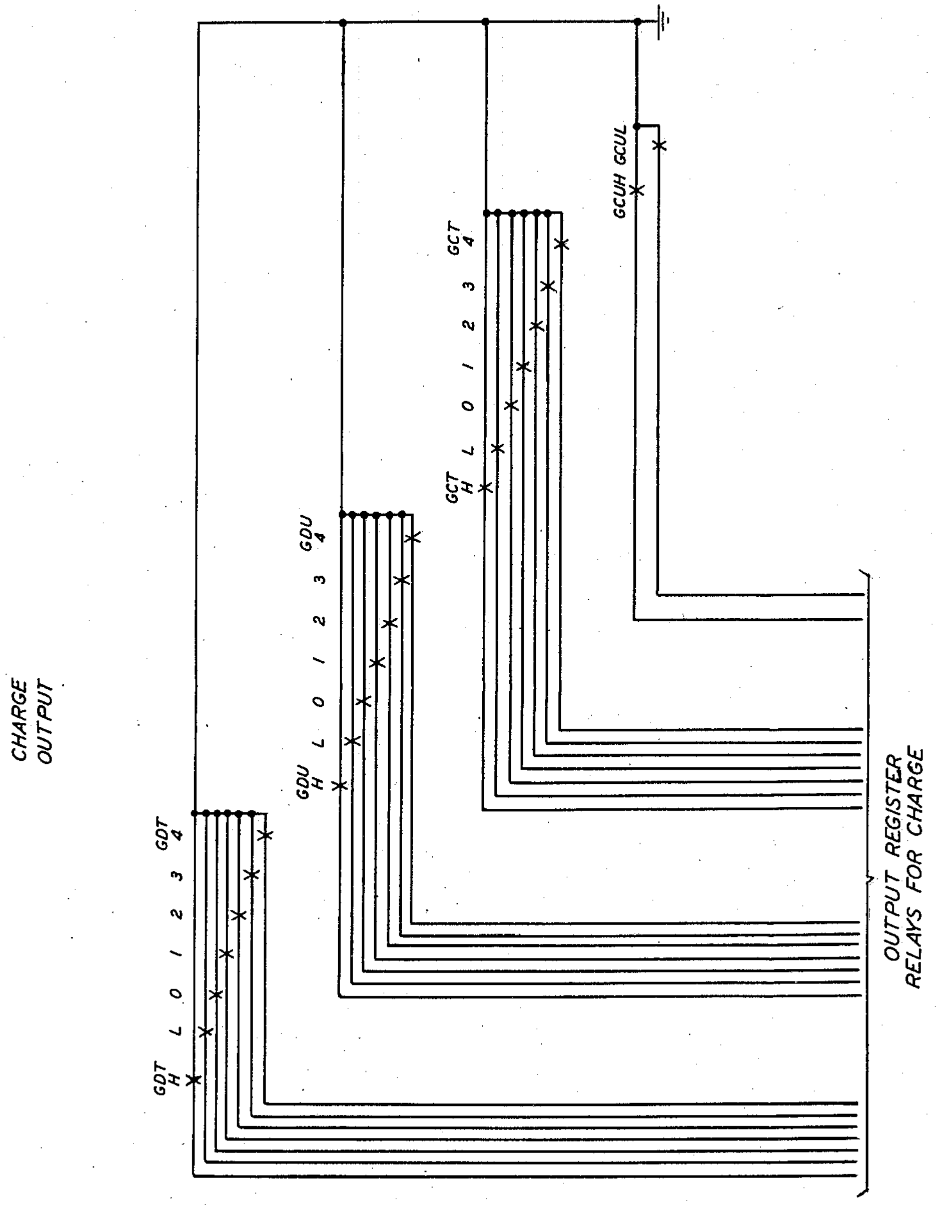
Figure 28:
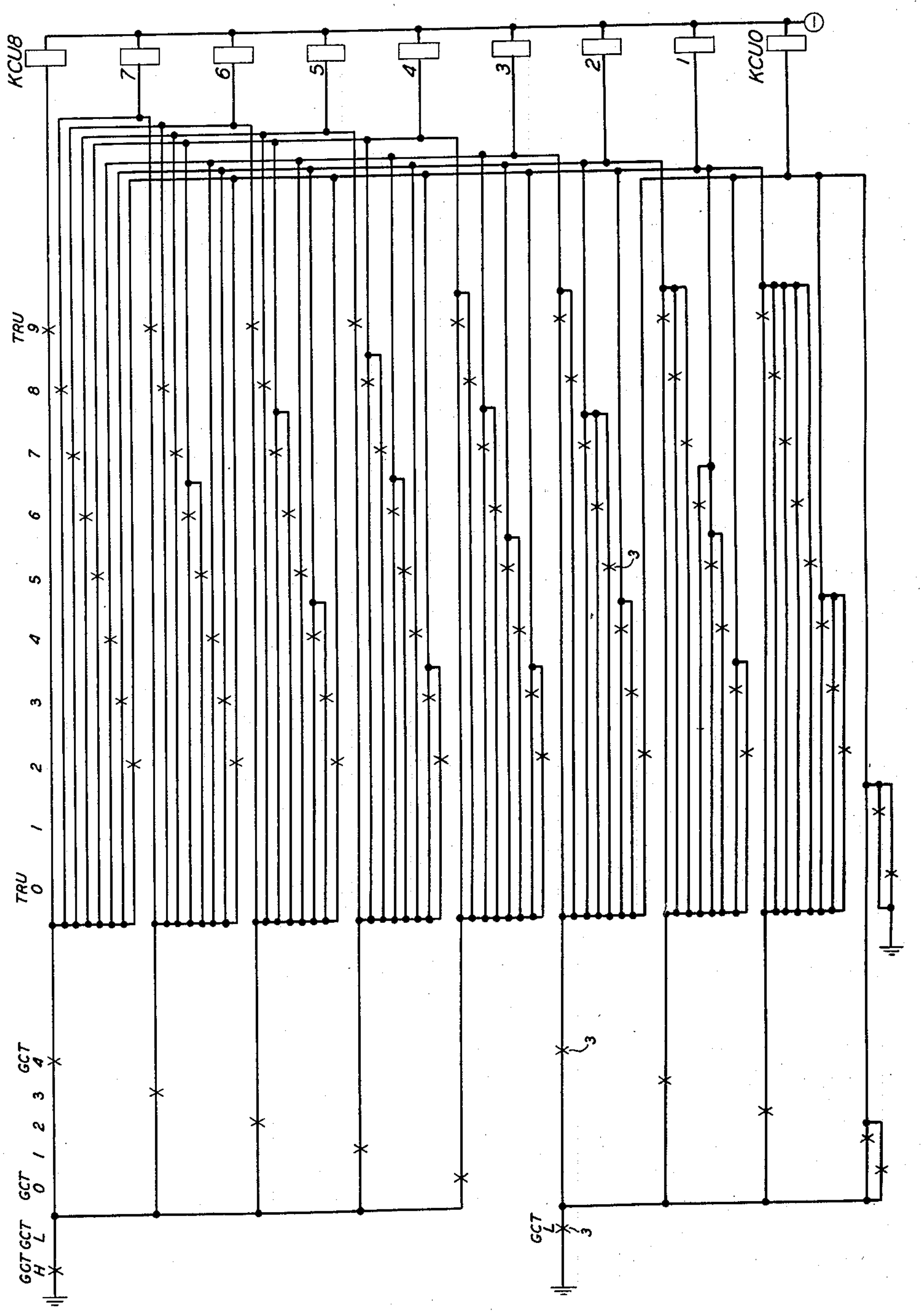
Figure 29:
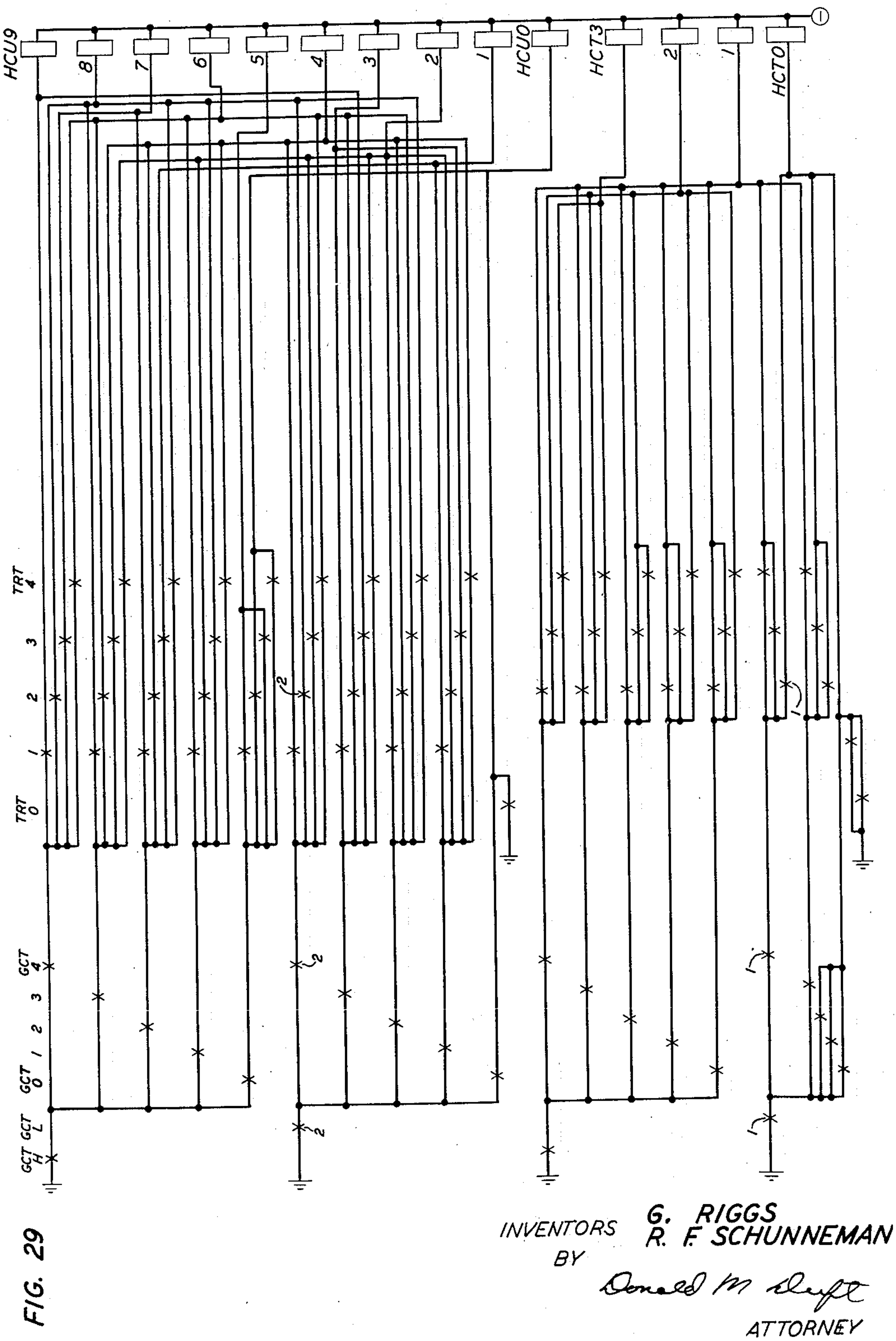
Figure 30:
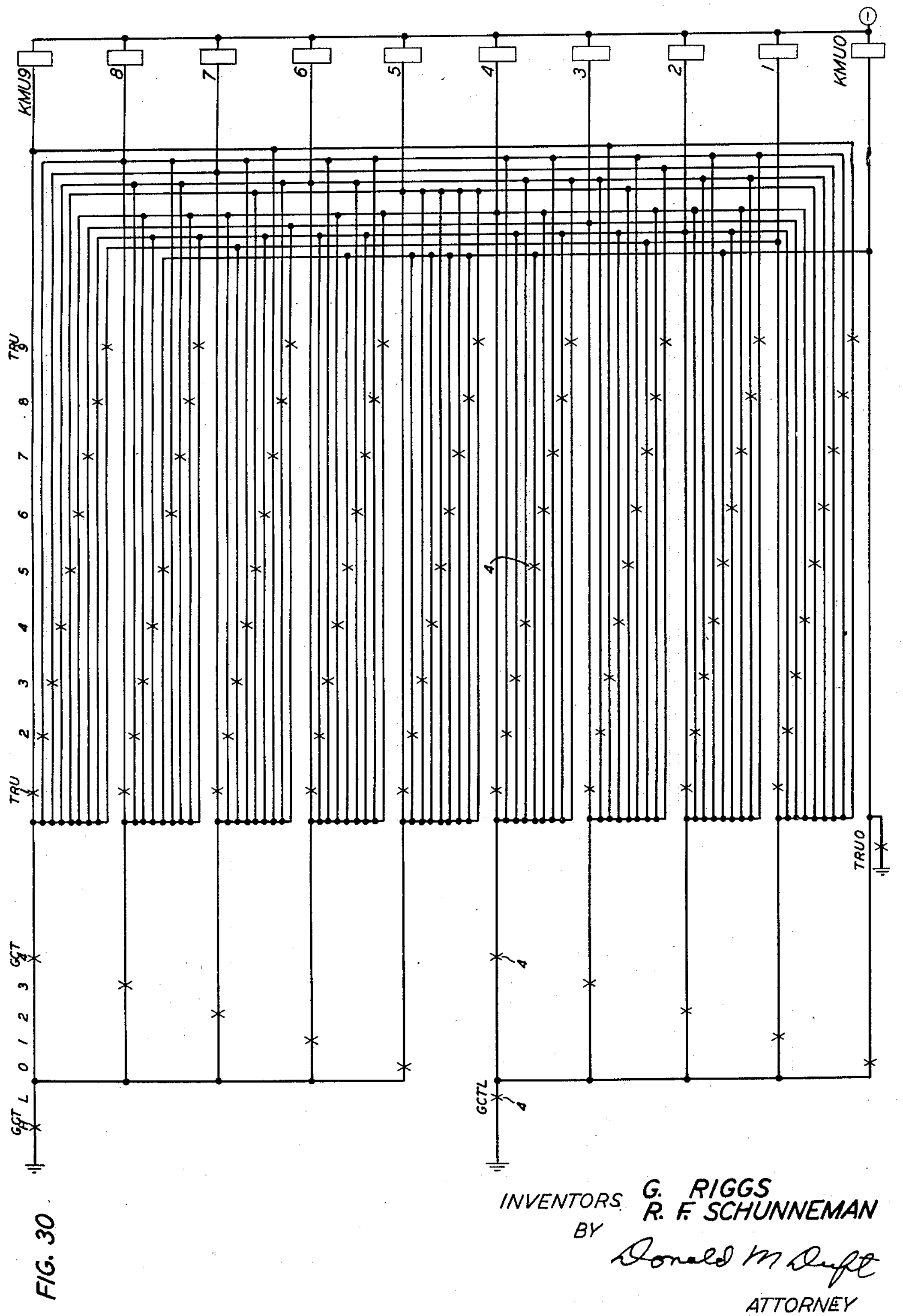
Figure 31:
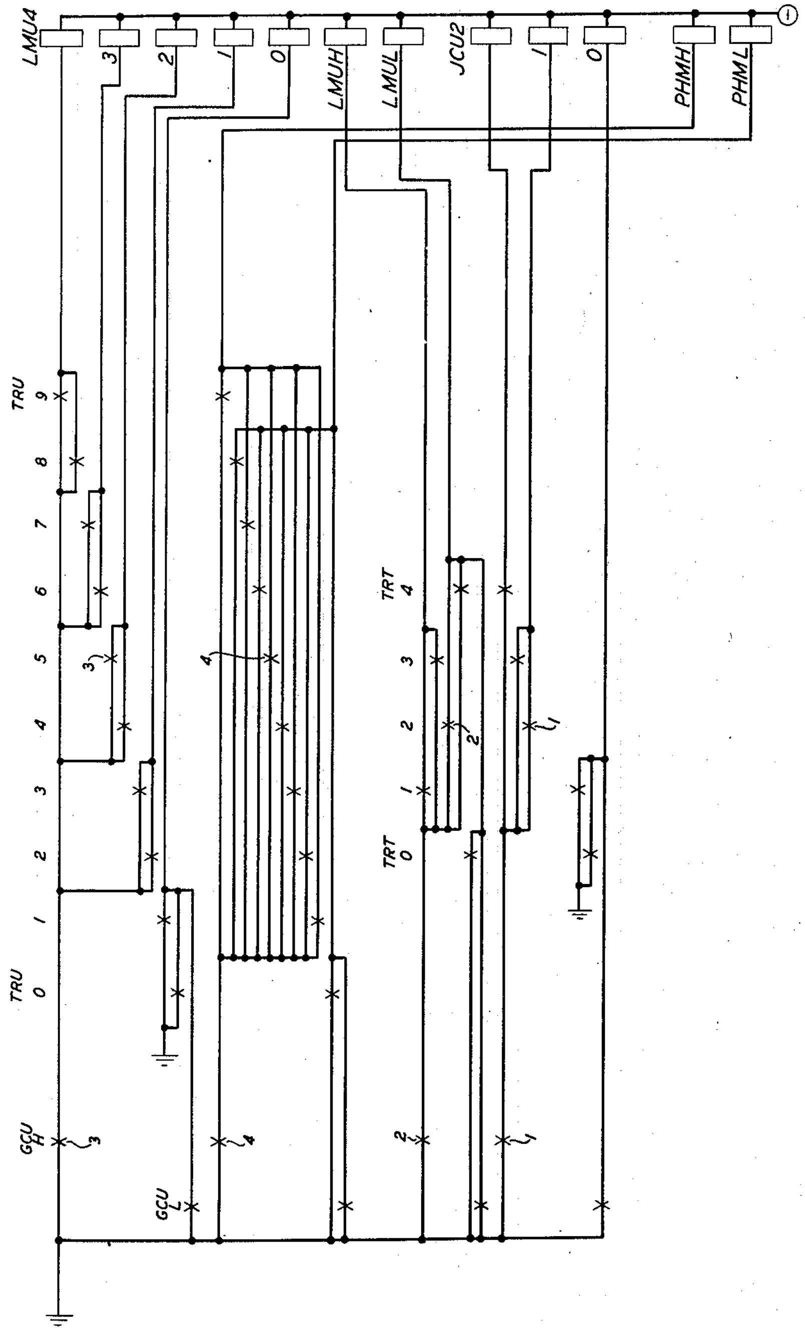
Figure 32:
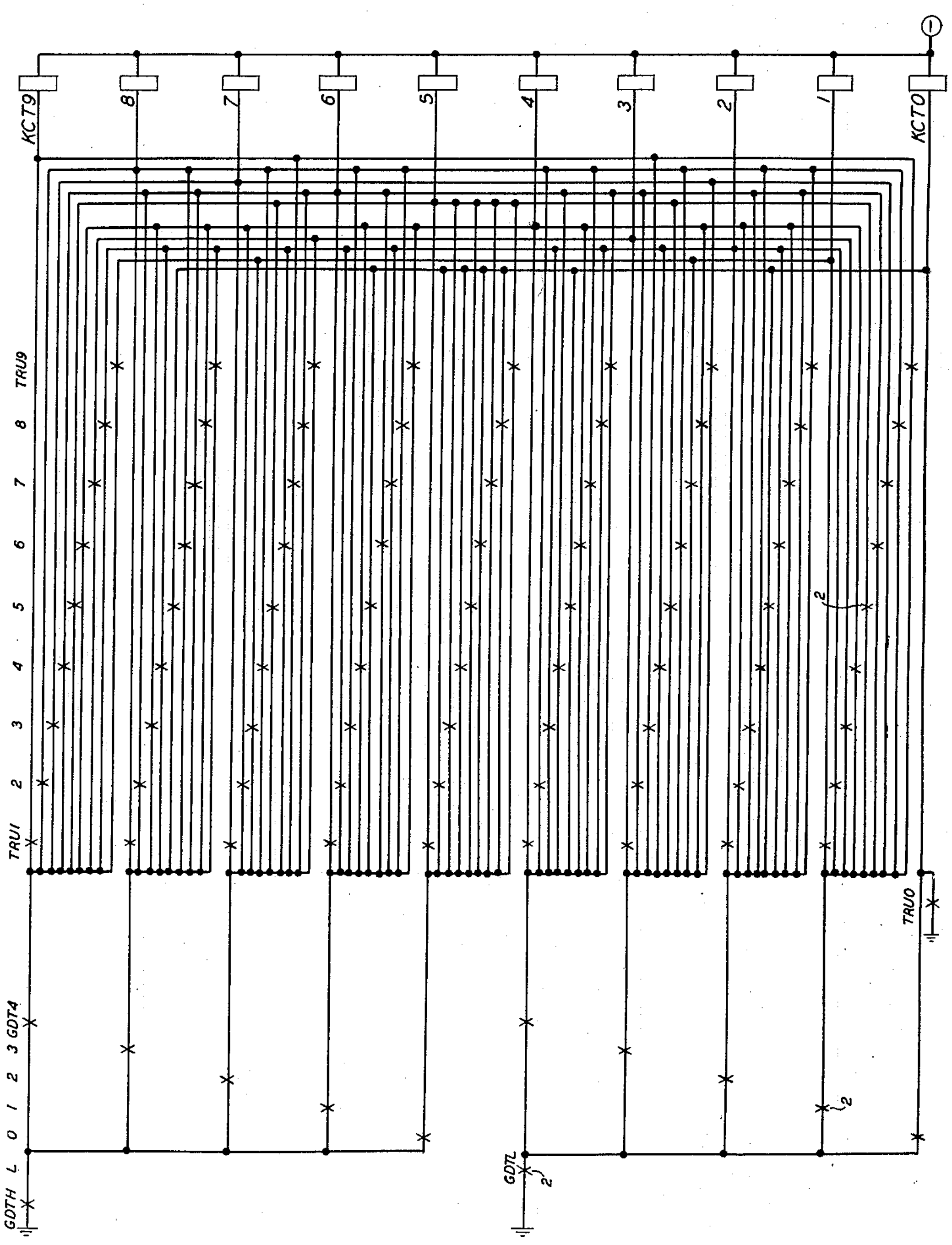
Figure 33:
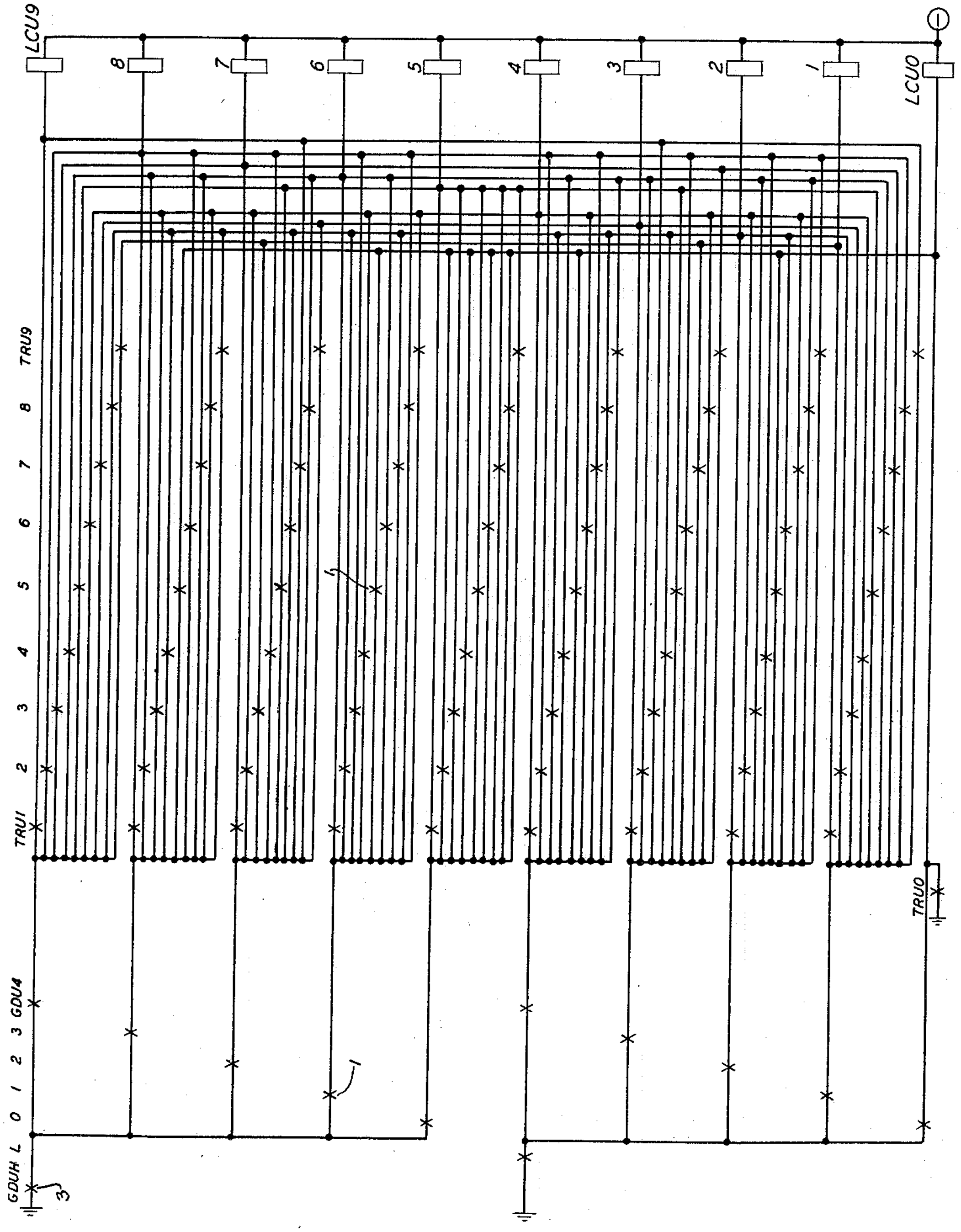
Figure 34:
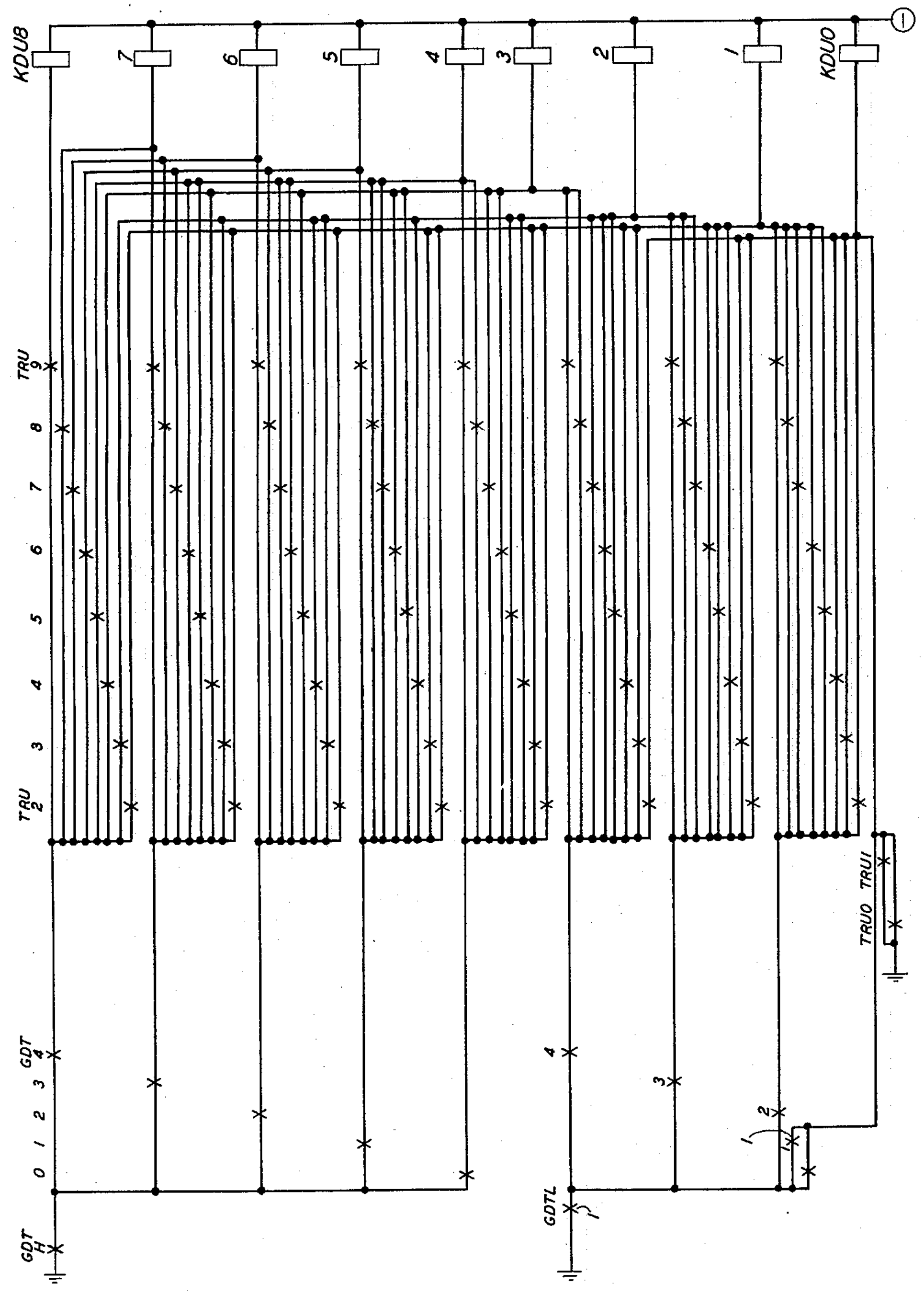
Figure 35:
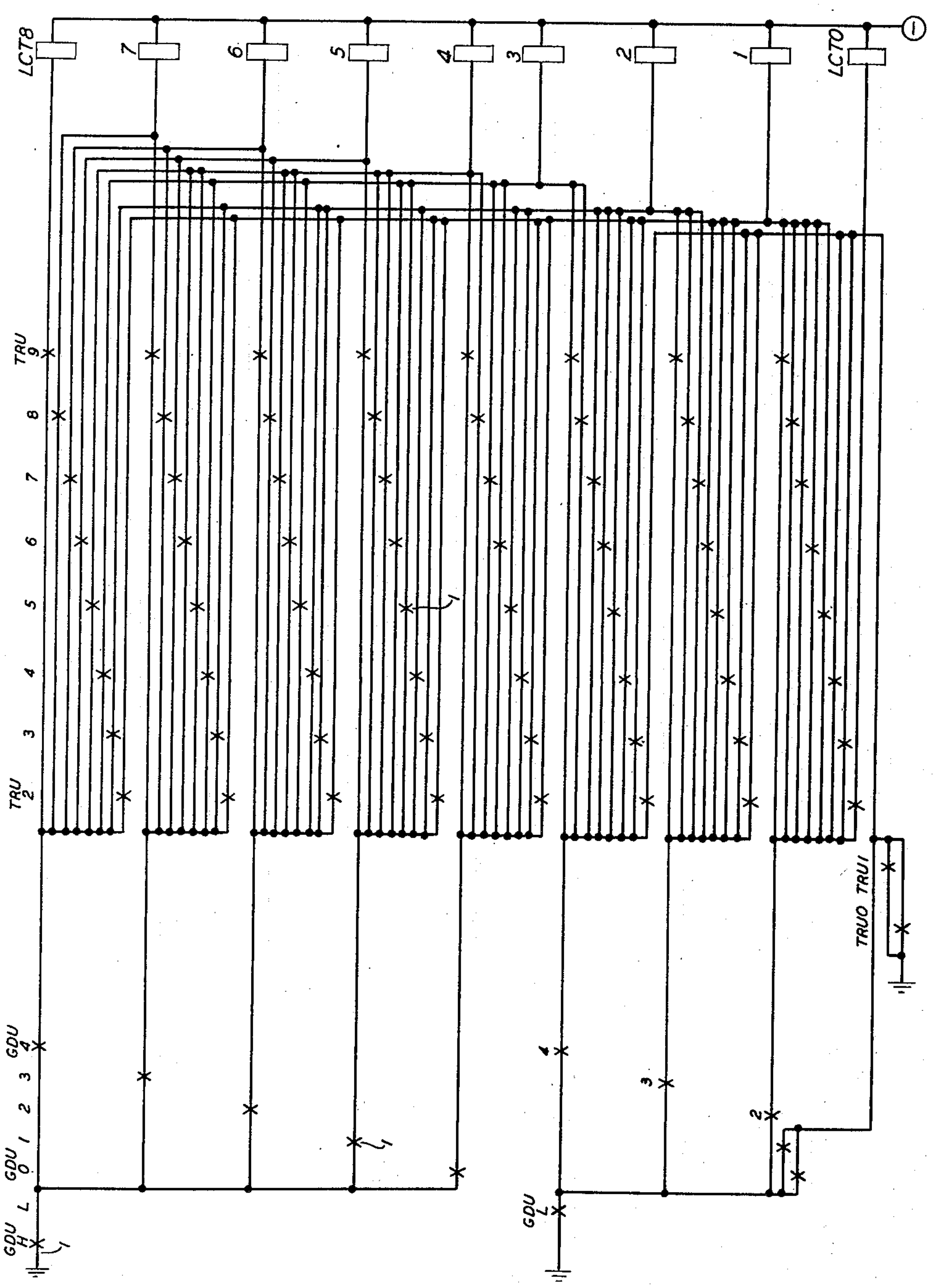
Figure 36:
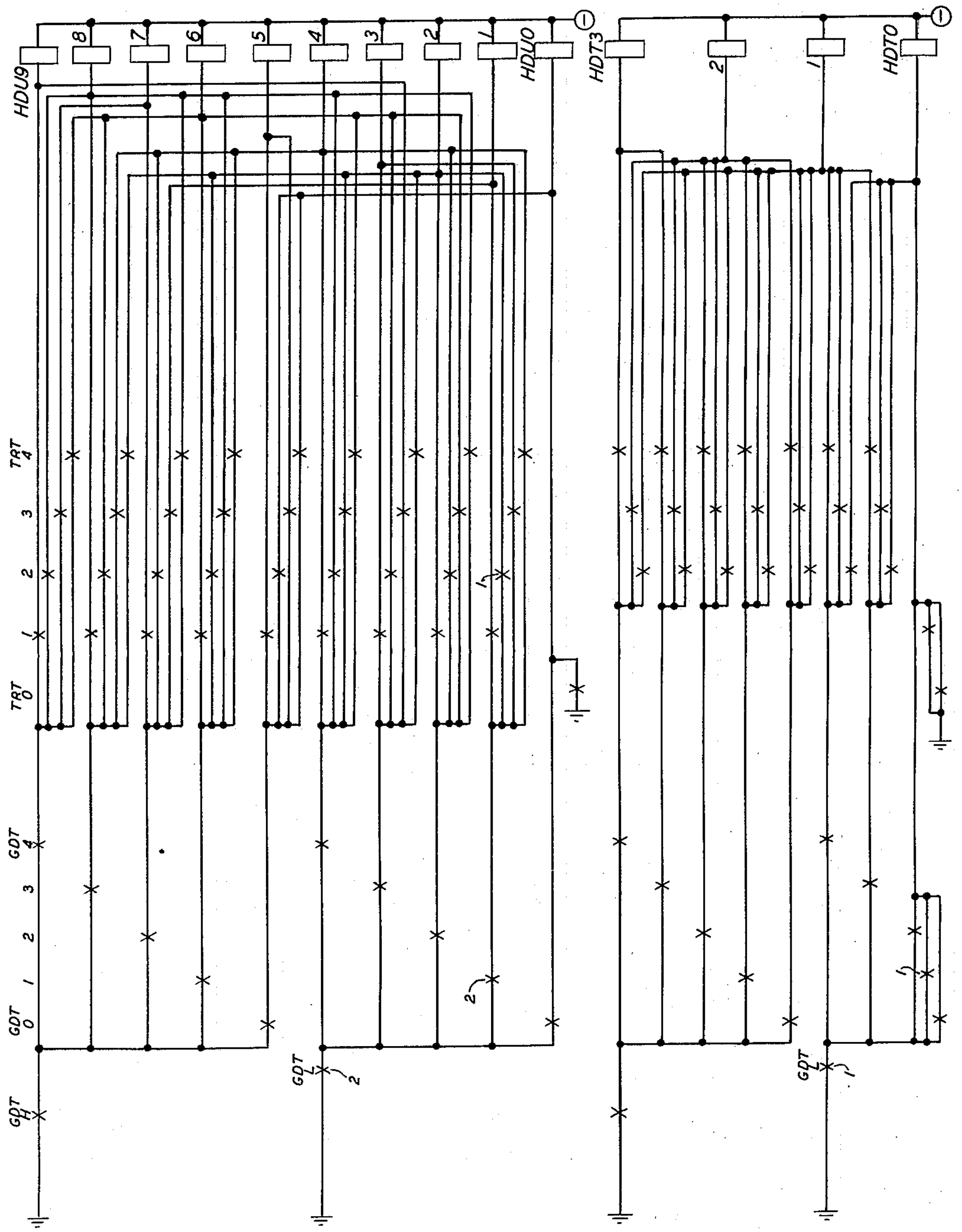
Figure 37:
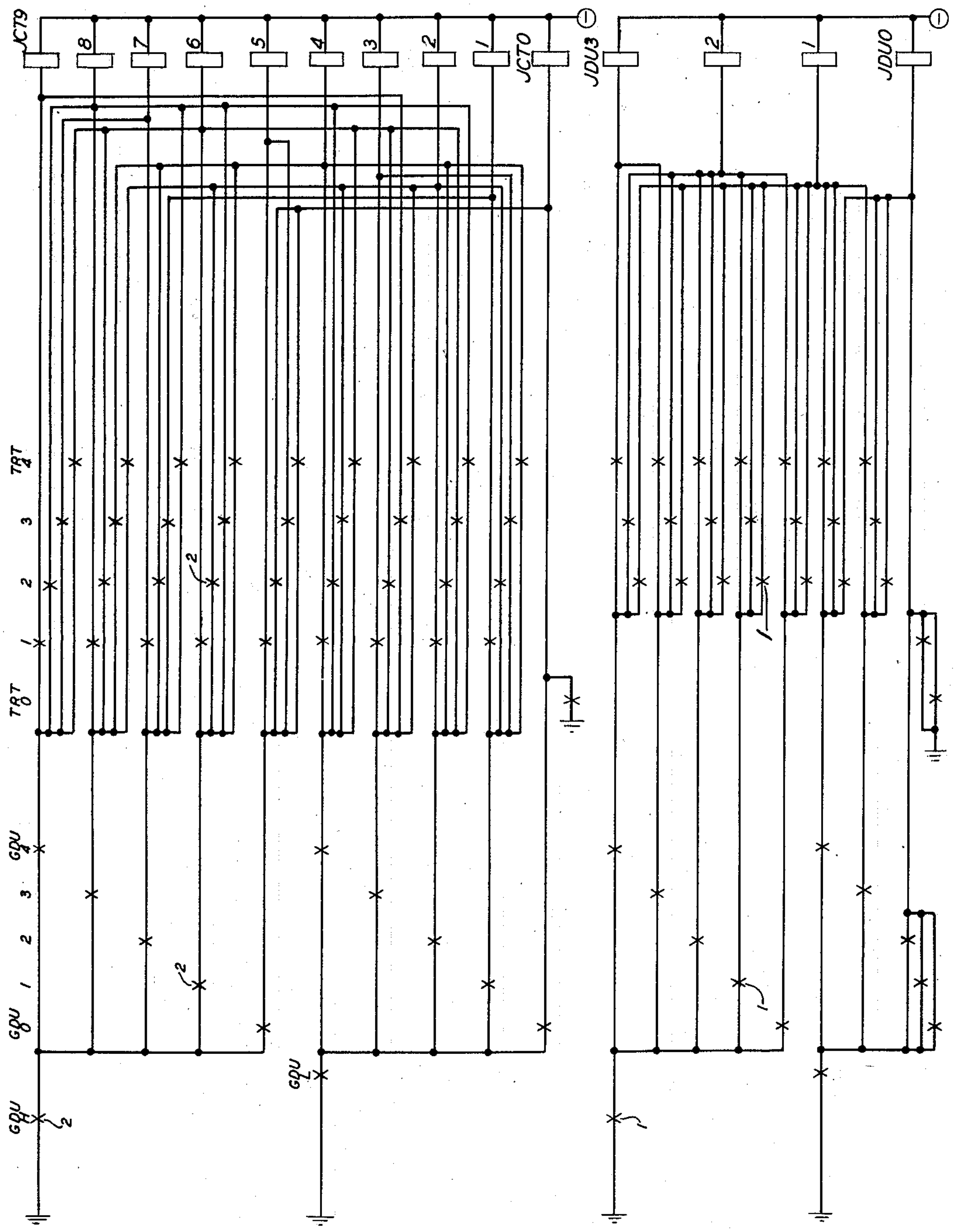
Figure 38:
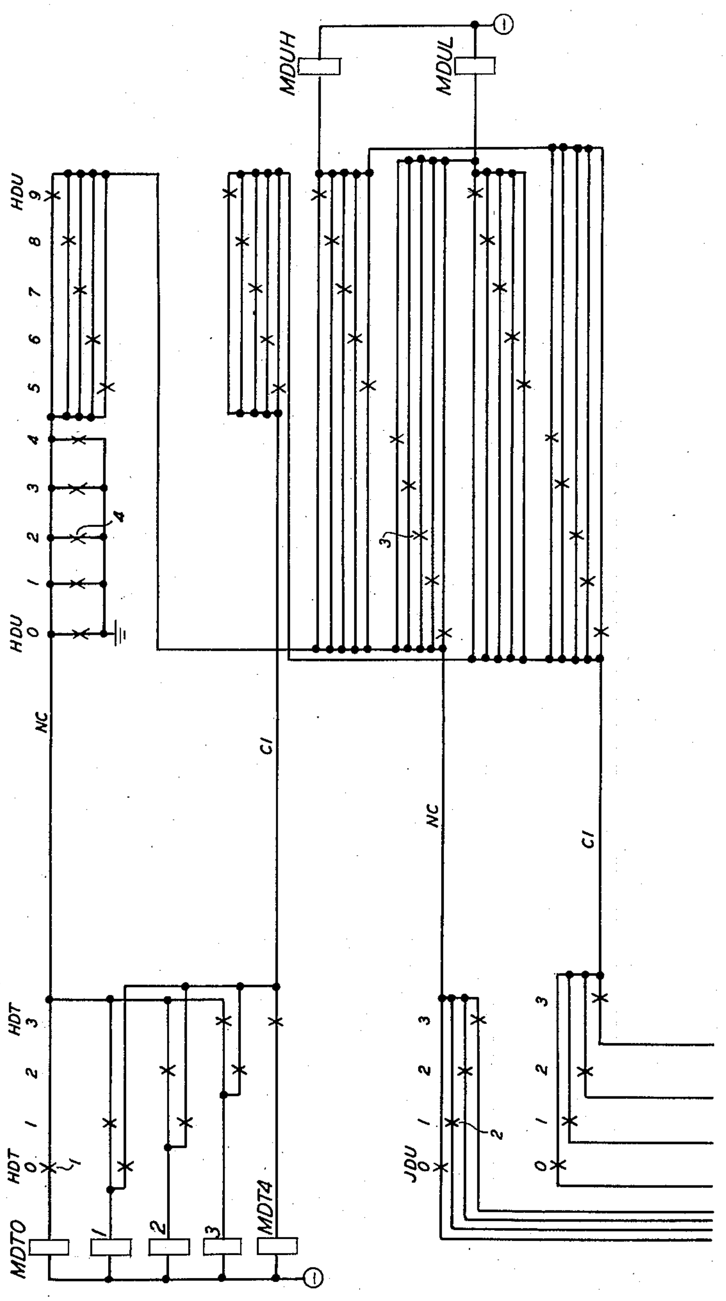

The charge output circuit is shown on Fig. 27 of the drawings. It comprises a set of contacts on each of the output relays in the charge adder. When the charge for a call is represented by the operation of certain output relays in the charge adder, the closed contacts on the operated relays transmit the charge data to the output registers in the tape-to-card converter. The closure of these contacts applies a ground over one lead in each of the four groups shown on Fig. 27. Each of these leads is connected to a relay in the output register of the tape-to-card converter and therefore, the application of a ground to a certain combination of leads operates their related relays in the output register to represent the charge for the call.

*Tax rate selector*

Figure 26:
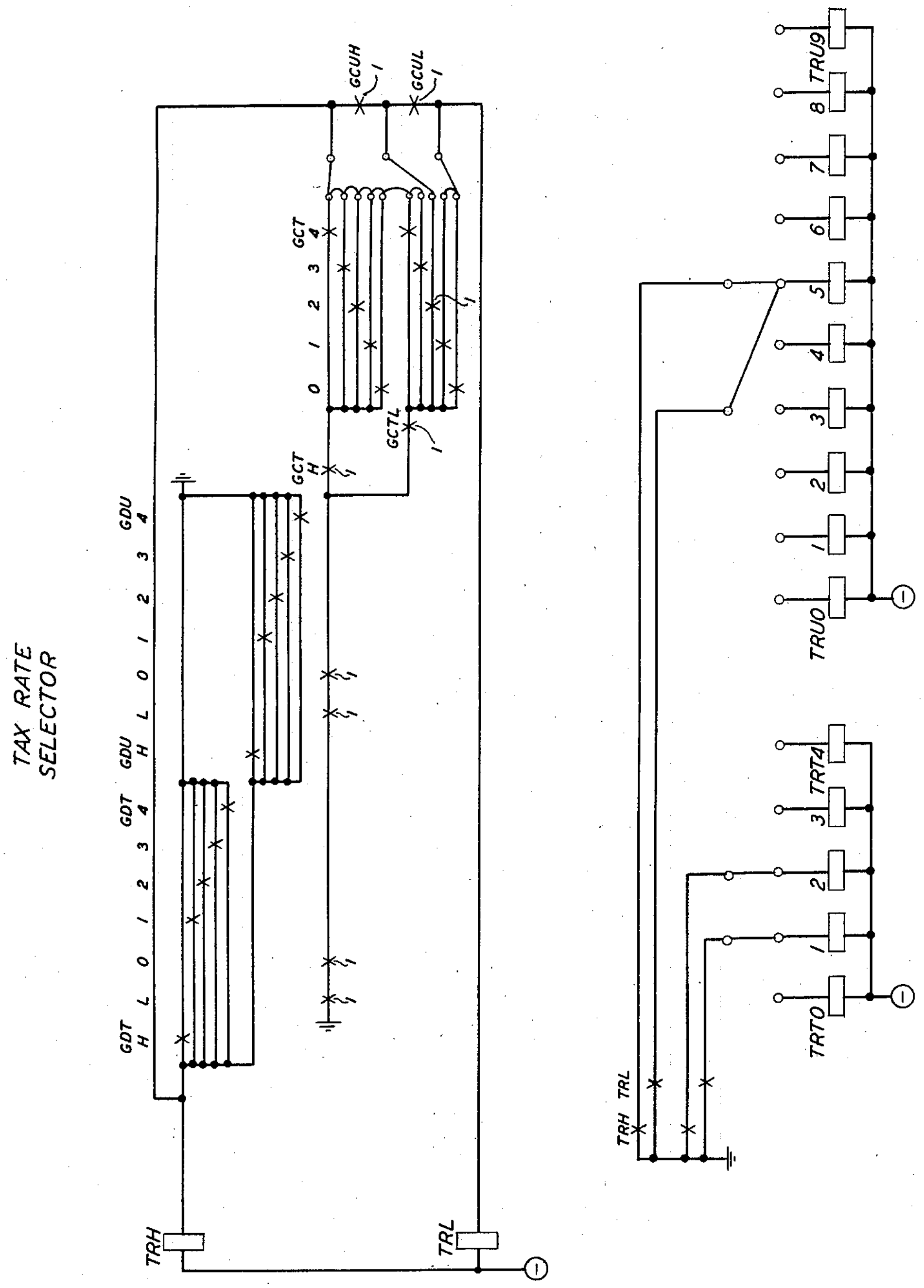

The tax rate selector is shown on Fig. 26. This circuit is designed for use with tax structures wherein the applicable tax rate is dependent upon the charge for the call. For example, under the tax structure in use a few years ago, all calls having a charge of $.20 and less were taxed a 15 percent rate, while calls having a charge of $.25 and greater were taxed at a 25 percent rate. The circuits on Fig. 26 are wired in accordance with a tax structure of this type.

The output relays of this circuit are relays TRT0 through TRT4 and TRU0 through TRU9, which indicate the tens digit and units digit, respectively, of the applicable tax and rate. These two groups of relays provide for a tax rate from 1 percent to 49 percent. In the event the tax rate changes the necessary circuit modifications may be easily made by means of the cross-connection terminal pairs associated with these relays.

Relays TRH and TRL, which stand for tax rate high and tax rate low, respectively, determine whether the high or the low rate is to be charged for each call. On the bottom half of Fig. 26 circuits are closed to operate relays TRT2 and TRU5 when the contacts of relay TRH are closed. Circuits are closed to operate relays TRT1 and TRU5 upon the closure of the contacts of relay TRL. Thus, the operation of relay TRH operates the proper output relays to indicate a tax rate of 25 percent, while the operation of relay TRL operates the output relays to indicate a tax rate of 15 percent. The contacts associated with relays TRT0 through TRT4 and TRU0 through TRU9 are shown with the tax rate multiplier circuit, wherein they are used to control the computation of the total tax that is to be charged. The transition point for the change in tax rates has been assumed to be $.25 and, therefore, upon the indication of any charge of $.25 or greater circuits are closed in the upper half of Fig. 26 to operate relay TRH which, in turn, as already has been explained, operates the output relays to indicate that the 25 percent tax rate is applicable.

Since the transition point has been assumed to be $.25, quite obviously, the appearance of any digit in the dollar tens or dollar units column of the total charge will represent a sum greater than $.25 and, therefore, the high tax rate should be applicable. In Fig. 26 a circuit is closed from ground to the winding of relay TRH to operate it in the event that the contacts of any of relays GDTH, GDT0 through GDT4, GDUH, and GDU1 through GDU4 are operated. The operation of any of these relays represents a digit other than 0 in either the dollar tens or dollar units column of the total charge.

If the dollar tens digit and dollar units digit of the total charge are both 0, an examination of the digits in the cents tens and cents units column must be made to ascertain which tax rate is applicable. When both the dollar tens and dollar units digit is a 0 and the cents tens digit is a 5, 6, 7, 8 or 9, a path is closed to operate relay TRH from ground on contacts 1 of relay GDTL through closed contacts 1 of relays GDT0, GDUL, GDU0, GCTH, and then through the operated one of contacts GCT0 through GCT4 which, in combination with relay GCTH operated, represents $.50, $.60, $.70, $.80, and $.90, respectively.

When the dollar tens digit and the dollar units digit is a 0 and the cents tens digit is a 3 or 4 a path is also closed to operate relay TRH from ground on closed contacts 1 of relay GDTL, through closed contacts 1 of relays GDT0, GDUL, GDU0, GCTL, and then through the operated one of contacts GCT3 or GCT4 which, in combination with relay GCTL operated, represents the quantity $.30 and $.40, respectively.

When the dollar tens digit and the dollar units digit are both a 0 and when the cents tens digit is a 0 or a 1, a path is closed to operate relay TRL from ground on contacts 1 of operated relay GDTL, through operated contacts 1 of relays GDT0, GDUL, GDU0, and GCTL and then through the operated one of contacts GDT0 or GDT1, which in combination with relay GCTL operated represents a cents tens digit of 0 or 1. The operation relay TRL operates the output relays to indicate a tax rate of 15 percent.

When the dollar tens digit and the dollar units digit are both a 0 and when the cents tens digit is a 2, examination must be made of the cents units digit to determine whether the high or low tax rate is applicable. This is necessary because the high rate is applicable for all calls of $.25 and greater while the low rate is applicable to calls for which the charge is less than $.25. Accordingly, under this condition, the following circuits are closed to operate either relay TRH or TRL: a ground on operated contacts 1 of relay GDTL is extended through the operated contacts of relays GDT0, GDUL, GDU0, GCTL, GCT2, and thence either through closed contacts 1 of relay GCUH operated to operate relay TRH or through closed contacts 1 of relay GCUL operated to the winding of relay TRL to operate it. At this time either one or the other, but not both, of relays GCUH and GCUL is operated. The operation of relay GCUH in combination with the operation of relay GCT2 indicates a charge of $.25, while the operation of relay GCUL in combination with the operation of relay GCT2 indicates a charge of $.20. Accordingly, the operation of relay GCUH in combination with these other aforementioned relays operates relay TRH which operates the output relays to indicate a rate of 25 percent, while the operation of relay GCUL operates relay TRL which, in turn, operates the output relays to indicate a charge of 15 percent.

In our hypothetical call we have determined that the charge is $16.45. The registration of this charge closes a circuit to operate relay TRH from ground on the contacts of both relays GDUH and GDU1 to the winding of relay TRH. This relay now operates and in turn, operates relays TRT2 and, TRT5 which, together, represent a tax rate of 25 percent.

*Tax multiplier*

The tax multiplier, which is shown on Figs. 28 through 37 of the drawings, multiplies the charge for the call, as obtained from the charge adder circuit, by the applicable tax rate, as obtained from the tax rate selector, to compute the tax for the call. This circuit is similar in principle to the overtime multiplier which has already been described. This tax is in the form of eight partial products and comprises 16 bits of information.

Figure 61:
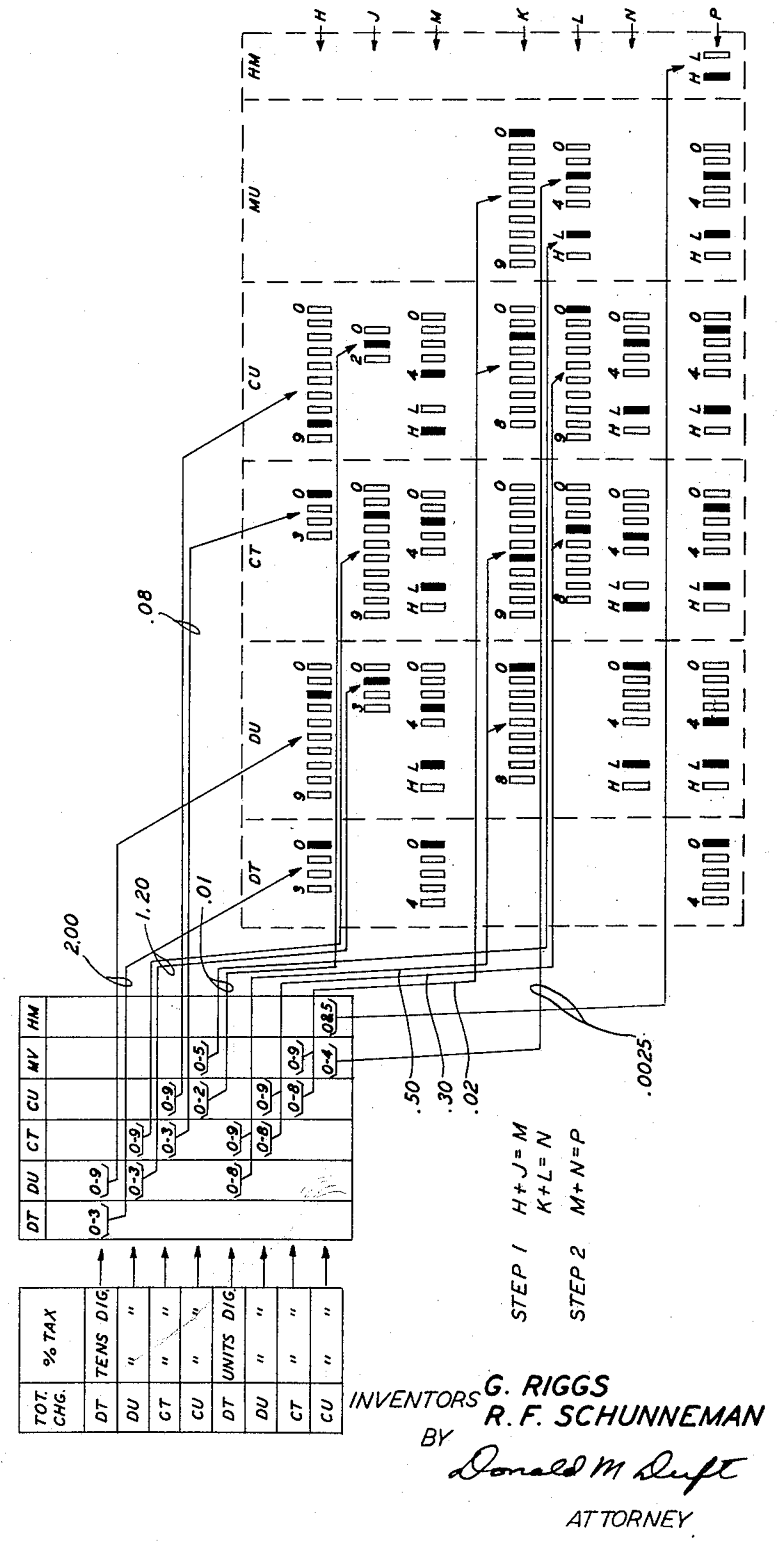

The manner in which this circuit works may be more fully understood from a study of Tables 4 and 5, as contained on Figs. 57 and 61, respectively, of the drawings. Table 4 illustrates how the tax for any call may be computed by breaking the charge and the tax rate down to component parts. The process of computing tax in connection with Table 4 has already been described earlier in the specification. The leftmost rectangle in Fig. 61 illustrates the manner in which the eight partial products comprising the 16 bits of information are obtained. These eight partial products comprise: the product of the tens digit of the percent tax by the dollar tens, dollar units, cents tens and cents units digits, respectively, of the total charge, and the product of the units digit of the tax rate by the dollar tens, dollar units, cents tens and cents units digits, respectively, of the total charge. Each of these eight partial products comprises two bits of information as indicated on the middle rectangle on Fig. 61. As is shown on Fig. 61, the product of the tens digit of the tax rate by the dollar tens digit of the total charge appears in the dollar tens and dollar units columns of both the tax multiplier and the tax adder. Similarly, the product of the tens digit of the tax rate by the dollar units digit of the total charge appears in the dollar units and cents tens columns. The product of the tens digit of the tax rate by the cents tens digit of the total charge appears in the cents tens and cents units columns. The product of the tens digit of the tax rate by the cents units digit of the total charge appears in the cents units and mills units columns.

The product of the units digit of the tax rate by the dollar tens digit of the total charge appears in the dollar units and cents tens columns. The product of the units digit of the tax rate and the dollar units digit of the total charge appears in the cents tens and the cents units columns. The product of the units digit of the tax rate and the cents tens digit of the total charge appears in the cents units and the mills units columns. The product of the units digit of the tax rate and the cents units digit of the total charge appears in the mills units and half-mill columns.

The circuit operations of the tax multiplier will now be described in connection with our hypothetical call for which the total charge was computed to be $16.45 and for which the tax rate was found to be 25 percent. The total charge is manifested by the operation of the G register relays, shown on the bottom of Fig. 3 by the darkened rectangles. These are, relays GDTL, GDT1, GDUH, GDU1, GCTL, GCT4, and GCUH. The tax rate of 25 percent is manifested by the closed contacts of operated relays TRT2 and TRU5.

The first portion of the tax multiplier circuit to be described is that which multiplies the tens digit of the tax rate by the doller tens digit of the total charge and inserts the product into the dollar tens and dollar units columns of the H register in the charge adder. These circuits are shown on Fig. 36. The following circuit is now closed to operate relay HDT0; from ground on contacts 1 of relay GDTL operated, through contacts 1 of relay GDT1 operated to the winding of relay HDT0. A path is also closed to operate relay HDU2 from ground on contacts 2 of relay GDTL operated, through contacts 2 of relay GDT1 operated and contacts 1 of relay TRT2 operated to the winding of relay HDU2. The operation of relays HDT0 and HDU2 is indicated by the darkened rectangles in the dollar tens and dollar units columns of the H register, shown in the large rectangle on Fig. 61. The operation of relay HDT0 indicates that the dollar tens digit is a 0 while the operation of relay HDU2 indicates a dollar units digit of 2.

Next described are the circuits in the tax multiplier which multiply the tens digit of the tax rate by the dollar units digit of the total charge. These circuits are shown on Fig. 37. The closed contacts 1 of relay GDUH extend a ground through closed contacts 1 of relays GDU1 and TRT2 to the winding of relay JDU1 which now operates. The closed contacts 2 of relay GDUH extend a ground through the closed contacts 2 of relays GDU1 and TRT2 to operate relay JCT2. The operation of relays JDU1 and JCT2 represent a dollar units digit of 1 and a cents tens digit of 2, respectively, and are entered into the appropriate columns of the J register, as indicated by the darkened rectangles on Fig. 62.

The quantity $.08, which is the product of the cents tens digit of the total charge by the tens digit of the tax rate, is manifested in the output relays of the tax multiplier by the operation of relays HCT0 and HCU8. The circuits for performing this operation are shown on Fig. 29. Ground is extended through closed contacts 1 of relay GCTL, through closed contacts 1 of relays GCT4 and TRT2, to the winding of relay HCT0 to operate it. A circuit is closed to operate relay HCU8 from ground on closed contacts 2 of relay GCTL, through closed contacts 2 of relays GCT4 and TRT2, to the winding of relay HCU8. The operation of relays HCT0 and HCU8 represent a cents tens digit of 0 and cents units digit of 8, respectively, in the H register.

The quantity $.01, which is the product of the cents units digit of the total charge by the tens digit of the tax rate, is manifested in the output circuit by the operation of relays JCU1 and LMUL. The circuits for these relays are shown on Fig. 31. The relay JCU1 operates from the ground extended through closed contacts 1 of relays GCUH and TRT2. Relay LMUL operates from the ground extended through operated contacts 2 of relays GCUH and TRT2. The operation of relays JCU1 and LMUL together represent the sum of $.01 in the output circuit of the tax multiplier.

The quantity $.50, which is the product of the dollar tens digit of the total charge and the units digit of the tax rate, is manifested in the output circuit of the tax multiplier by the operation of relays KDU0 and KCT5. The circuit for relay KDU0 is shown on Fig. 34. A circuit to operate this relay is closed from ground on contacts 1 of relay GDTL operated, through contacts 1 of relay GDT1 operated to the winding of relay KDU0. The circuit for relay KCT5 is shown on Fig. 32. A circuit is closed to operate this relay from ground on contacts 2 of relay GDTL operated, through operated contacts 2 of relays GDT1 and TRU5 to the winding of relay KCT5. The operation of relays KDU0 and KCT5 together represent the quantity $.50.

The quantity $.30, which is the product of the dollar units digit of the total charge and the units digit of the tax rate, is manifested in the output circuit of the tax multiplier by the operation of relays LCT3 and LCU0. The circuit for relay LCT3 is shown on Fig. 35. Relay LCT3 operates from ground on closed contacts 1 of relay GDUH, through closed contacts 1 of relays GDU1 and TRU5 to the winding of relay LCT3. The circuit for relay LCU0 is shown on Fig. 33. This relay operates from ground on closed contacts 3 of relay GDUH through closed contacts 1 of relays GDU1 and TRU5 to the winding of relay LCU0. Relays LCT3 and LCU0 together represent the quantity $.30.

The quantity $.02, which is the product of the cents tens digit of the total charge and the units digit of the tax rate, is manifested in the output of the tax multiplier by the operation of relays KCU2 and KMU0. The circuit for relay KCU2 is shown on Fig. 28. This relay operates from ground on operated contacts 3 of relay GCTL which is extended through closed contacts 3 of relays GCT4 and TRU5 to the winding of relay KCU2. The circuit for relay KMU0 is shown on Fig. 30. This relay operates from ground on closed contacts 4 of relay GCTL, which is extended through closed contacts 4 of relays GCT4 and TRU5, to the winding of relay KMU0. The operation of relays KCU2 and KMU0 together represent the quantity $.02.

The quantity $.0025, which is the product of the cents units digit of the total charge and units digit of the tax rate, is manifested in the output circuit of the tax multiplier by operated relays LMU2 and PHMH. The circuit for these relays is shown on Fig. 31. Relay LMU2 is operated from ground on closed contacts 3 of relay GCUH which is extended through closed contacts 3 of relay TRU5 to the winding of relay LMU2. Relay PHMH is operated from a ground on closed contacts 4 of relay GCUH which is extended through closed contacts 4 of relay TRU5 to the winding of relay PHMH. The operation of relays PHMH and LMU2 together with relay LMUL, which already was operated as has been described, represents the quantity $.0025.

The relays whose operations have been described above and which are represented in the large rectangle in Fig. 61 by the darkened smaller rectangles, represent the 16 bits of information which are fed to the tax adder circuit. The contacts for these relays are shown in connection with the tax adder, wherein they control the operation of that circuit in computing the total tax for the call.

*Tax adder*

The charge adder circuit receives the eight partial products obtained by the tax multiplier in multiplying the total charge by the tax rate. This information is received in the form of closed contacts on the relays constituting the output circuit of the tax multiplier. The 16 bits of information comprising the eight partial products are entered into the H, J, K, and L registers, as shown on Fig. 61. Upon the receipt of this information the tax adder performs two simultaneous additions. It adds the amounts in the H and J registers and enters the sum into the M register. At the same time it adds the amounts in the K and L registers and enters the sum thereof into the N register. However, the quantities in the mills units column of the K and L registers are added and entered into the appropriate P register rather than the N since none of the H, J, or M registers have any entries in the mills units column. The computed amounts contained in the M and N registers are added together and then entered into the P register. This register constitutes the output circuit of the tax adder and its setting represents the computed tax for the call.

The detailed circuit operations of the tax adder will now be described. These circuits are shown on Figs. 38 through 54 of the drawings. First described will be the manner in which the quantities in the H and J registers are added and the result thereof entered into the M register.

Figure 42:
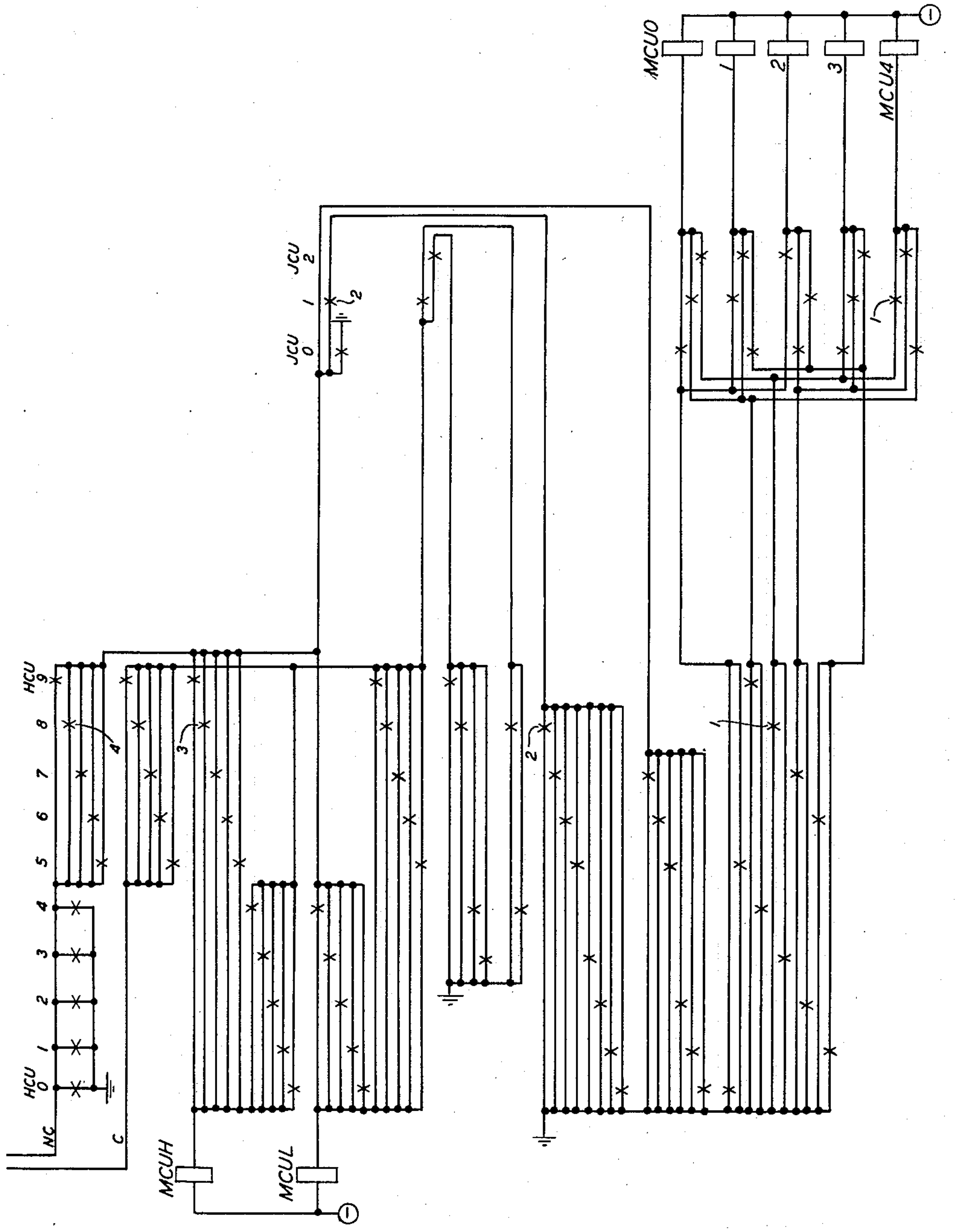

The quantity $.08 in the cents units column of the H register is added to the quantity $.01 in the same column of the J register and the sum of $.09 is entered into the cents units column of the M register in the following manner. The $.08 in the H register is represented by relay HCU8 operated while the $.01 in the J register is represented by relay JCU1 operated. A circuit on Fig. 42 is closed from ground on operated contacts 1 of relay HCU8, through closed contacts 1 of relay JCU1 to the winding of relay MCU4 to operate it. Another circuit is also closed on Fig. 42 from ground on contacts 2 of relay HCU8 operated, through contacts 2 of relay JCU1 operated, through contacts 3 of relay HCUH, to the winding of relay MCUH to operate it. Operated relays MCUH and MCU4 represent in biquinary form the quantity $.09.

Next, the quantity 0 in the cents tens column of the H register is added to the quantity $.20 in the cents tens column of the J register and the resultant sum of $.20 is entered into the M register. The quantity 0 is represented in the H register by the operation of relay HCT0. The quantity $.20 is represented in the J register by the operation of relay JCT2.

Figure 40:
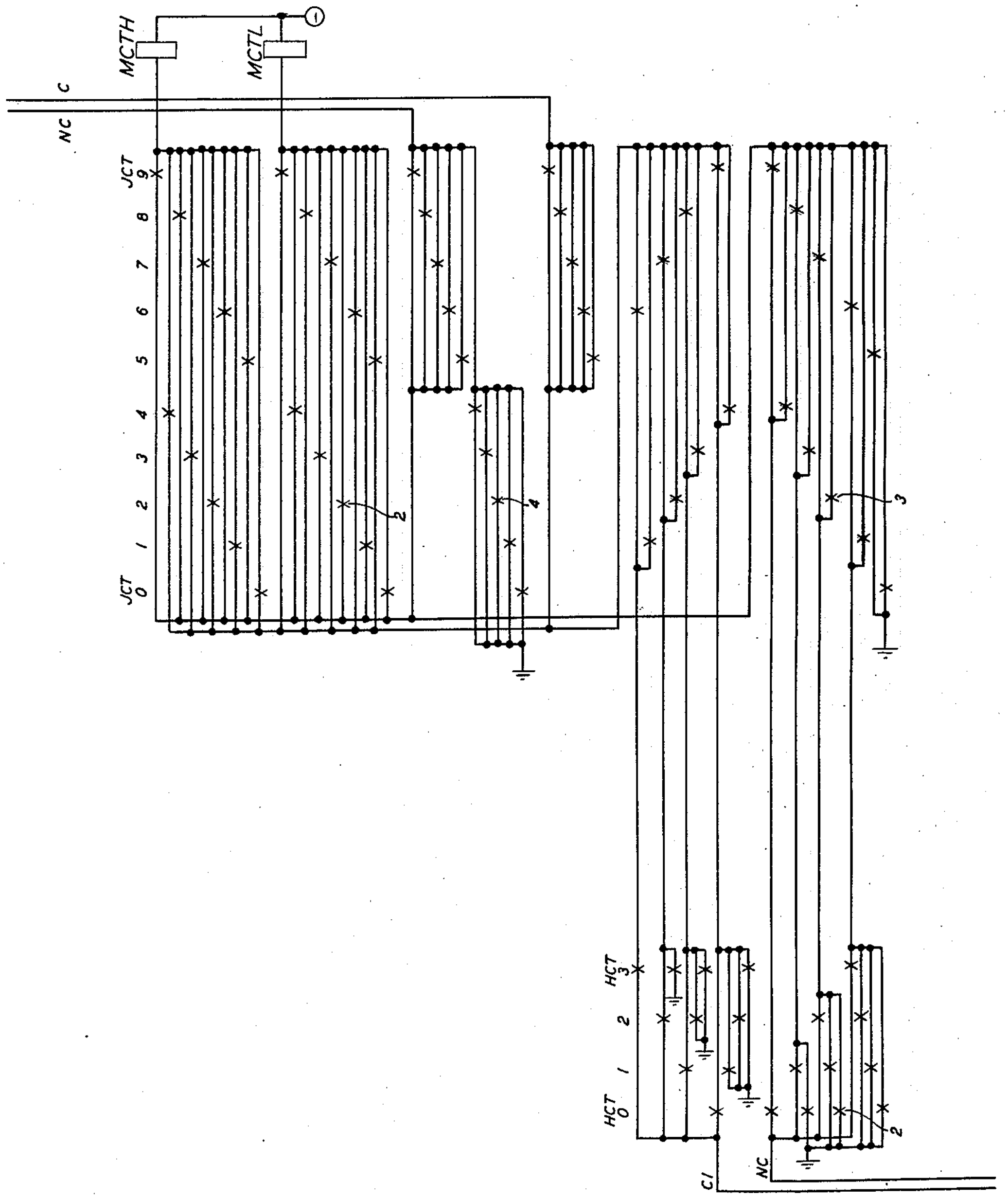
Figure 41:
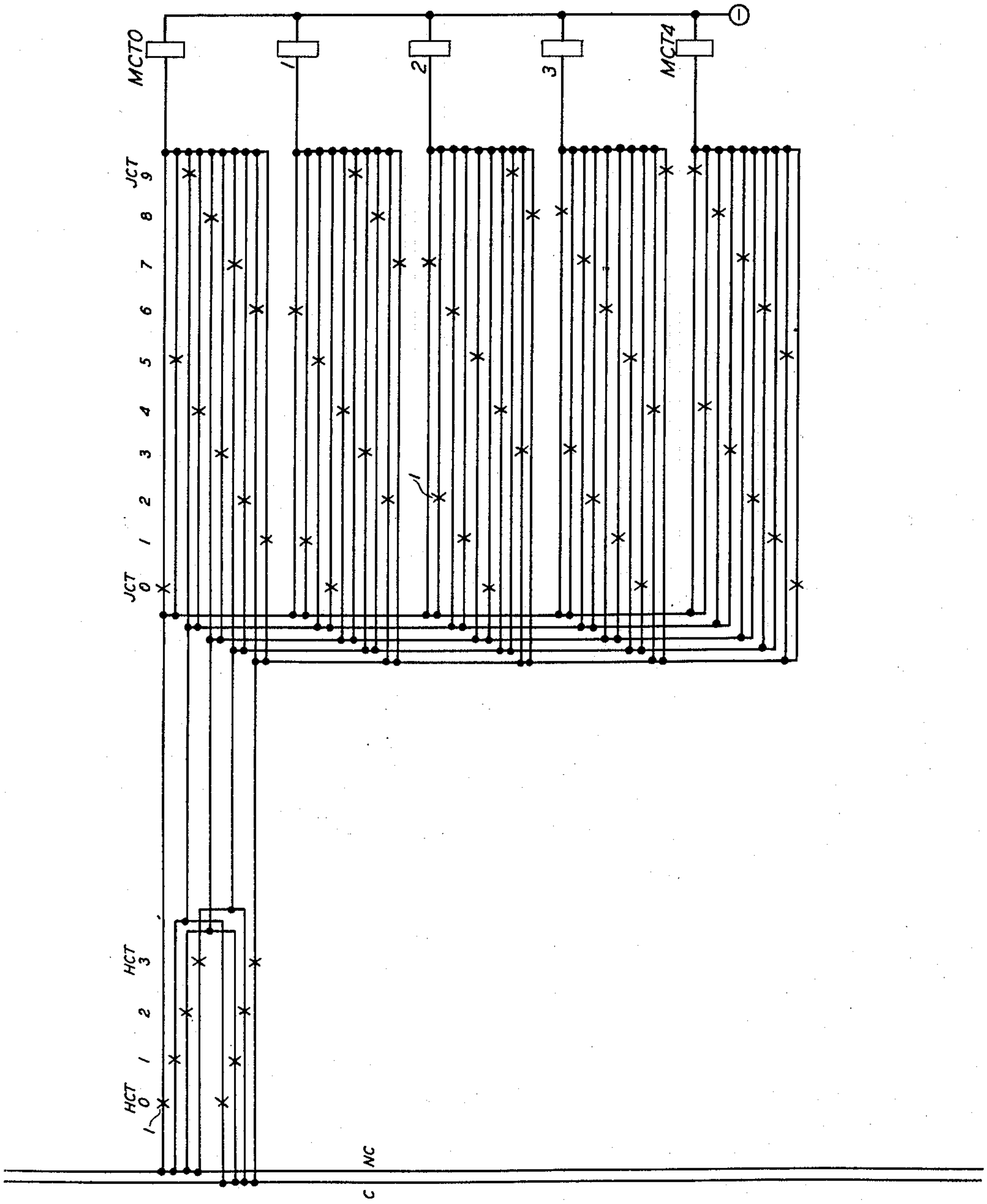

A path is closed to operate relay MCT2 from ground on closed contacts 2 of relay HCU8 on Fig. 42, through closed contacts 2 of relay JCU1, through closed contacts 4 of relay HCU8, over lead NC, through closed contacts 1 of relay HCT0 on Fig. 41, through contacts 1 of operated relay JCT2 to the winding of relay MCT2, which now operates. A circuit shown on Fig. 40 is closed from ground on contacts 2 of operated relay HCT0, through closed contacts 3 of relay JCT2, through closed contacts 2 of relay JCT2, to the winding of relay MCTL, which now operates. The operation of relays MCTL and MCT2 represents a biquinary 2 in the cents tens digit of the M register.

Next, the tax adder adds the quantity $2.00 in the dollar units column of the H register to the $1.00 in the dollar units column of the J register and inserts the sum of $3.00 in the dollar units column of the M register. The $2.00 in the H register is represented by the operation of relay HDU2. The $1.00 in the J register is represented by the operation of relay JDU1.

Figure 39:
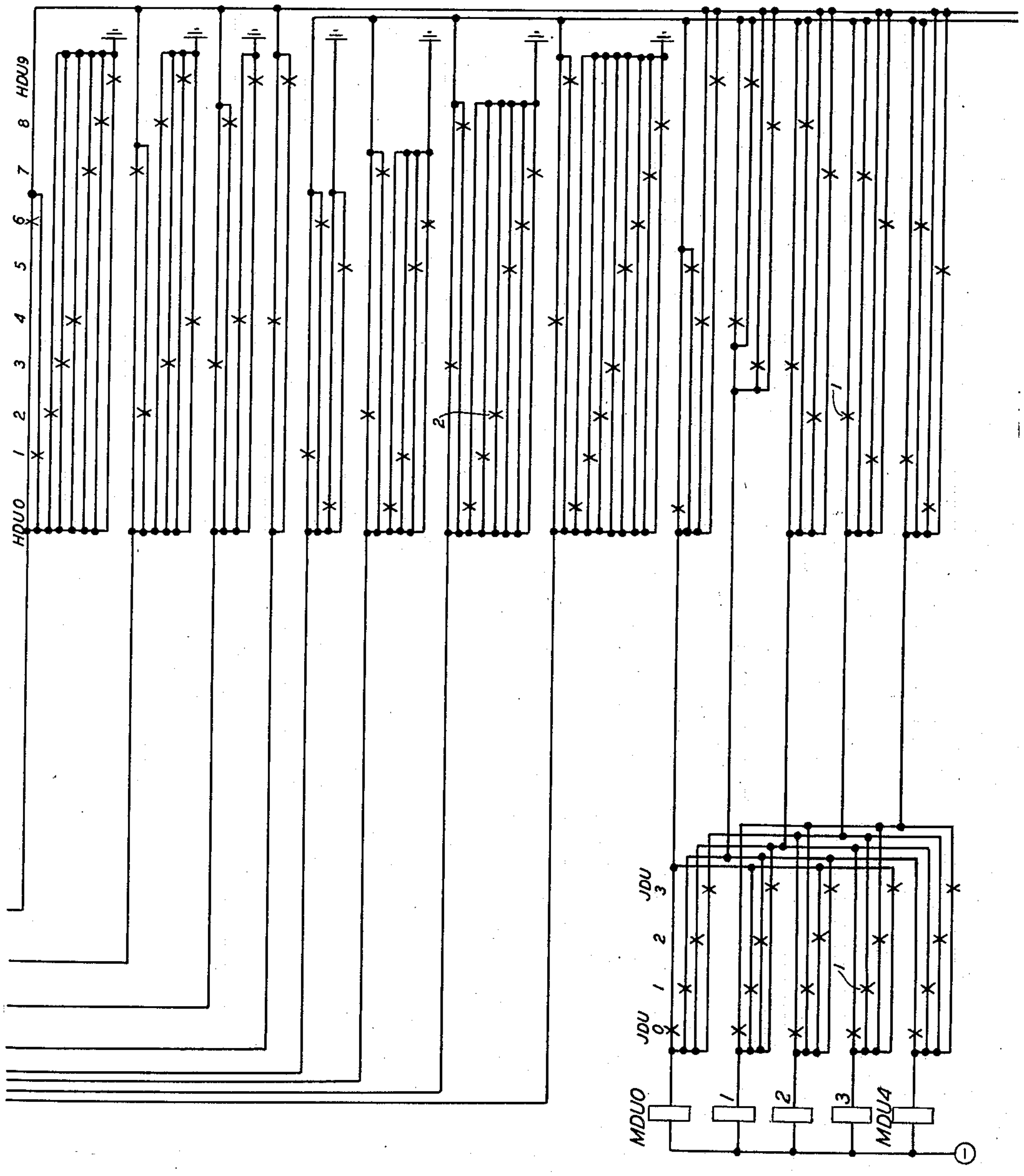

A path is now closed on Fig. 40 from ground on closed contacts 4 of relay JCT2, over the no carry (NC lead) through closed contacts 1 of relay HDU2 on Fig. 39, through closed contacts 1 of relay JDU1, to the winding of relay MDU3 which now operates. A path is also closed from ground on Fig. 39 through closed contacts 2 of relay HDU2, through closed contacts 2 of relay JDU1 on Fig. 38, over the no carry lead, through closed contacts 3 of relay HDU2 to the winding of relay MDUL which now operates. The operation of relays MDUL and MDU3 represents a biquinary 3.

Next, the quantity 0 in the dollar tens column of the H register which is manifested by the operation of relay HDT0 is transferred to the M register. Accordingly, a circuit is now closed to operate relay MDT0 on Fig. 38 from ground on closed contacts 4 of relay HDU2, through closed contacts 1 of relay HDT0 to the winding of relay MDT0 which operates.

At the same time that the tax adder adds the amounts in the H and J registers and enters the sum in the M register, it also adds the amounts in the K and L registers and enters the sum into the N register. There is one exception, however, the quantities in the mills units column of the L and K registers are added and the sum is entered into the P register rather than the N register since none of the H, J or M registers have any entries in the mills units column.

The quantity 0 in the mills units column of the K register is added to the quantity 2 in the same column of the L register and the answer of 2 is entered in biquinary form in the mills units column of the P register. The digit 0 in the mills units column of the K register is manifested by the operation of relay KMU0, while the digit 2 in the mills units column of the L register is manifested by the operation of relays LMU2 and LMUL. A circuit is closed on Fig. 50 to operate relay PMU2 from ground on closed contacts 1 of relay KMU0 through closed contacts 1 of relay LMU2 to the winding of relay PMU2. A circuit is also closed from ground on closed contacts 2 of relay KMU0 on Fig. 50, through closed contacts 2 of relay LMU2, over the NC lead to Fig. 49, through closed contacts 1 of relay LMUL, through closed contacts 3 of relay KMU0, to the winding of relay PMUL which now operates. The operation of relays PMUL and PMU2 together represents a biquinary 2 in the mills units column of the P register.

Next, the digit 2 in the cents units column of the K register, as manifested by the operation of relay KCU2, is added to the digit 0 in the same column of the L register as manifested by the operation of relay LCU0. The sum thereof is entered into the cents units column of the N register.

Figure 48:
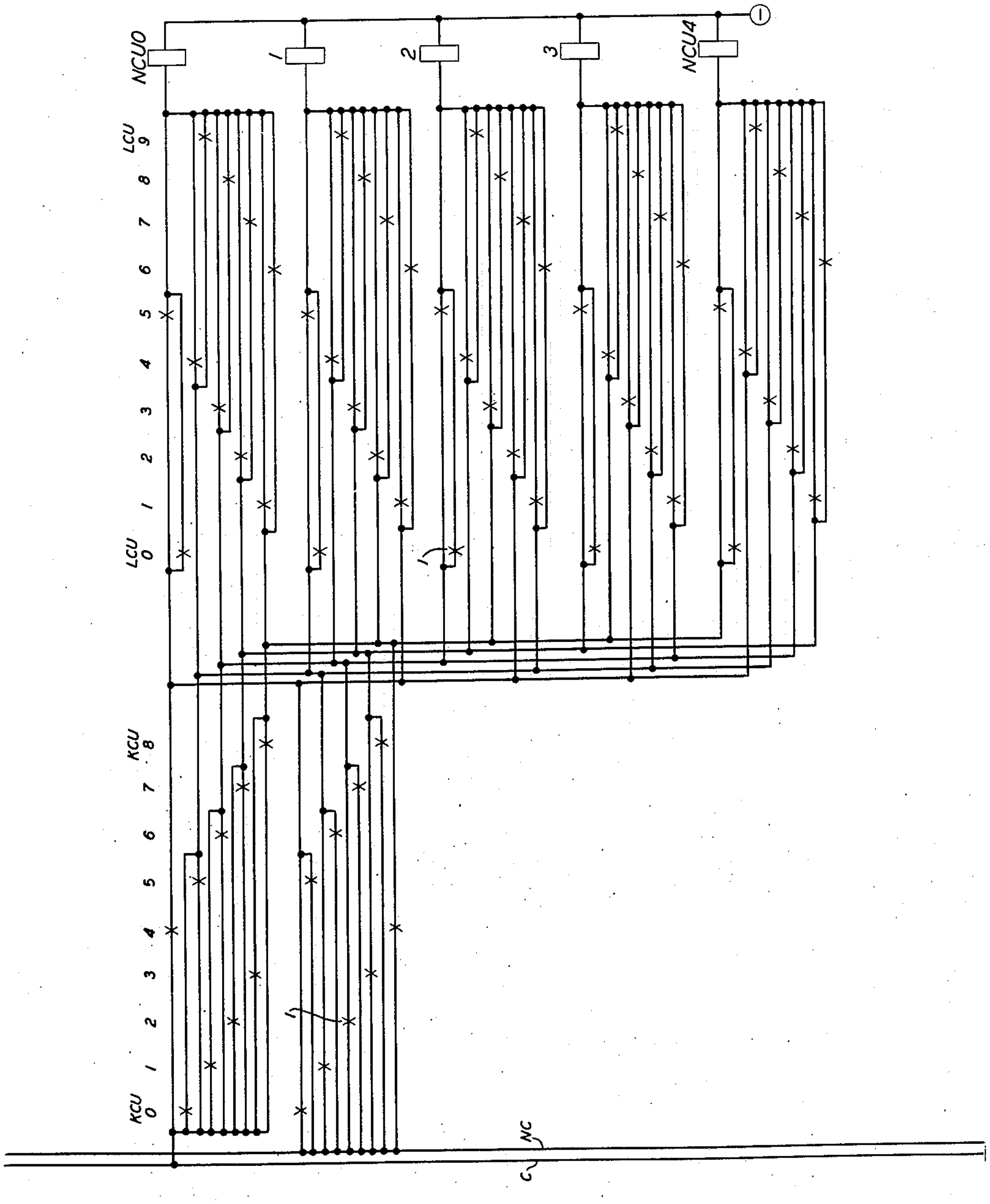
Figure 49:
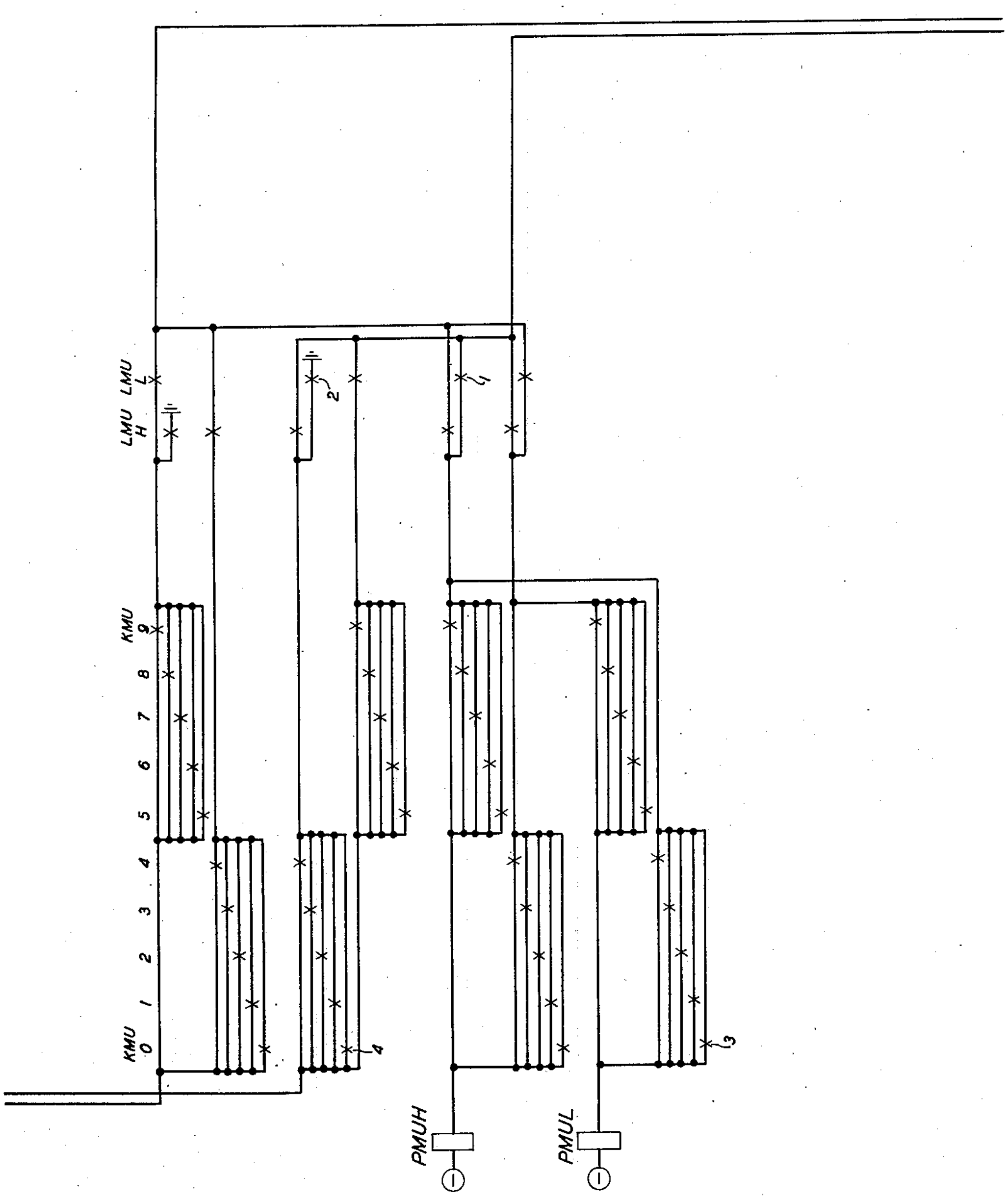
Figure 50:
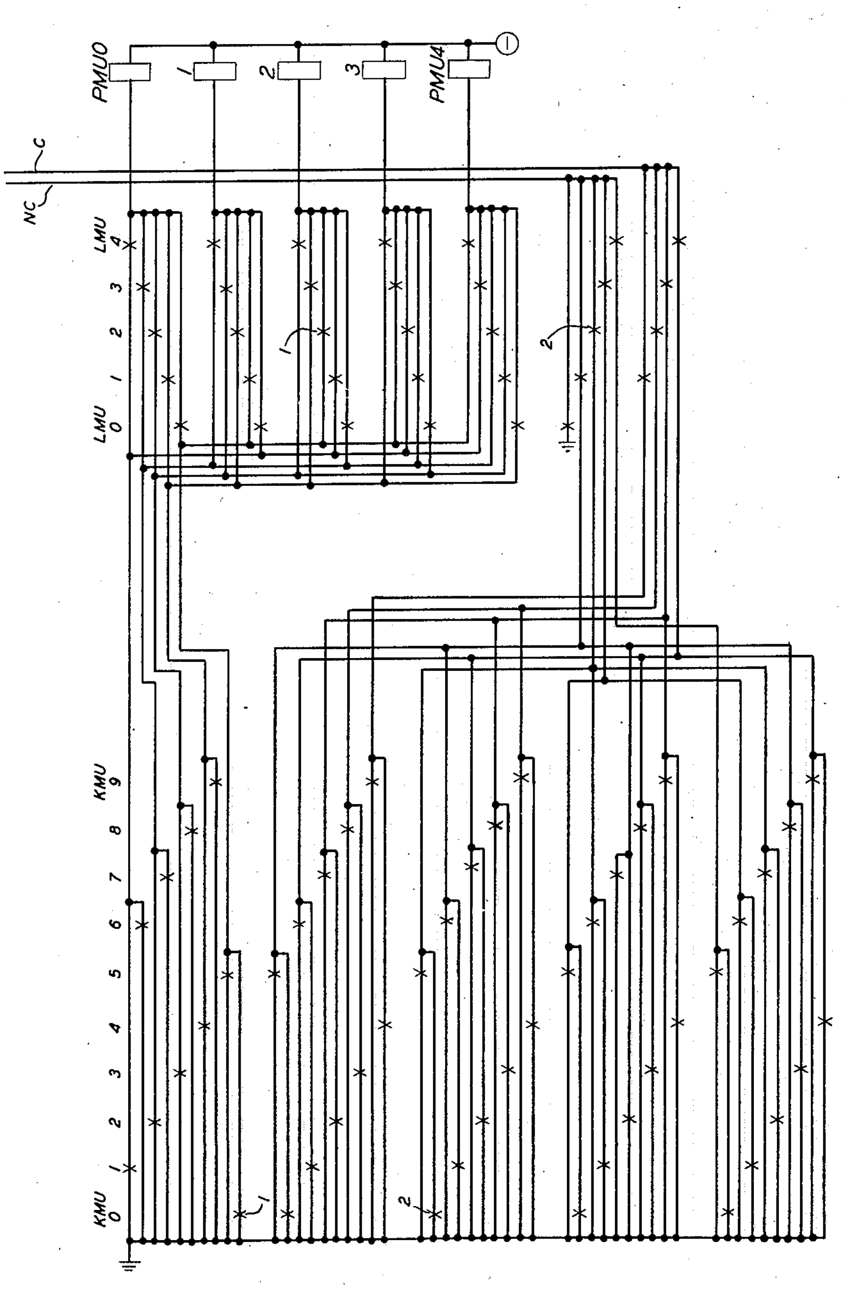

A path is closed to operate relay NCU2 from ground on closed contacts 2 of relay LMUL on Fig. 49, through closed contacts 4 of relay KMU0 on Fig. 49, over the NC lead to Fig. 48, through closed contacts 1 of relays KCU2 and LCU0 to the winding of relay NCU2 which now operates. A path is also closed to operate relay NCUL from ground on closed contacts 2 of relay KCU2 on Fig. 47, through closed contacts 2 of relay LCU0 on Fig. 47, over the no carry lead to Fig. 46, through closed contacts 3 and 4 of relays LCU0 and KCU2, respectively, to the winding of relay NCUL, which now operates. The operation of relay NCUL on Fig. 46 and relay NCU2 on Fig. 48 together manifest a biquinary 2 in the cents units column of the N register.

The tax adder next adds the digit 5 in the cents tens column of the K register to the digit 3 in the same column of the L register and puts the sum of 8 in the cents tens column of the N register.

Figure 44:
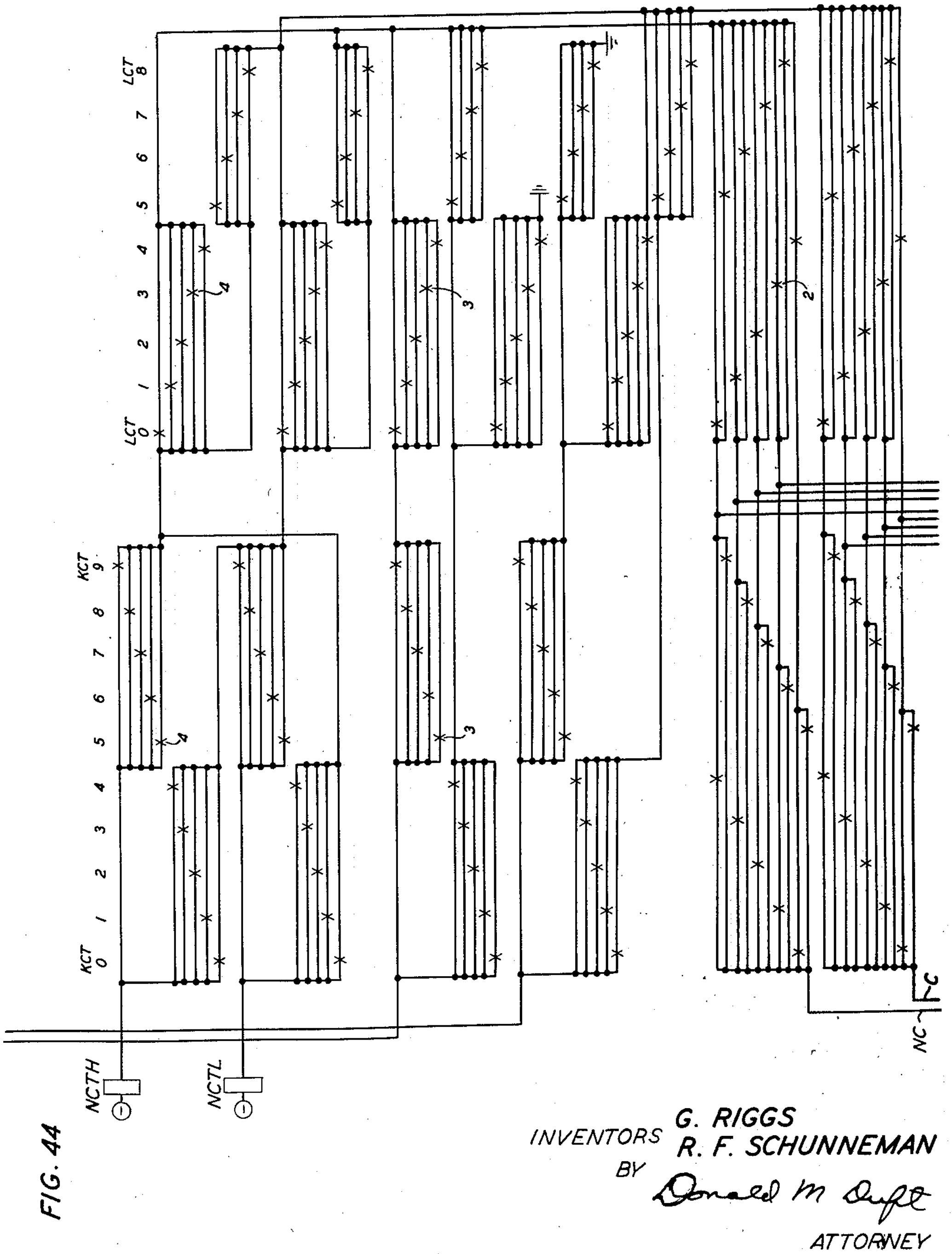
Figure 44A:
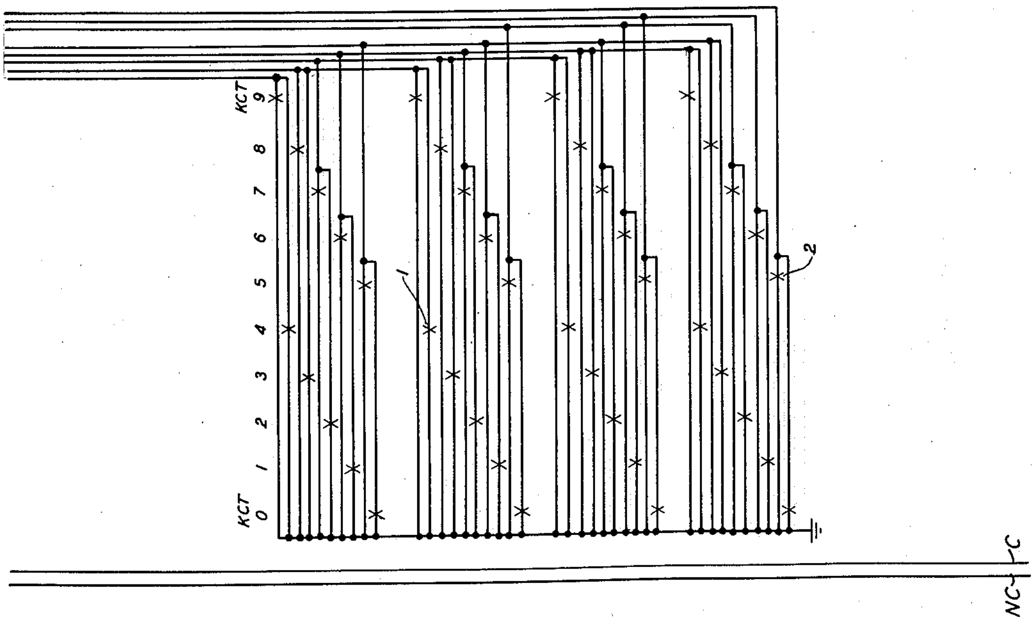
Figure 45:
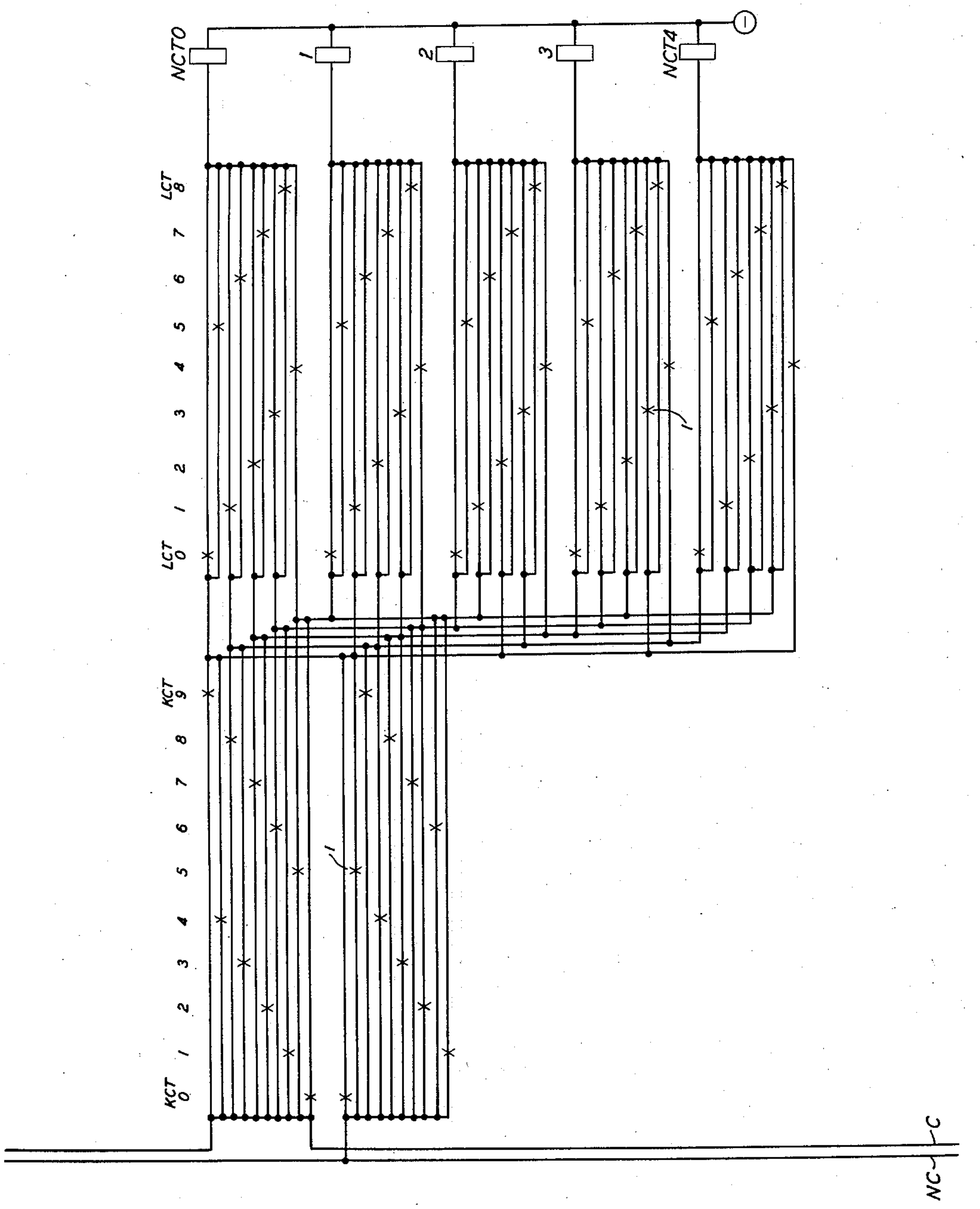
Figure 46:
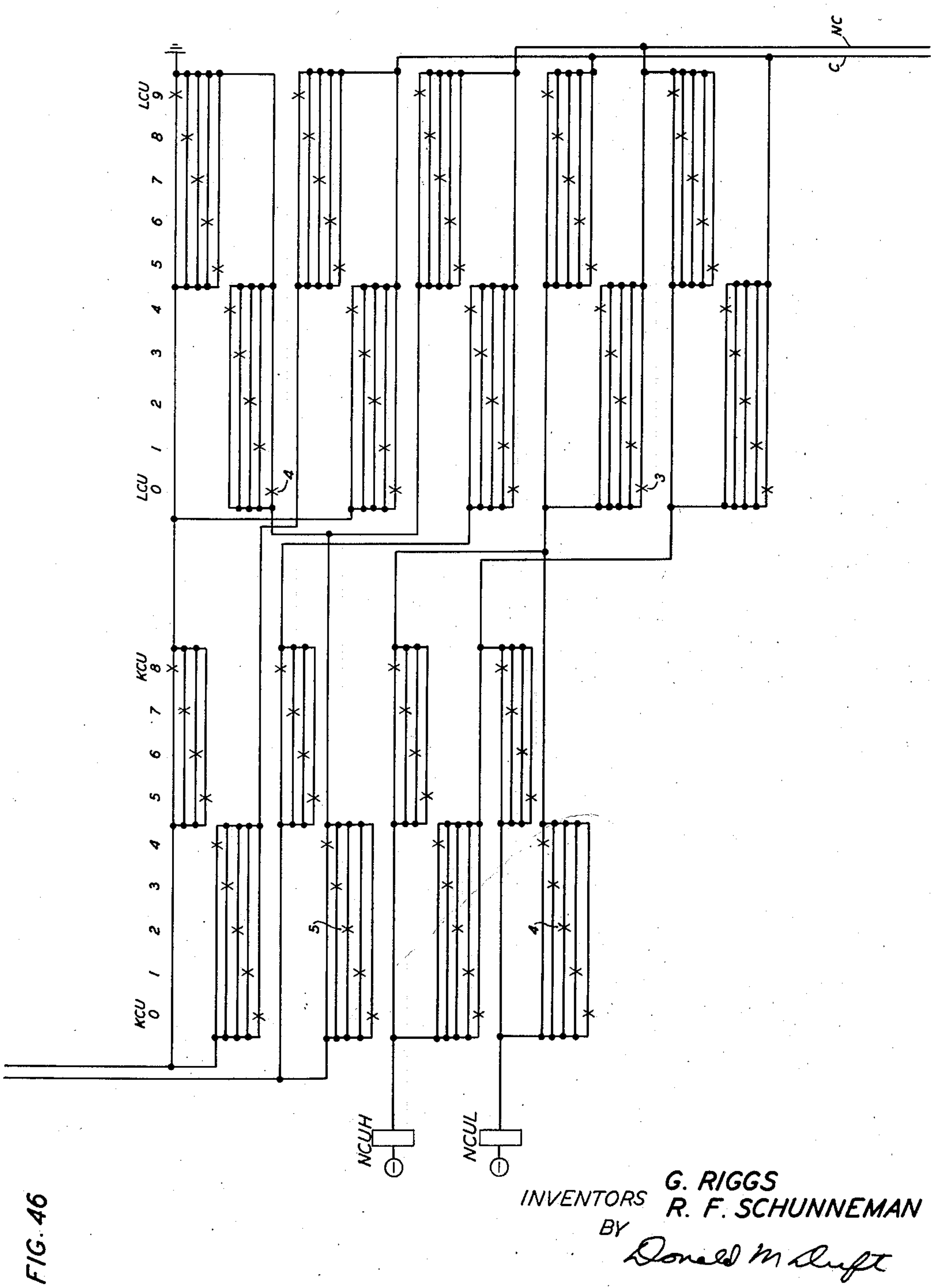
Figure 47:
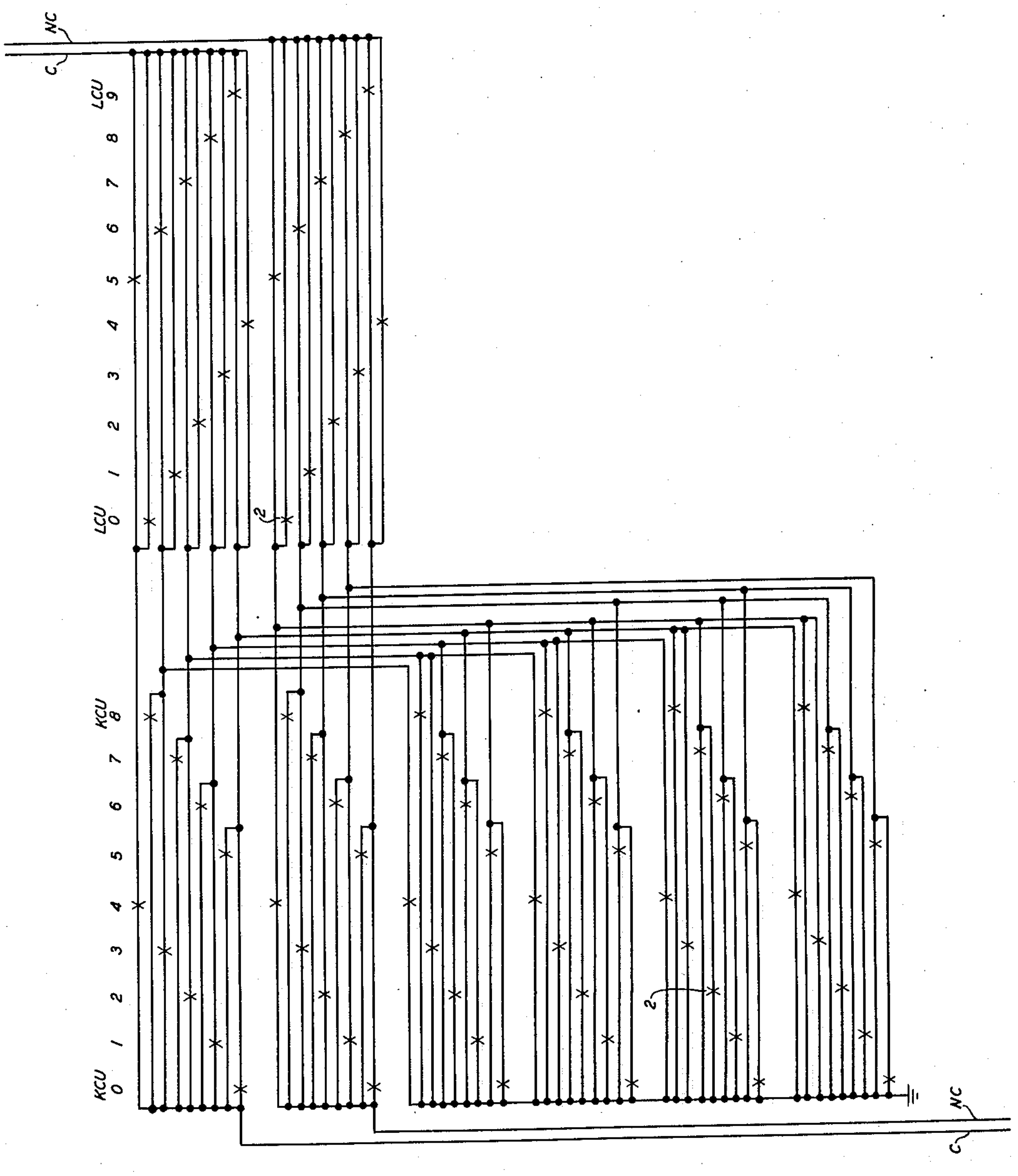

A circuit is closed to operate relay NCT3 on Fig. 45 from a ground on closed contacts 4 of relay LCU0 on Fig. 46, through closed contacts 5 of relay KCU2 on Fig. 46, over the no carry lead to Fig. 45, through closed contacts 1 of relays KCT5 and LCT3 to the winding of relay NCT3 which now operates. A ground is also closed to operate relay NCTH on Fig. 44 from a ground on closed contacts 2 of relay KCT5 on Fig. 44A, through closed contacts 2 of relay LCT3 on Fig. 44, through closed contacts 4 of relays LCT3 and KCT5 to the winding of relay NCTH, which now operates. The operation of relays NCTH and NCT3 together manifest a biquinary 8 in the cents tens column of the N register.

Next, the quantity 0 in the dollar units column of the K register is entered in biquinary form in the same column of the N register.

Figure 43:
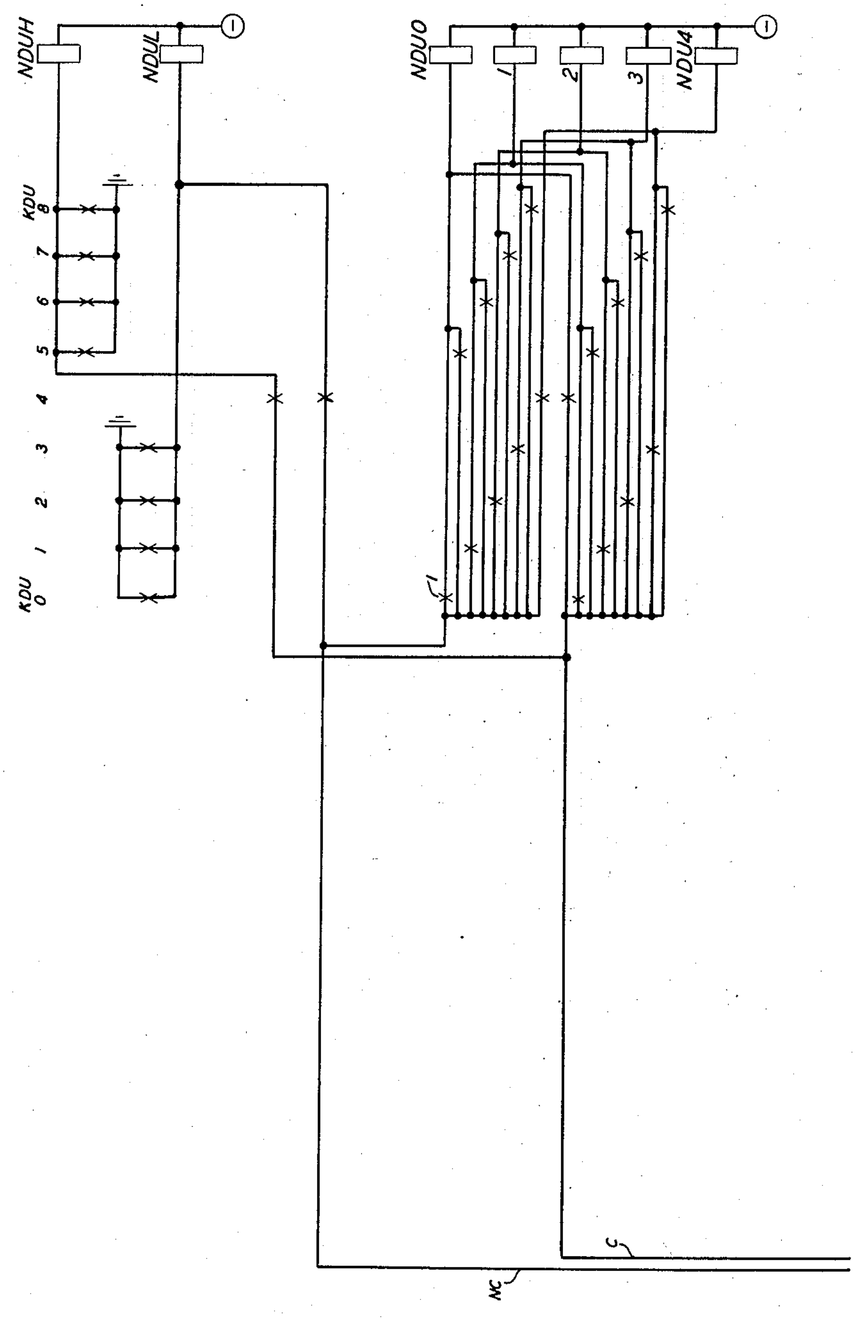

A circuit is closed to operate relay NDU0 on Fig. 43 from ground on contacts 2 of relay KCT5 on the Fig. 44A, through contacts 2 of relay LCT3 in Fig. 44, through contacts 3 of relay LCT3, through contacts 3 of relay KCT5, over the no carry lead to Fig. 43, through closed contacts 1 of relay KDU0 to the winding of relay NDU0, which now operates. A path is closed to operate relay NDUL directly from ground on the closed contacts of relay KDU0. Relays NDUL and NDU0 operate together manifest a biquinary 0 in the dollar units column of the N register.

The tax adder now adds the quantity in the M register to the quantity in the N register and enters the sum thereof in the P register which is the output circuit for the tax adder.

No addition is performed in connection with the half-mills column since this amount is entered directly into the column of the P register by the tax multiplier circuit. It has already been described in connection with the tax multiplier how relay PHMH is operated to represent the quantity $.0025.

In connection with the mills units column of the P register, it has already been described how only the K and L registers contain entries in this column and how the 0 in the K register was added to the 2 in the L register and how the sum of 2 was entered in biquinary form in the P register by the operation of relays PMUL and PMU2.

Next, the biquinary 9 in the cents units column of the M register, which is manifested by the operation of relays MCUH and MCU4, is added to the biquinary 2 in the cents units column of the N register, which is manifested by the operation of relays NCUL and NCU2, and the sum thereof is entered as a biquinary 1 in the P register with a carry of 1 to the cents tens column of the P register. The biquinary 1 is represented in the cents units column of the P register by the operation of relays PCUL and PCU1.

Figure 54:
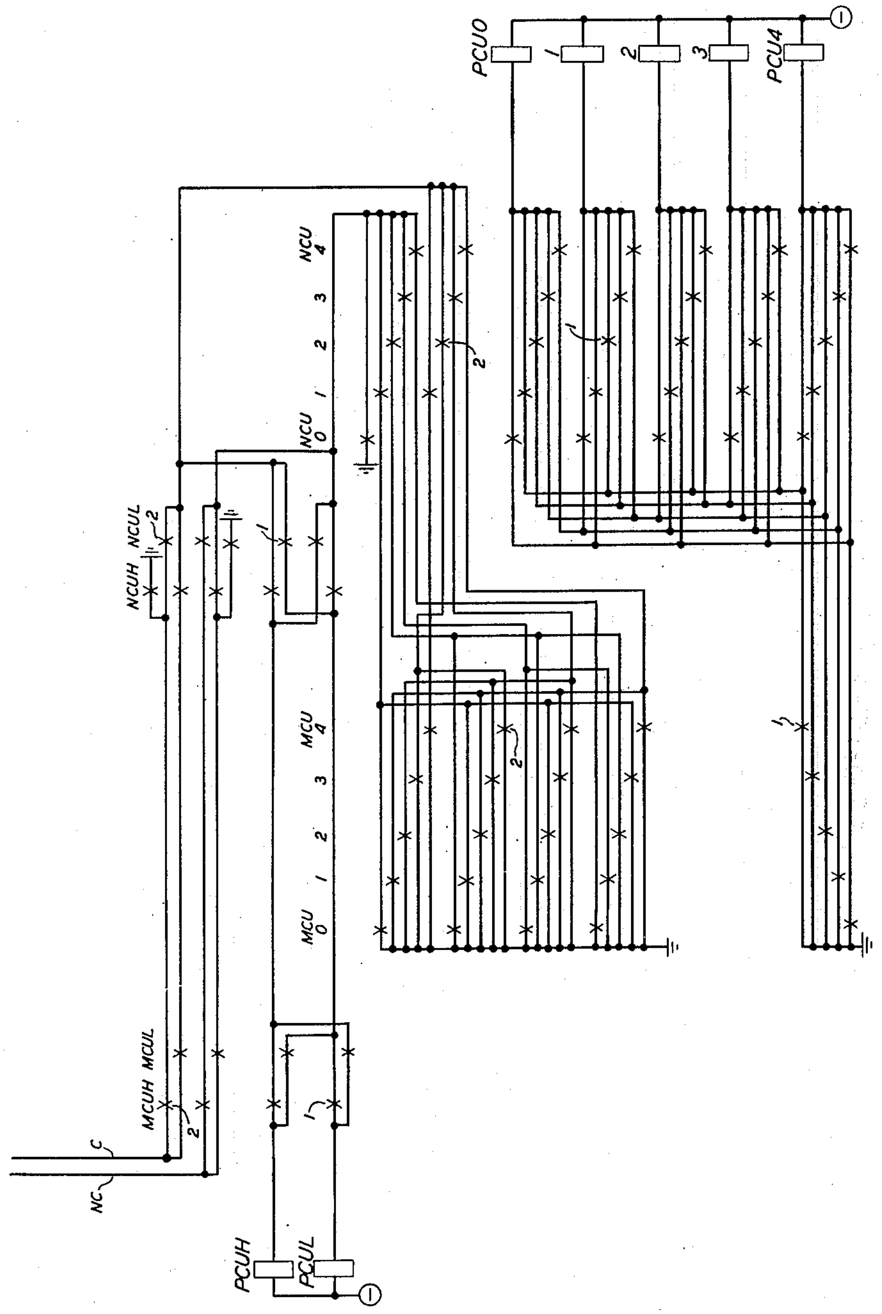
Figure 58:
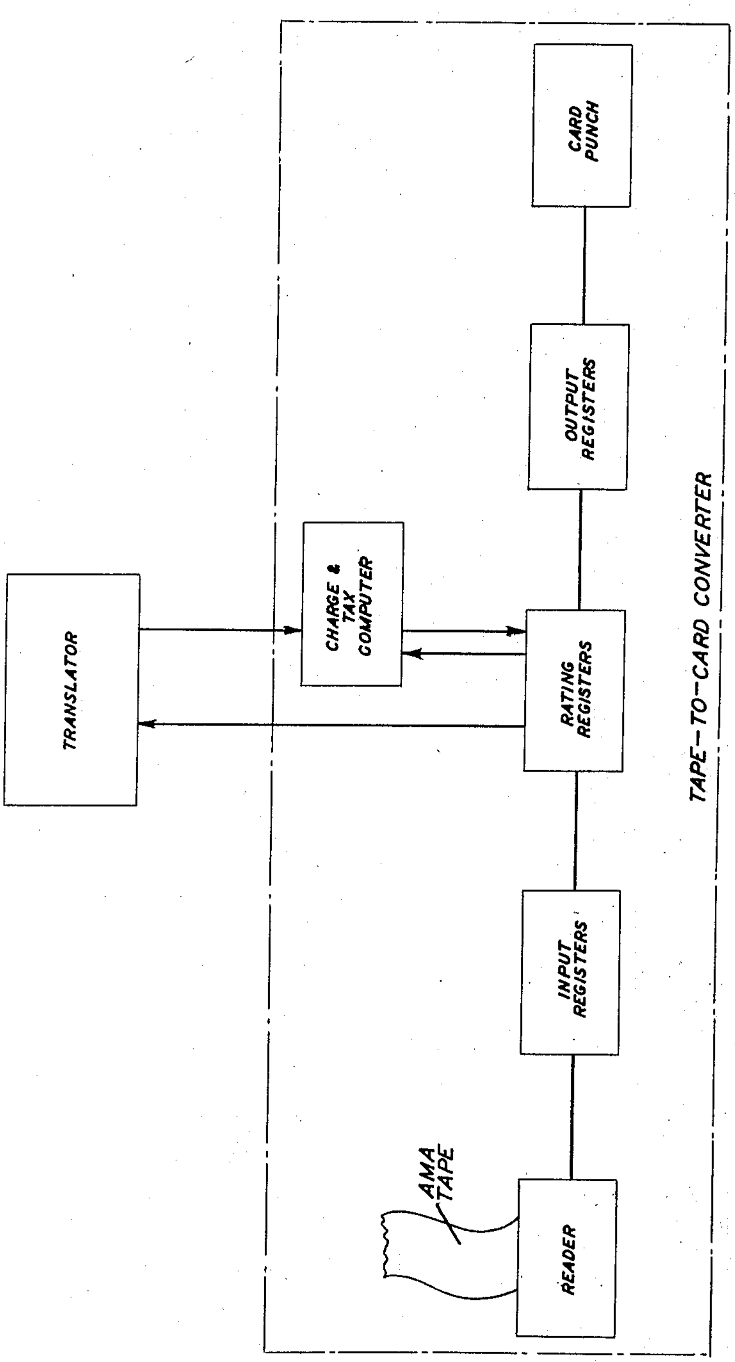
Figure 59:
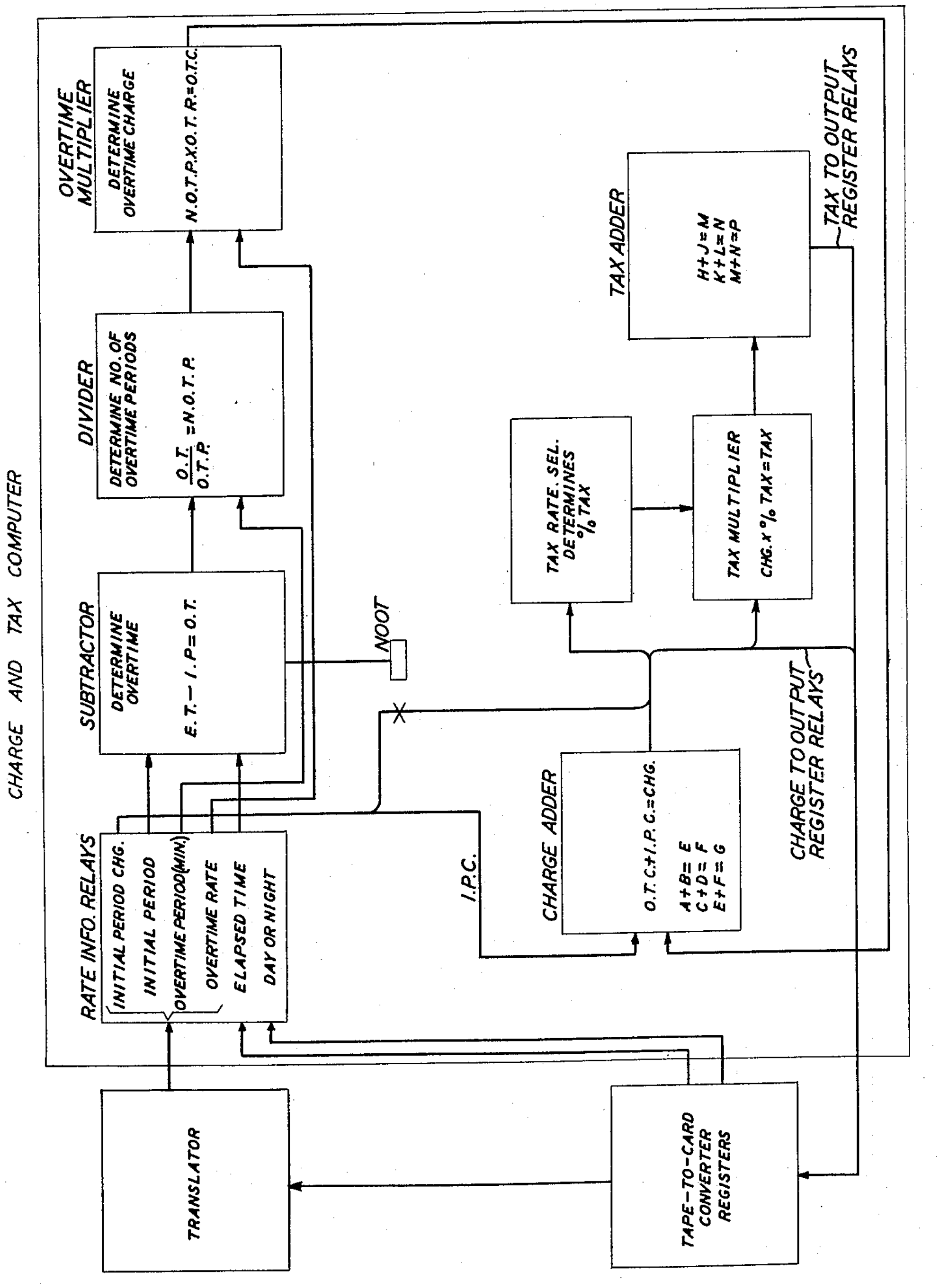

A path on Fig. 54 is closed from ground on contacts 1 of relay MCU4, through contacts 1 of relay NCU2 to operate relay PCU1. The path is also closed on Fig. 54 from ground on closed contacts 2 of relay MCU4, through closed contacts 2 of relay NCU2, through contacts 1 of relays NCUL and MCUH to the winding of relay PCUL which operates. The operation of relays PCUL and PCU1 represents the biquinary 1 in the cents units column of the P register.

The tax adder now adds the biquinary 2 in the cents tens column of the M register, as indicated by the operation of relays MCTL and MCT2, to the biquinary 8 in the cents tens column of the N register, as represented by the operation of relays NCTH and NCT3. To the sum of these two quantities is added a carry one from the cents units column and the answer of 11 is entered in the cents tens column of the P register as a 1 with a carry of a one to the next higher order. The biquinary 1 is represented in the cents tens column of the P register by operation of relays PCTL and PCT1.

Figure 53:
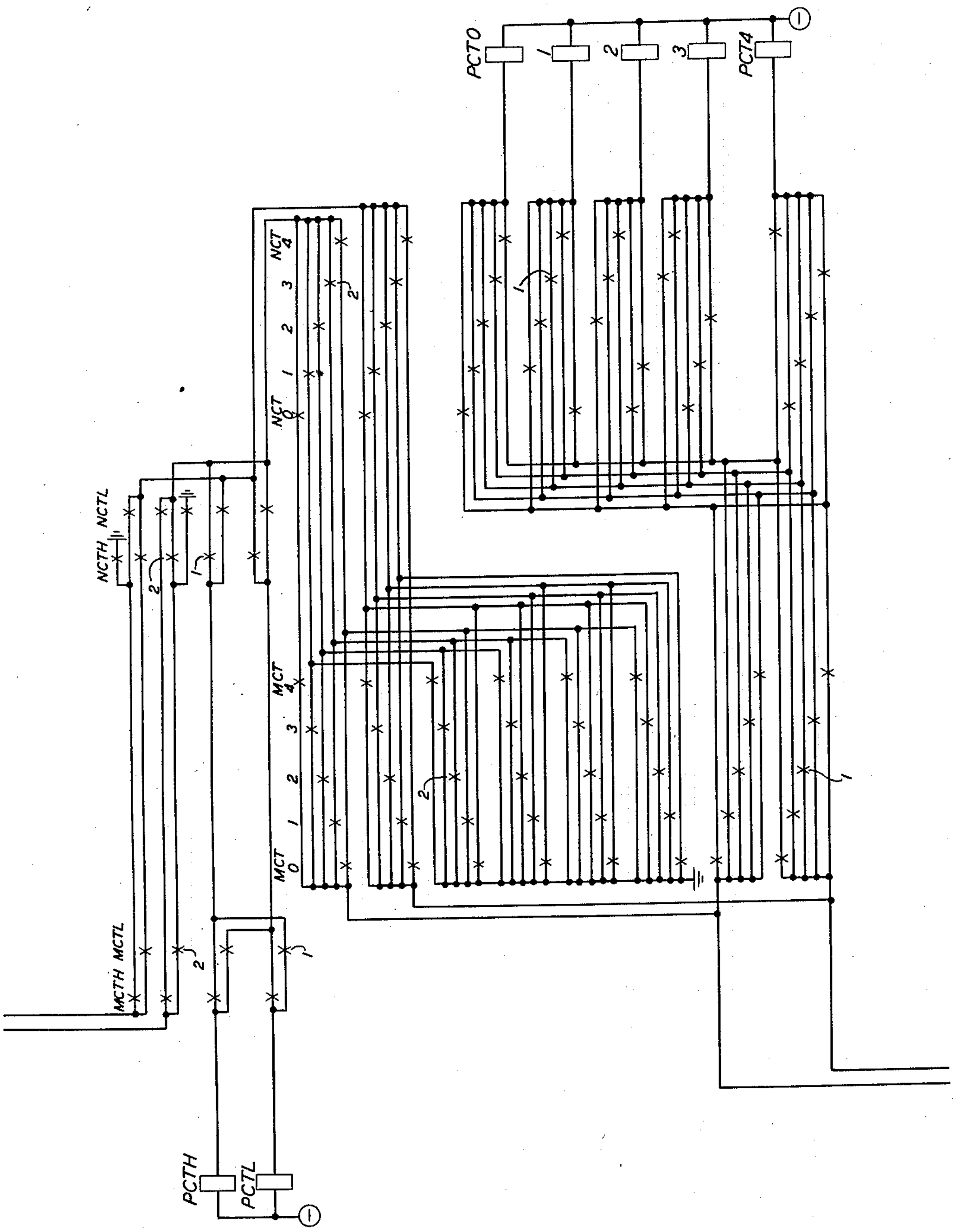

A circuit is closed to operate relay PCT1 on Fig. 53 from ground on closed contacts 2 of relay MCU4 on Fig. 54, through closed contacts 2 of relays NCT2, NCUL, MCUH, over the carry lead to Fig. 53, through closed contacts 1 of relays MCT2 and NCT3, to the winding of relay PCT1 which now operates. A path is also closed on Fig. 53 to operate relay PCTL from ground on closed contacts 2 of relay MCT2, through closed contacts 2 of relay NCT3, through contacts 1 of relays NCTH and MCTL to the winding of relay PCTL which now operates.

Operated relays PCTL and PCT1 represent a biquinary 1 in the cents tens column of the P register.

The carry one from the cents tens column is added to the biquinary 3 in the dollar units column of the M register, as indicated by operation of relays MDUL and MDU3, and the sum of these two is, in turn, added to the biquinary 0 in the dollar units column of the N register, as indicated by the operation of relays NDUL and NDU0. The sum of these three quantities is entered as a biquinary 4 in the dollar units column of the P register as indicated by the operation of relays PDUL and PDU4.

Figure 51:
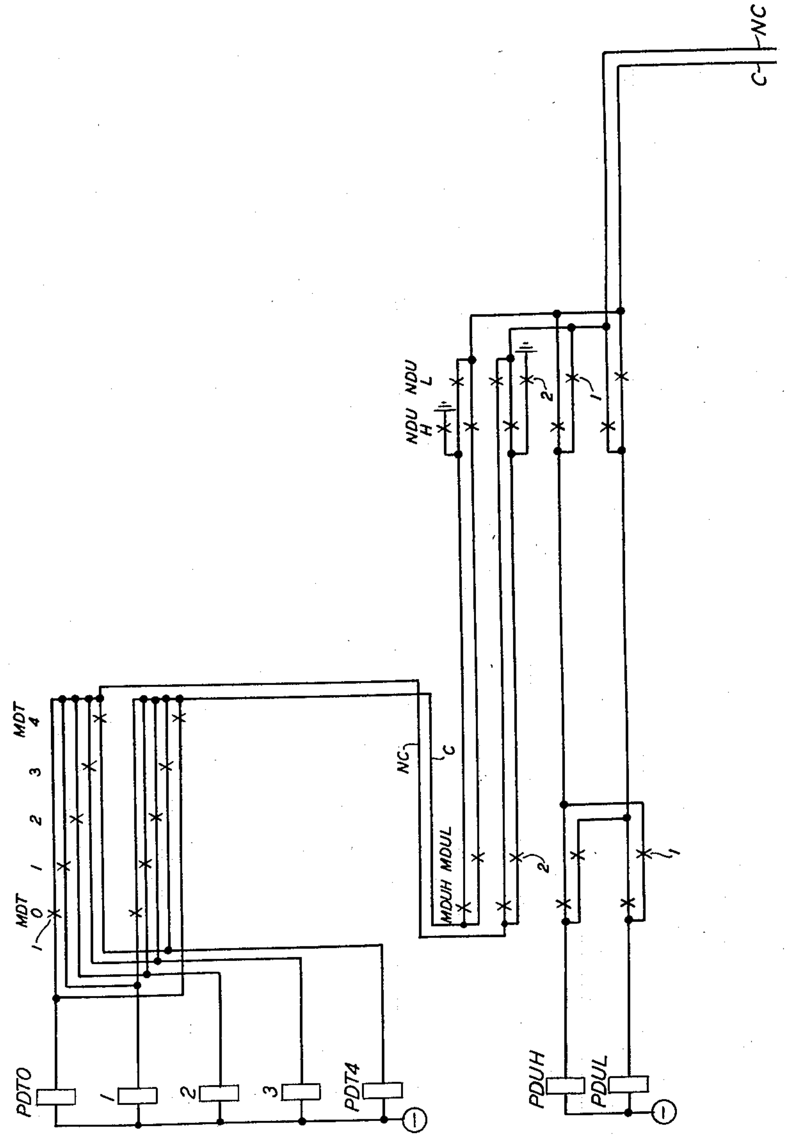
Figure 52:
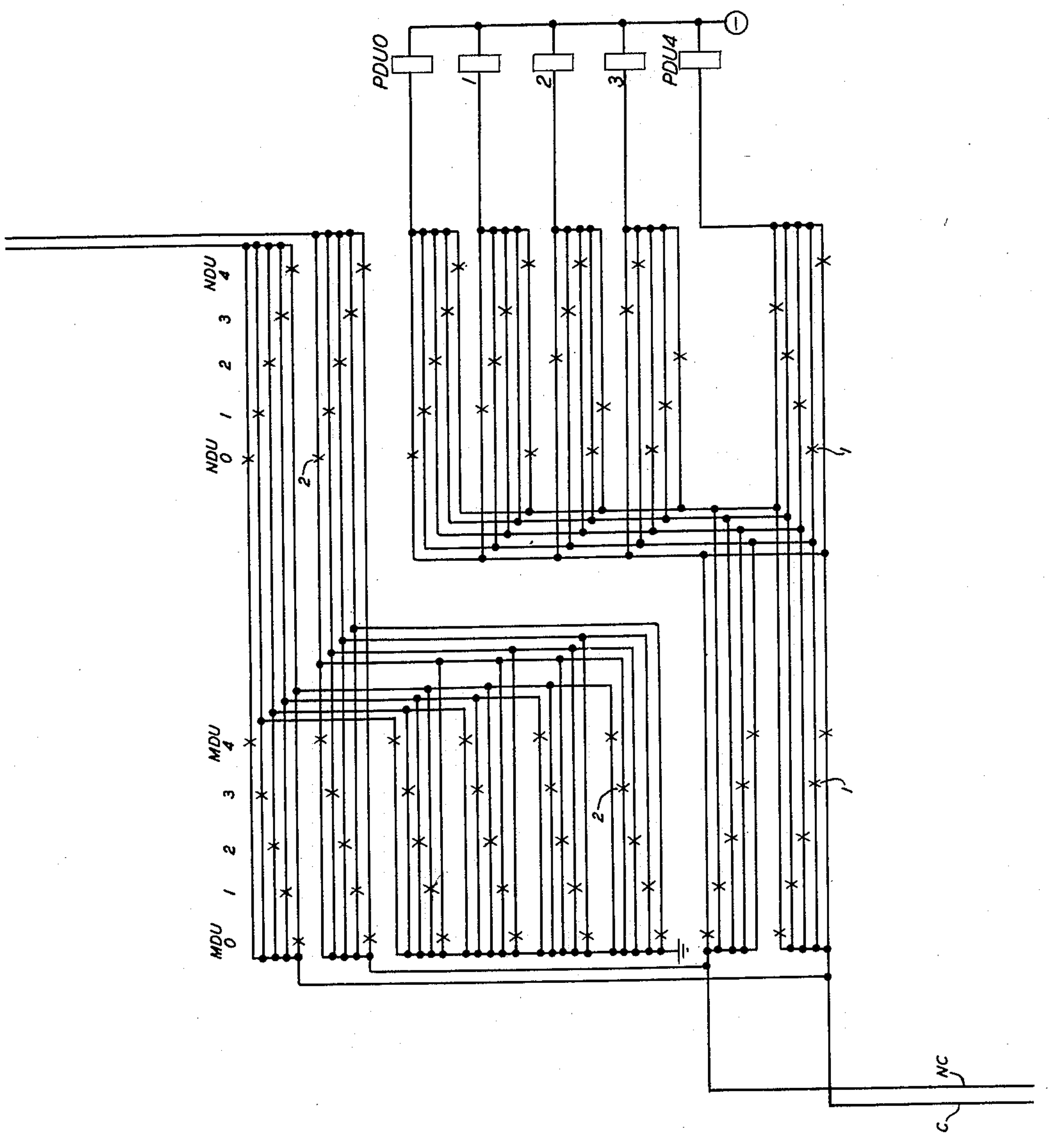

Relay PDU4 on Fig. 52 is operated from ground on closed contacts 2 of relay MCT2 on Fig. 53, through closed contacts 2 of relays NCT3, NCTH, MCTL over the carry lead to Fig. 52, through closed contacts 1 of relays MDU3, NDU0, to the winding of relay PDU4, which now operates. Relay PDUL on Fig. 51 is operated from ground on closed contacts 2 of relay MDU2 on Fig. 52 through closed contacts 2 of relay NDU0, through closed contacts 1 of relay NDUL on Fig. 51, through closed contacts 1 of relay MDUL to the winding of relay PDUL, which now operates.

The operation of relays PDUL and PDU4 manifests a biquinary 4 in the dollar units column of the P register. The tax adder next enters the biquinary 0 in the dollar tens column of the M register into the P register. The circuit on Fig. 51 is closed from ground on contacts 2 of relay NDUL operated, through contacts 2 of relay MDUL operated, through closed contacts 1 of relay MDT0 to the winding of relay PDT0, which now operates.

The operation of relays PDT0, PDUL, PDU4, PCTL, PCT1, PCUL, PCU1, PMUL, PMU2 and PHMH, as indicated on the bottom of Fig. 61 by the darkened small rectangles, represents the total tax of $4.1125 for our hypothetical call. This data is transmitted to the tape-to-card converter along with the charge for the call as computed by the charge adder. The output registers in the tape-to-card converter are operated in accordance with these two items of information. The output register, in turn, controls certain other circuit operations which perforate an output card in accordance with the data standing therein for each call. These cards may then be processed by a series of business machines which will produce as an end result a sheet of paper containing all the toll calls made by each subscriber along with the total charge in tax for each call.

Throughout the entire specification the charge and tax computer has been described in connection with a present day telephone office business machine; i.e., the tape-to-card converter. It has been previously discussed how the tape-to-card converter could be modified slightly to enable it to exchange data with the circuits comprising the present invention. The resulting combination would constitute one of the final links in an accounting system capable of processing perforated central office tapes containing toll call data and producing as an output product a series of perforated business machine cards each of which contains the charge and tax data along with other bits of information pertaining to a toll call.

The association of the present invention with the tape-to-card converter was made only for the purpose of facilitating its description and to show how it can readily be used with present day equipment. It is to be understood, however, that the present invention is in no way dependent upon the tape-to-card converter and that it may be used with any type of data processing system capable of utilizing the output information the present invention can produce.

It is to be understood that the above-described arrangements are merely illustrative of the application of the principles of the invention. Numerous other arrangements may be devised by those skilled in the art without departing from the spirit and scope of the invention. For example, if it is not necessary to determine the Federal tax for each message individually, that part of the circuit arrangement covered by Figs. 28 through 54 can be omitted. Under this condition the charge of each message would be determined but not the tax.

What is claimed is:

1. In a charge and tax computer for determining the charges for toll calls in response to the receipt of data pertaining to the initial period charge for each call, the duration of the initial period for each call, the duration of an overtime period for each call, the charge for a single overtime period for each call, and the elapsed time for each call; a subtracter circuit, means for transmitting data pertaining to the elapsed time and the duration of the initial period for each call to the subtracter circuit, and means in said subtracter circuit responsive to the receipt of said data for substracting the duration of the initial period from the elapsed time to determine the total overtime for each call; a divider circuit, means including said subtracter circuit for transmitting data pertaining to the total overtime for each call to said divider circuit, means for transmitting data pertaining to the duration of a single overtime period to said divider circuit, means including said divider circuit responsive to the receipt of said data for dividing the overtime for each call by the duration of a single overtime period to determine the number of overtime periods in each call; an overtime multiplier circuit, means including said divider circuit for transmitting data pertaining to the number of overtime periods in each call to said overtime multiplier circuit, means for transmitting data pertaining to the charge for a single overtime period to said overtime multiplier circuit, means including said overtime multiplier circuit responsive to the receipt of said data for multiplying the number of overtime periods in each call by the charge for a single overtime period to determine the overtime charge; a charge adder circuit, means including said overtime multiplier circuit for transmitting data pertaining to the overtime charge for each call to said charge adder circuit, means for transmitting data pertaining to the charge for the initial period for each call to said charge adder circuit, means including said charge adder circuit responsive to the receipt of said data for adding the overtime charge to the charge for the initial period for each call to determine the total charge for each call; a tax rate selector circuit, means including said charge adder circuit for transmitting data pertaining to the total charge for each call to the tax rate selector circuit, means including said tax rate selector circuit for determining which one of a plurality of tax rates shall be applicable for each call in accordance with the charge for the call, and means operative in said tax rate selector circuit for indicating the tax rate applicable to each call in response to the receipt of the charge data therefor.

2. In a charge and tax computer for determining the charges for toll calls in response to the receipt of data pertaining to the initial period charge for each call, the duration of the initial period for each call, the duration of an overtime period for each call, the charge for a single overtime period for each call, and the elapsed time for each call; a subtracter circuit, means for transmitting data pertaining to the elapsed time and the duration of the initial period for each call to said subtracter circuit, and means in said subtracter circuit responsive to the receipt of said data for subtracting the duration of the initial period from the elapsed time to determine the total overtime for each call; a divider circuit, means including said subtracter circuit for transmitting data pertaining to the total overtime for each call to said divider circuit, means for transmitting data pertaining to the duration of a single overtime period to said divider circuit, means including said divider circuit responsive to the receipt of said data for dividing the overtime for each call by the duration of a single overtime period to determine the number of overtime periods in each call; an overtime multiplier circuit, means including said divider circuit for transmitting data pertaining to the number of overtime periods in each call to said overtime multiplier circuit, means for transmitting data pertaining to the charge for a single overtime period to said overtime multiplier circuit, means including said overtime multiplier circuit responsive to the receipt of said data for multiplying the number of overtime periods in each call by the charge for a single overtime period to determine the overtime charge; a charge adder circuit, means including said overtime multiplier circuit for transmitting data pertaining to the overtime charge to said charge adder circuit, means for transmitting data pertaining to the charge for the initial period for each call to said charge adder circuit, means including said charge adder circuit responsive to the receipt of said data for adding the overtime charge to the charge for the initial period portion of each call to determine the total charge for each call; a tax rate selector circuit, means including said charge adder circuit for transmitting data pertaining to the total charge for each call to the tax rate selector circuit, means including said tax rate selector circuit for determining which one of a plurality of tax rates shall be applicable for each call in accordance with the charge for the call, and means in said tax rate selector circuit responsive to the receipt of the charge data for each call for indicating the tax rate applicable thereto; a tax multiplier circuit, means including said tax rate selector circuit for transmitting data pertaining to the tax rate applicable for each call to said tax multiplier circuit, means including said charge adder circuit for transmitting the total charge for each call to said tax multiplier circuit, means including said tax multiplier circuit responsive to the receipt of said last two data for multiplying the total charge by the tax rate for each call to obtain a series of partial products representing the tax chargeable to each call.

3. In a charge and tax computer for determining the charges for toll calls in response to the receipt of data pertaining to the initial period charge for each call, the duration of the initial period for each call, the duration of an overtime period for each call, the charge for a single overtime period for each call, and the elapsed time for each call, a subtracter circuit, means for transmitting data pertaining to the elapsed time and the duration of the initial period for each call to said subtracter circuit, and means in said subtracter circuit responsive to the receipt of said data for subtracting the duration of the initial period from the elapsed time to determine the total overtime for each call; a divider circuit, means including said subtracter circuit for transmitting data pertaining to the total overtime for each call to said divider circuit, means for transmitting data pertaining to the duration of a single overtime period to said divider circuit, means including said divider circuit responsive to the receipt of said data for dividing the overtime for each call by the duration of a single overtime period to determine the number of overtime periods in each call; an overtime multiplier circuit, means including said divider circuit for transmitting data pertaining to the number of overtime periods in each call to said overtime multiplier circuit, means for transmitting data pertaining to the charge for a single overtime period to said overtime multiplier circuit, means including said overtime multiplier circuit responsive to the receipt of said data for multiplying the number of overtime periods in each call by the charge for a single overtime period to determine the overtime charge for each call; a charge adder circuit, means including said overtime multiplier circuit for transmitting data pertaining to the overtime charge for each call to said charge adder circuit, means for transmitting data pertaining to the charge for the initial period for each call to said charge adder circuit, means including said charge adder circuit responsive to the receipt of said data for adding the overtime charge to the charge for the initial period for each call to determine the total charge; a tax rate selector circuit, means including said charge adder circuit for transmitting data pertaining to the total charge for each call to the tax rate selector circuit, means including said tax rate selector circuit for determining which one of a plurality of tax rates shall be applicable to each call in accordance with the charge for the call, and means in said tax rate selector circuit responsive to the receipt of said charge data for indicating the tax rate applicable to each call; a tax multiplier circuit, means including said tax rate selector circuit for transmitting data pertaining to the tax rate applicable to each call to said tax multiplier circuit, means including said charge adder circuit for transmitting the total charge for each call to said tax multiplier circuit, means including said tax multiplier circuit responsive to the receipt of said last two data for multiplying the total charge by the tax rate for each call to obtain a series of partial products; a tax adder circuit, means including said tax multiplier circuit for transmitting said partial products to said tax adder circuit, means including said tax adder circuit responsive to the receipt of said partial products for adding said partial products in order to compute the tax applicable to each call; means including said charge adder ciruit and said tax adder circuit responsive to the operation of said last two named circuits for transmitting the total charge and the tax applicable to each call to an output circuit.

4. In a charge and tax computer for determining the charges for toll calls in response to the receipt of data pertaining to the initial period charge for each call, the duration of the initial period for each call, the duration of an overtime period for each call, the charge for a single overtime period for each call, and the elapsed time for each call; a subtracter circuit, means for transmitting data pertaining to the elapsed time and the duration of the initial period for each call to said subtractor circuit, and means in said subtracter circuit responsive to the receipt of said data for subtracting the duration of the initial period from the elapsed time to determine the total overtime for each call; a divider circuit, means including said subtracter circuit for transmitting data pertaining to the total overtime for each call to said divider circuit, means for transmitting data pertaining to the duration of a single overtime period to said divider circuit, means including said divider circuit responsive to the receipt of said data for dividing the overtime for each call by the duration of a single overtime period to determine the number of overtime periods in each call; an overtime multiplier circuit, means including said divider circuit for transmitting data pertaining to the number of overtime periods in each call to said overtime multiplier circuit, means for transmitting data pertaining to the charge for a single overtime period to said overtime multiplier circuit, means including said overtime multiplier circuit responsive to the receipt of said data for multiplying the number of overtime periods in each call by the charge for a single overtime period to determine the overtime charge; a charge adder circuit, means including said overtime multiplier circuit for transmitting data pertaining to the overtime charge for each call to said charge adder circuit, means for transmitting data pertaining to the charge for the initial period for each call to said charge adder circuit, means including said charge adder circuit responsive to the receipt of said data for adding the overtime charge to the charge for the initial period for each call to determine the total charge for each call; a tax rate selector circuit for determining the tax rate applicable to a telephone call in response to the receipt of data representing the charge for said call, means including said charge adder circuit for transmitting data pertaining to the total charge for each call to the tax rate selector circuit, a first relay representing a high tax rate, a second relay representing a low tax rate, a plurality of relays representing the dollar tens, dollar units, cents tens, and cents units digits of the charge for a call, means responsive to the receipt of said last-named data for selectively operating said plurality of relays to represent the charge for a call, means responsive to the presence of a digit other than zero in the dollar tens or dollar units digit of the charge to operate the relay representing the high tax rate, means operative when the dollar tens and dollar units digits of the charge are both zero and when the cents digit is above a first predetermined magnitude to operate the relay representing said high tax rate, means operative when the dollar tens and dollar units digits of a charge are both zero and when the cents tens digit is equal to said first predetermined magnitude to operate the relay representing the high tax rate if the cents units digit is above a second predetermined magnitude, means operative when the dollar tens and dollar units digits of a charge are both zero and when the tens digit is equal to said first predetermined magnitude to operate the relay representing the low tax rate if the cents units digit is below said second predetermined magnitude, means operative when the dollar tens and dollar units digits of a charge are both zero and when the cents tens digit is below said first predetermined magnitude to operate the relay representing said low tax rate, a manually operated cross-connection board, a plurality of output relays selectively operable to represent any tax rate, means including said cross-connection board responsive to the operation of the relay representing said high tax rate to operate the output relays representing the tax rate associated with said high tax rate, and means including said cross-connection board responsive to the operation of the relay representing said low tax rate to operate said output relays to represent the tax rate associated with said low tax rate.

5. In a charge and tax computer for determining the charges for toll calls in response to the receipt of information pertaining to the initial period charge for each call, the duration of the initial period for each call, the duration of an overtime period for each call, the charge for a single overtime period for each call, and the elapsed time for each call; a subtracter circuit for computing the overtime for telephone calls, means for transmitting data pertaining to the elapsed time and the duration of the initial period for each call to said subtracter circuit, a first input circuit comprising a plurality of relays selectively operable by said last-named means to represent the units digit of the elapsed time for a telephone call, a first output circuit comprising a group of relays selectively operable to represent the units digit of the overtime for a telephone call, a second input circuit comprising a plurality of relays selectively operable by said means for transmitting to represent the duration of the initial period for telephone calls, means responsive to the selective operation of relays in both of said input circuits to operate a relay in said first output circuit to represent the units digit of overtime, a borrow zero relay operable when the units digit of the elapsed time is greater than the units digit of the initial period, a borrow one relay operable when the units digit of the elapsed time is less than the units digit of the initial period, a third input circuit comprising a plurality of relays selectively operable by said means for transmitting to represent the tens digit of the elapsed time, a second output circuit comprising a plurality of relays selectively operable to represent the tens digit of the overtime, means responsive to the operation of said borrow zero relay and a relay in said third input circuit to operate the relay in said second output circuit representing the same digital value as the operated relay in said third input circuit, and means responsive to the operation of said borrow one relay and a relay in said third input circuit to operate the relay in said second output circuit that represents the numerical value of the operated relay in said third input circuit minus one.

6. In a subtracter circuit for computing the overtime for telephone calls, a first input circuit comprising a plurality of relays selectively operable to represent the units digit of the elapsed time for a telephone call, a first output circuit comprising a group of relays selectively operable to represent the units digit of the overtime for a telephone call, a second input circuit comprising a plurality of relays selectively operable to represent the duration of the initial period for telephone calls, means responsive to the selective operation of relays in both of said input circuits to operate a relay in said first output circuit to represent the units digit of overtime, a borrow zero relay operable when the units digit of the elapsed time is greater than the units digit of the initial period, a borrow one relay operable when the units digit of the elapsed time is less than the units digit of the initial period, a third input circuit comprising a plurality of relays selectively operable to represent the tens digit of the elapsed time, a second output circuit comprising a plurality of relays selectively operable to represent the tens digit of the overtime, means responsive to the operation of said borrow zero relay and a relay in said third input circuit to operate the relay in said second output circuit representing the same digital value as the operated relay in said third input circuit, and means responsive to the operation of said borrow one relay and a relay in said third input circuit to operate the relay in said second output circuit that represents the numerical value of the operated relay in said third input circuit minus one.

7. In a divider circuit for computing the number of overtime periods in a telephone call, a first input circuit comprising a plurality of relays selectively operable to represent the total overtime for a call, an output circuit comprising a plurality of relays selectively operable to represent the number of overtime periods in a call, a second input circuit comprising a plurality of relays each of which is selectively operable to represent the duration of a single overtime period for a telephone call, a plurality of intermediate relays, means responsive to the selective operation of the relays in both of said input circuits to operate one of said intermediate relays, means responsive to the operation of one of said intermediate relays and to the operation of the relays in said first input circuit to operate the relays in said output circuit representing the numerical quantity obtained when the duration of the overtime for a call is divided by the duration of a single overtime period for said same call.

8. In a charge adder circuit for adding the initial period charge for a telephone call to the overtime charge to obtain the total charge for said call upon the receipt of information pertaining thereto, said overtime charge being manifested as the product of the number of overtime periods in said call and the overtime rate; a first register circuit comprising a first set of relays selectively operable to represent in biquinary form the cents tens digit of the initial period charge, a second set of relays in said first register selectively operable to represent in decimal form the dollar units digit of said initial period charge; a second register including two sets of relays selectively operable to represent in decimal form the cents tens and dollar units digits of the product of the units digit of the number of overtime periods and the tens digit of the overtime rate; a third register including a first set of relays selectively operable to represent in binary form the cents units digit of the initial period charge, a second set of relays in said third register, means responsive to the operation of the relays representing the cents tens digits in said first and second registers to operate said second set of relays in said third register to represent in biquinary form the cents tens digit of the sum of said cents tens digits in said first and second registers, a third set of relays in said third register, means responsive to the operation of the relays representing the dollar units digits in said first and second registers to operate said third set of relays in said third register to represent in biquinary form the dollar units digit of the sum of said dollar units digits contained in said first and second registers plus any carry from the cents tens order in the same register, a fourth set of relays in said third register operable to represent a dollar tens digit, means operable when the sum of the dollar units digit in the first and second registers is greater than a nine to operate said fourth set of relays in said third register to represent a dollar tens digit of one; a fourth register comprising two sets of relays operable to represent in decimal form the dollar tens and dollar units digit of the product of the tens digit of the number of overtime periods and the tens digit of the overtime rate for a call; a fifth register comprising a set of relays operable to represent in decimal form the dollar units digit of the product of the tens digit of the number of overtime periods and the units digit of the overtime rate; a sixth register comprising a first set of relays operable to represent in binary form the cents units digit of the product of the units digit of the number of overtime periods and the units digit of the overtime rate for a telephone call, a second set of relays in said sixth register operable to represent in decimal form the cents tens digit of the product of the units digit of the number of overtime periods and the units digit of the overtime rate and in binary form the product of the tens digit of the number of overtime periods and the units digit of the overtime rate, a third set of relays in said sixth register, means responsive to the operation of the relays representing the dollar units digits in said fourth and fifth registers to operate said third set of relays in said sixth register to represent in biquinary form the sum of the dollar units digits entered into said fourth and fifth registers, a fourth set of relays in said sixth register, means responsive to the operation of the relays representing the dollar tens digit in said fourth register to operate said fourth set of relays in said sixth register to represent in biquinary form the sum of the dollar tens digit in the fourth register plus any carry from the dollar units digit in the sixth register; a seventh register, a first set of relays in said seventh register, means responsive to the operation of the relays representing the cents units digits in said third and sixth registers to operate said first set of relays in said seventh register to represent the sum of the quantities in the cents units order of said third and sixth registers; a second set of relays in said seventh register, means responsive to the operation of the relays representing the cents tens digits in said third and sixth registers to operate said second set of relays in the seventh register to represent in biquinary form the sum of said cents tens digits plus any carry from the cents units order in said seventh register, a third set of relays in the seventh register, means responsive to the operation of the relays representing the dollar units digits in said third and sixth registers to operate the third set of relays in the seventh register to represent in biquinary form the sum of said dollar units digits plus any carry from the cents tens order in said seventh register, a fourth set of relays in the seventh register, means responsive to the operation of the relays representing the dollar tens digits in said third and sixth registers to operate the fourth set of relays in the seventh register to represent in biquinary form the sum of said dollar tens digits plus any carry from the dollar units order in said seventh register.

9. In a circuit for determining the tax rate applicable to a telephone call in response to the receipt of data representing the charges for said call, a first relay representing a high tax rate, a second relay representing a low tax rate, a plurality of relays representing the dollar tens, dollar units, cents tens, and cents units digits of the charge for a call, means for selectively operating said plurality of relays to represent the charge for a call, means responsive to the presence of a digit other than zero in the dollar tens or dollar units digit of the charge to operate the relay representing the high tax rate, means operative when the dollar tens and dollar units digits of the charge are both zero and when the cents tens digit is above a first predetermined magnitude to operate the relay representing said high tax rate, means operative when the dollar tens and dollar units digits of a charge are both zero and when the cents tens digit is equal to said first predetermined magnitude to operate the relay representing the high tax rate if the cents units digit is above a second predetermined magnitude, means operative when the dollar tens and dollar units digits of a charge are both zero and when the tens digit is equal to said first predetermined magnitude to operate the relay representing the low tax rate if the cents units digit is below said second predetermined magnitude, means operative when the dollar tens and dollar units digits of a charge are both zero and when the cents tens digit is below said first predetermined magnitude to operate the relay representing said low tax rate, a manually operated cross-connection board, a plurality of output relays selectively operable to represent any tax rate, means including said cross-connection board responsive to the operation of the relay representing said high tax rate to operate the output relays representing the tax rate associated with said high tax rate, and means including said cross-connection board responsive to the operation of the relay representing said low tax rate to operate said output relays to represent the tax rate associated with said low tax rate.

References Cited in the file of this patent

UNITED STATES PATENTS 2,639,092 Rettalack ________________ May 19, 1953